United States Patent
Nair et al.

(10) Patent No.: US 9,846,423 B2
(45) Date of Patent: Dec. 19, 2017

(54) SMART TAPS FOR A SINGLE-WIRE INDUSTRIAL SAFETY SYSTEM

(71) Applicant: Rockwell Automation Technologies, Inc., Mayfield Heights, OH (US)

(72) Inventors: Suresh R. Nair, Amherst, NH (US); Wayne R. Foster, Tyngsborough, MA (US); Alex Harris, Salem, MA (US); Rudolf Laurenz Papenbreer, Wuppertal (DE); Norbert Machuletz, Wetter (DE); Oliver Heckel, Frechen (DE); Thomas Helpenstein, Wuppertal (DE); Van Duros, Lynnfield, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/187,859

(22) Filed: Jun. 21, 2016

(65) Prior Publication Data

US 2016/0299484 A1    Oct. 13, 2016

Related U.S. Application Data

(63) Continuation-in-part of application No. 14/580,178, filed on Dec. 22, 2014.

(51) Int. Cl.
*F16P 3/20*     (2006.01)
*G05B 19/042*   (2006.01)

(52) U.S. Cl.
CPC ............... *G05B 19/0425* (2013.01)

(58) Field of Classification Search
USPC .................................................. 307/326, 328
See application file for complete search history.

(56) References Cited

U.S. PATENT DOCUMENTS 7,496,099 B2    2/2009  Franchuk et al.
9,461,459 B2 *  10/2016 Henneberger ........... H02H 3/10
(Continued)

FOREIGN PATENT DOCUMENTS

EP    1521145    4/2005
EP    2383762    11/2011

OTHER PUBLICATIONS

Extended European Search Report for EP Application Serial No. 15201993, dated May 23, 2016, 8 pages.
(Continued)

*Primary Examiner* — Adam Houston
(74) *Attorney, Agent, or Firm* — Amin, Turocy & Watson, LLP

(57) ABSTRACT

A single-wire safety system is provided that yields reliable safety device monitoring without the need for dual redundant signal channels. The safety system comprises a safety relay acting as a communications master device and one or more safety devices connected in series with the safety relay via a single-wire communication circuit. A smart tap device is used to interface safety devices that are not compliant with the single-wire protocol to the single-wire channel. The safety device or smart tap device farthest from the safety relay on the safety circuit modulates a safety signal with a recognizable pulse pattern that traverses the single-wire safety circuit to the safety relay via the intermediate safety devices or smart taps. The safety relay maintains safety mode as long as the pulse pattern is received and recognized. The architecture allows bi-directional communication of initialization, configuration, and diagnostic messages over the single-wire safety channel.

20 Claims, 57 Drawing Sheets

(56) References Cited

U.S. PATENT DOCUMENTS

| | | | |
|---|---|---|---|
| 2005/0057868 A1* | 3/2005 | Pullmann | H01H 47/004 |
| | | | 361/62 |
| 2007/0263595 A1 | 11/2007 | Charrat | |
| 2009/0252068 A1 | 10/2009 | Charles et al. | |
| 2011/0241447 A1* | 10/2011 | Ando | G05B 19/4063 |
| | | | 307/326 |
| 2014/0075235 A1 | 3/2014 | Chandhoke et al. | |
| 2014/0100675 A1* | 4/2014 | Dold | G05B 19/0428 |
| | | | 700/79 |
| 2016/0178125 A1* | 6/2016 | Nair | G05B 19/04525 |
| | | | 307/328 |
| 2016/0290559 A1* | 10/2016 | Nair | G05B 9/02 |
| 2016/0299484 A1* | 10/2016 | Nair | G05B 19/0425 |

OTHER PUBLICATIONS

Extended European Search Report for EP Application Serial No. EP15195659, dated Mar. 24, 2016, 8 pages.

European Office Action for EP Application Serial No. 15195659.6, dated May 31, 2016, 2 pages.

European Office Action for EP Application Serial No. 15201993.1, dated Jul. 4, 2016, 2 pages.

Non-Final Office Action for U.S. Appl. No. 15/187,850, dated Apr. 6, 2017, 23 pages.

Non-Final Office Action for U.S. Appl. No. 14/580,178, dated Mar. 24, 2017, 28 pages.

Non-Final Office Action for U.S. Appl. No. 14/550,833, dated Apr. 6, 2017, 39 pages.

* cited by examiner

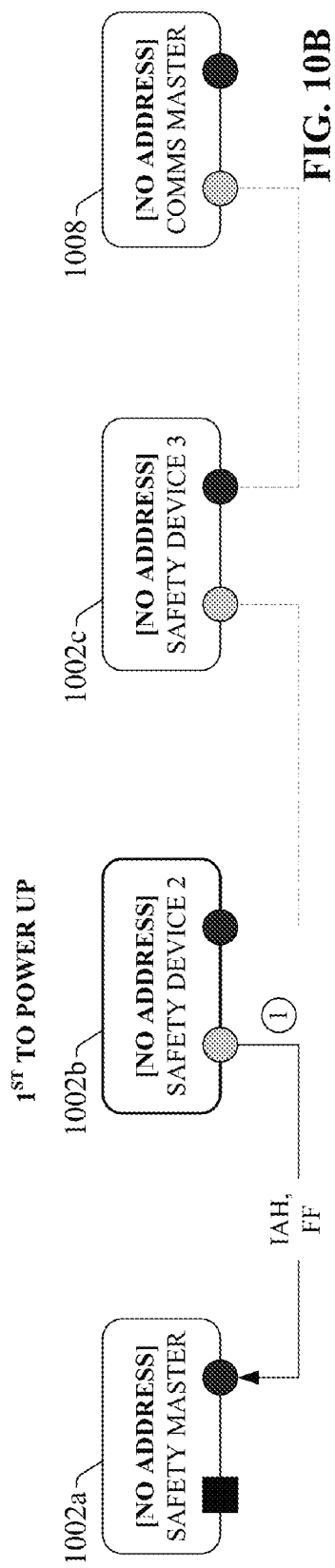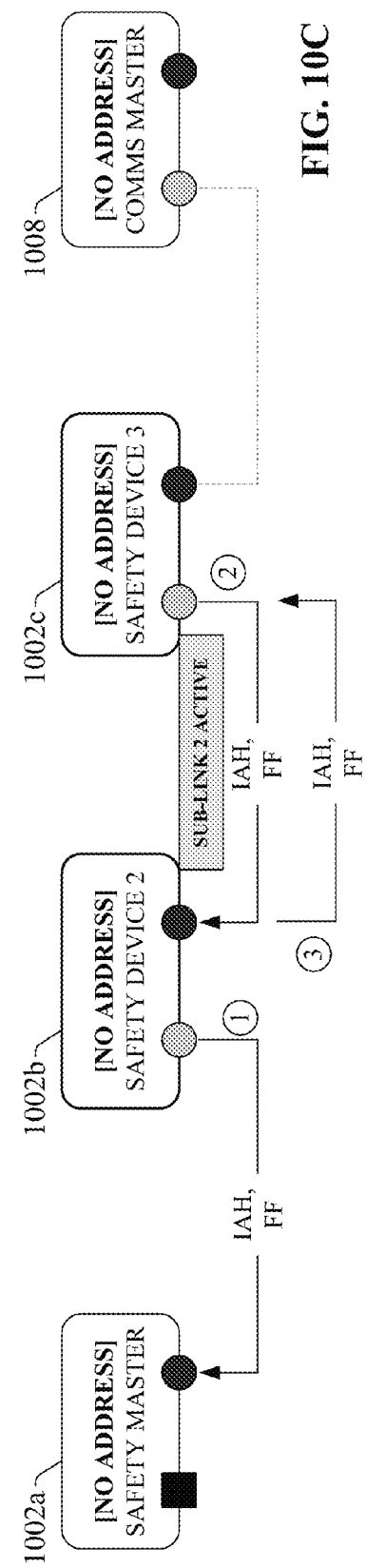

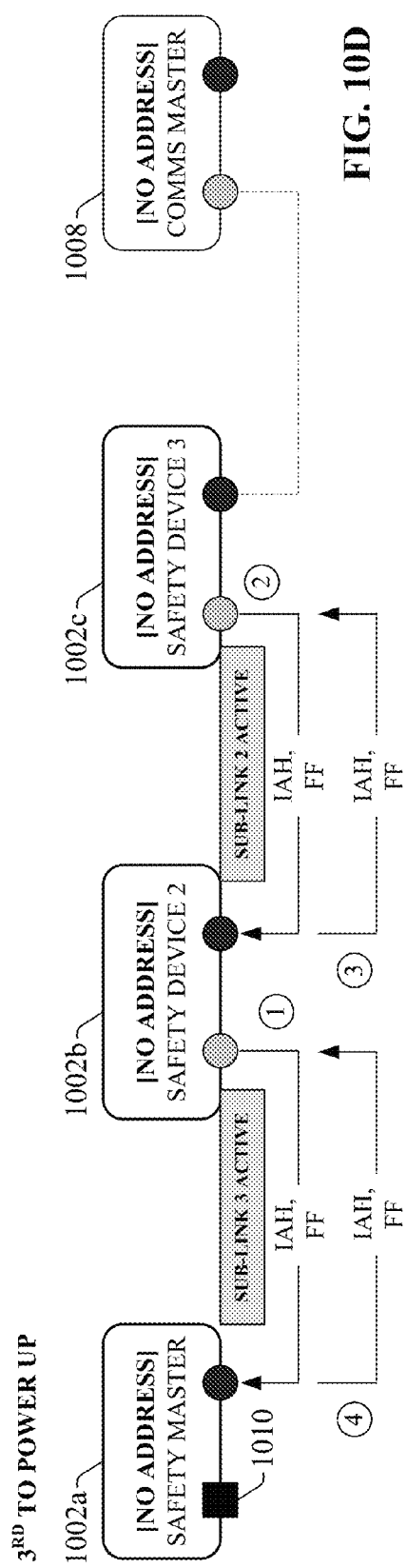
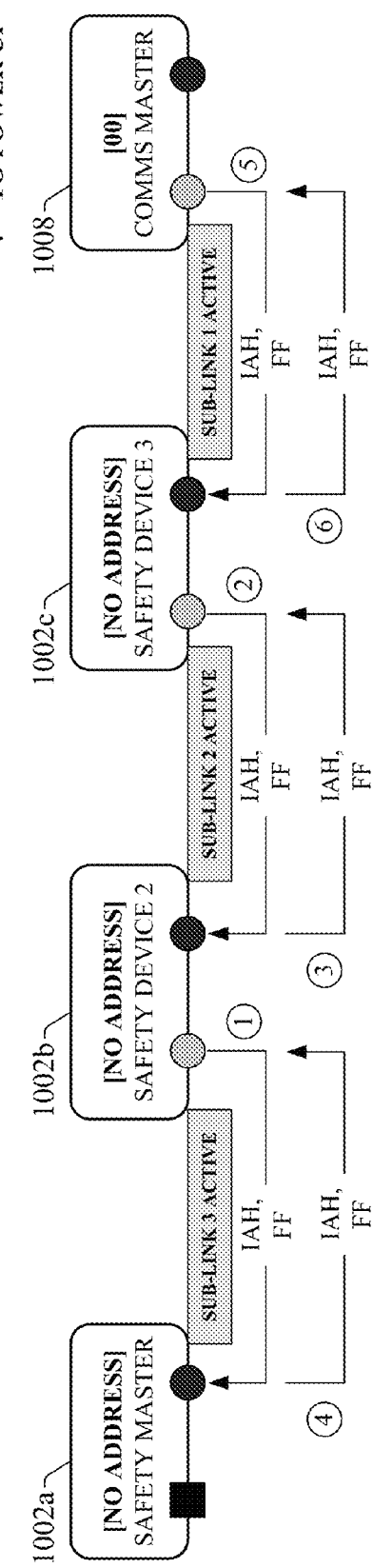

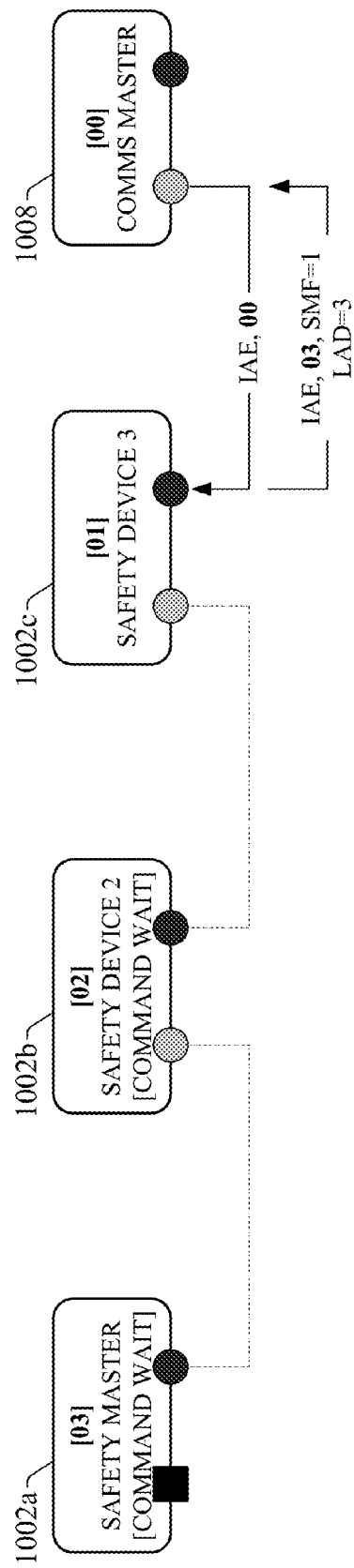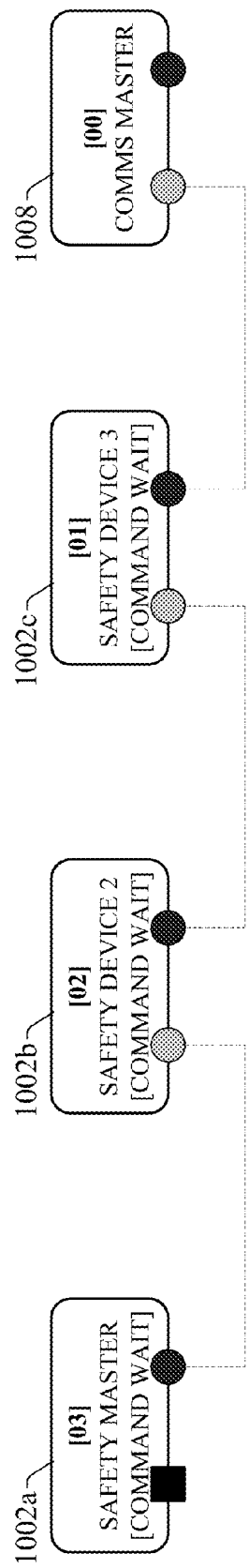

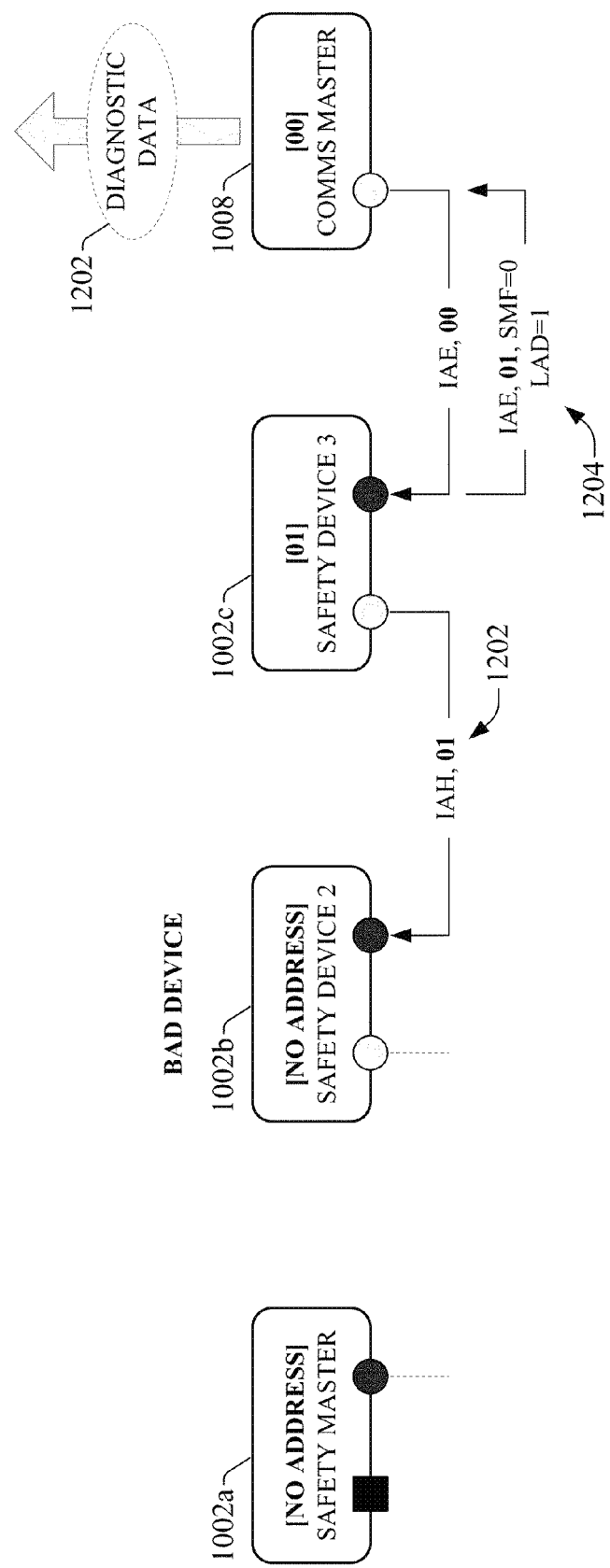

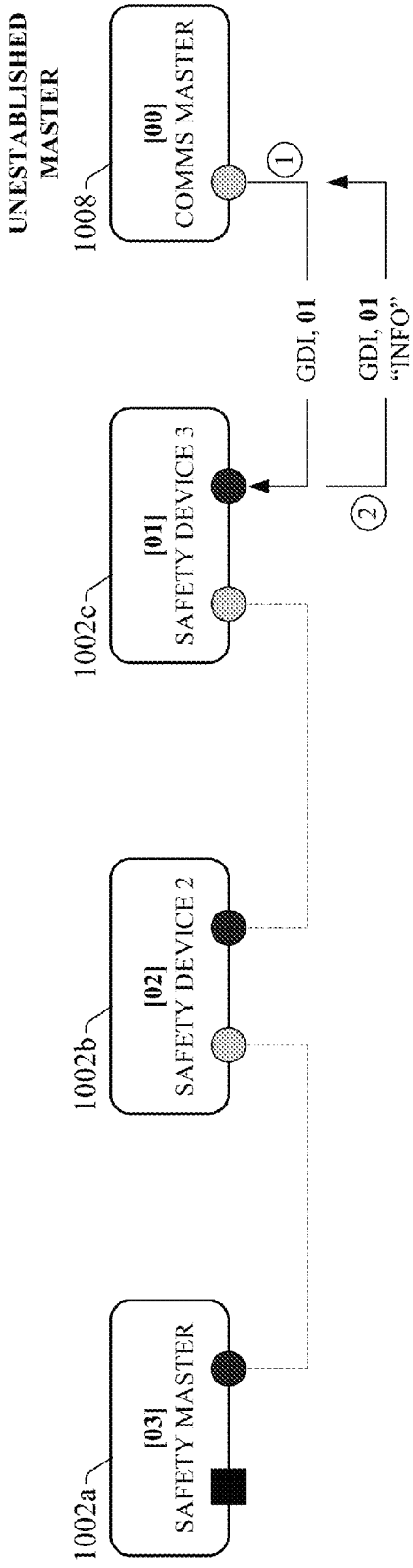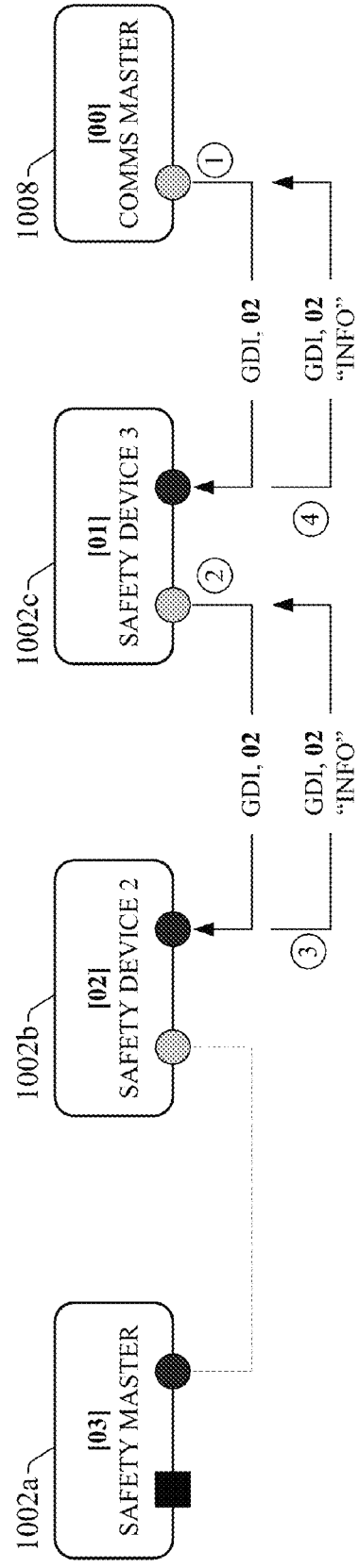
FIG. 13A
FIG. 13B

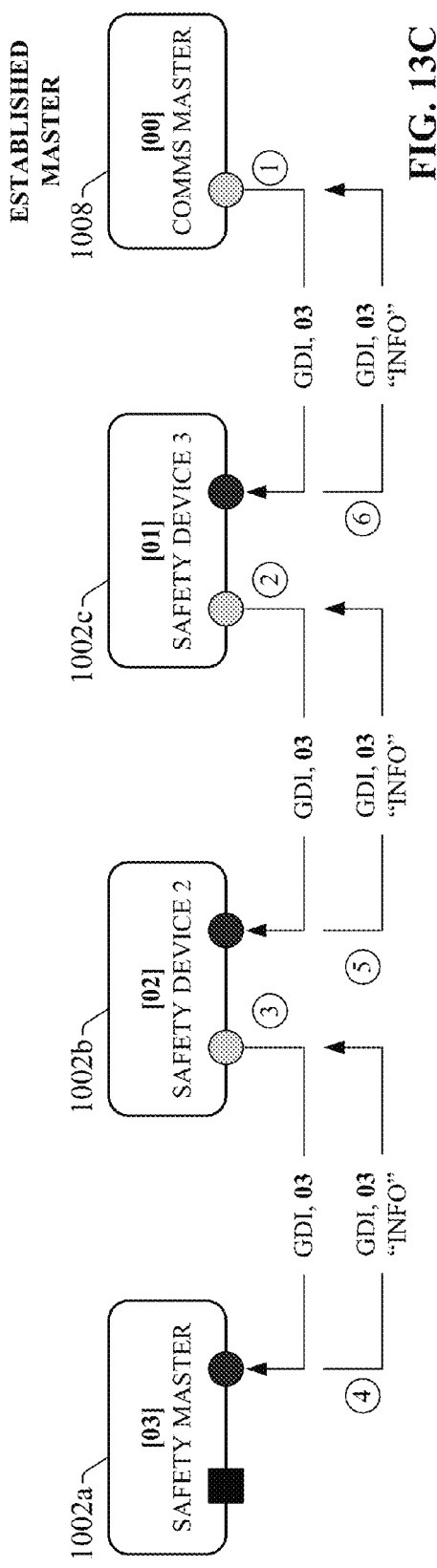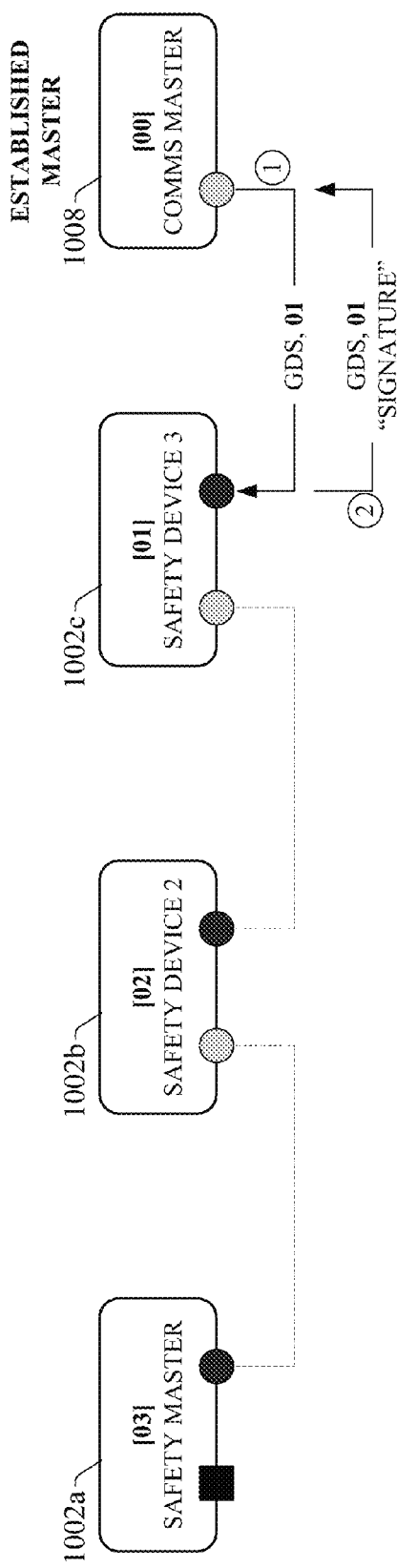

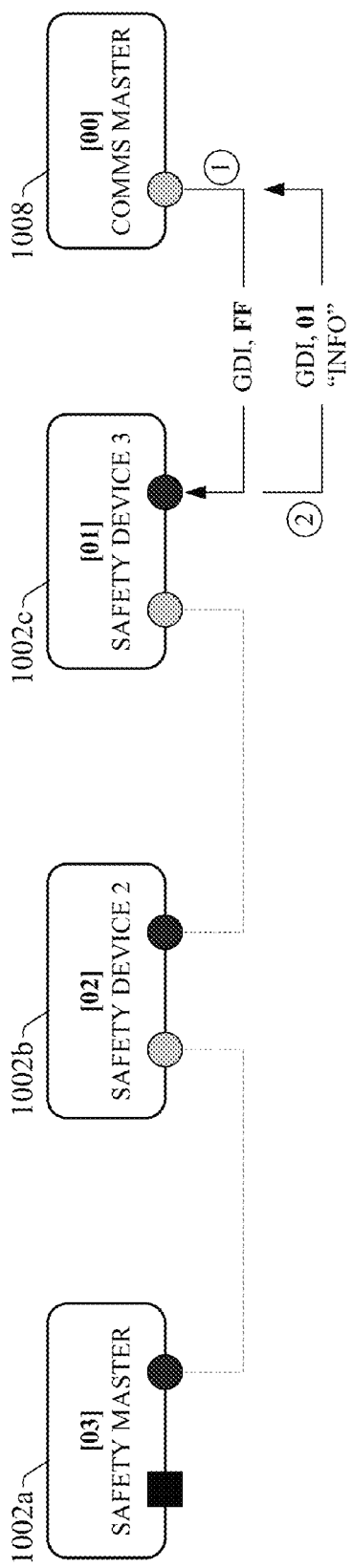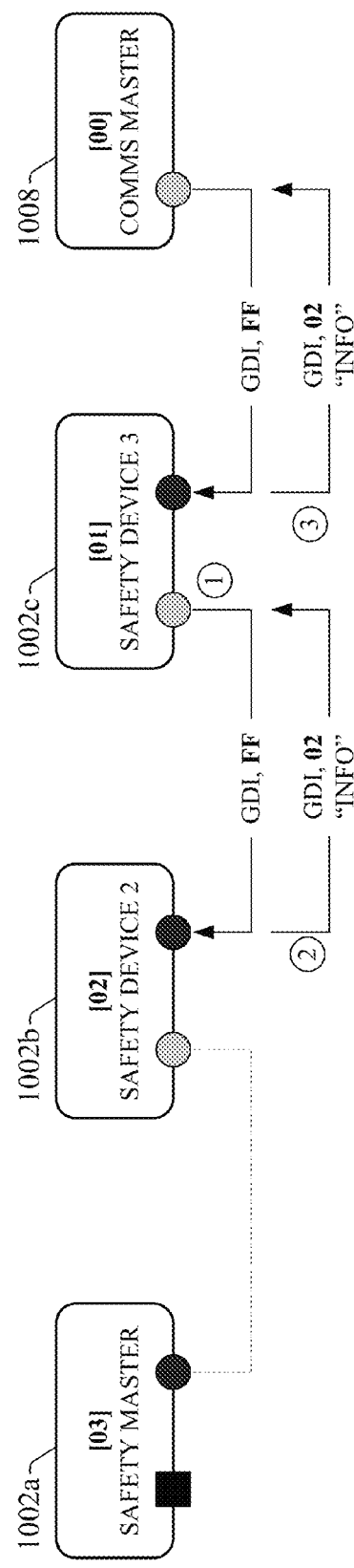

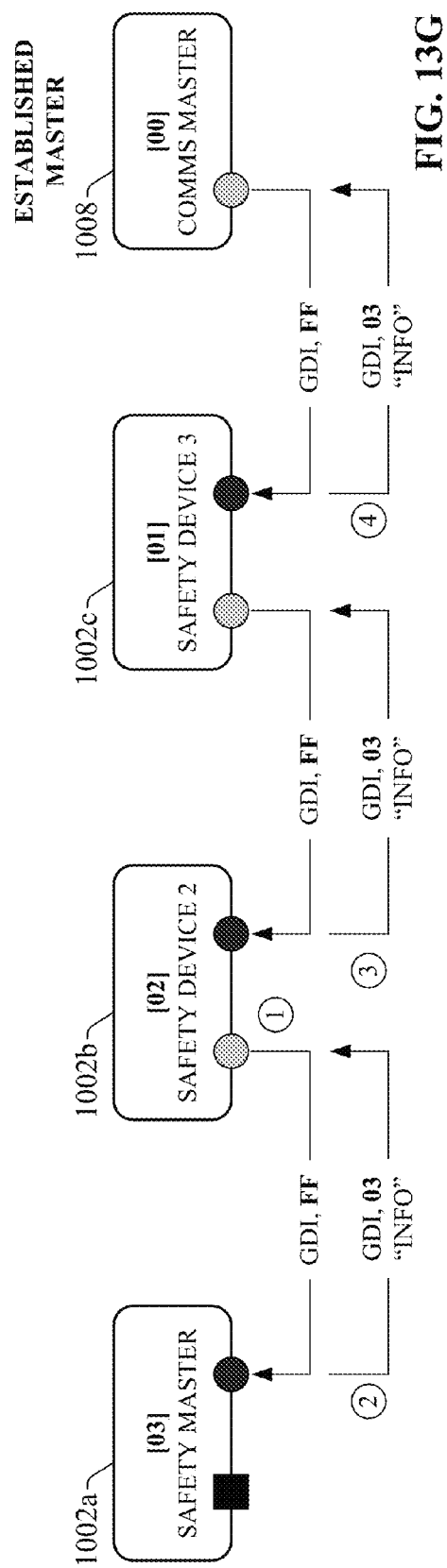

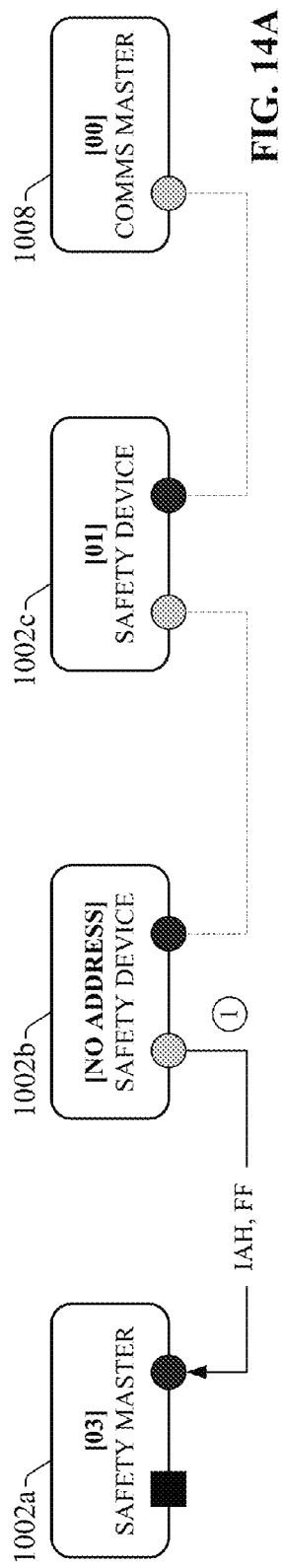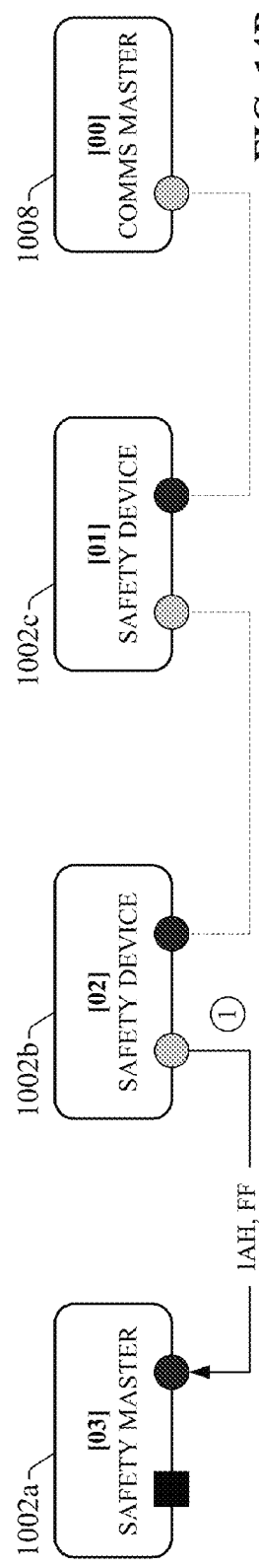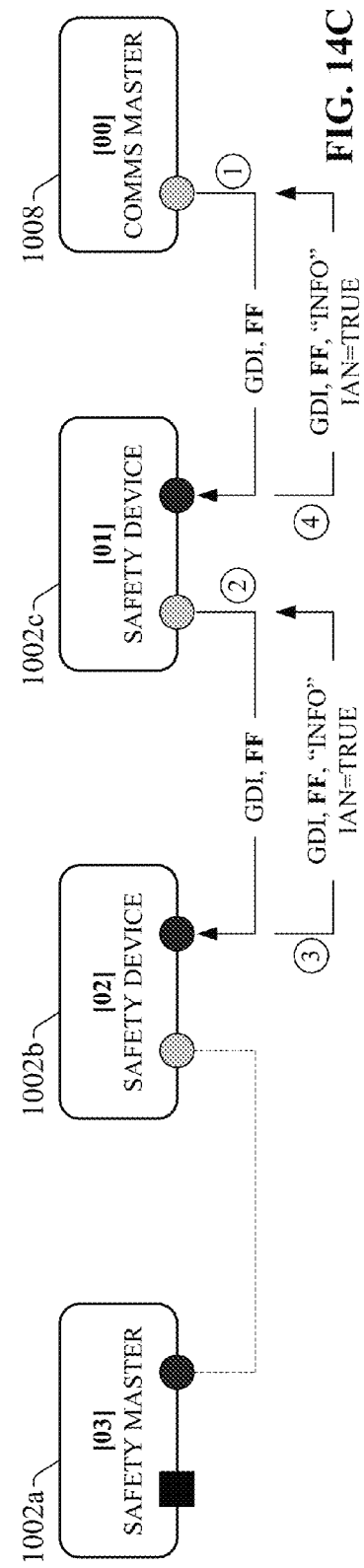

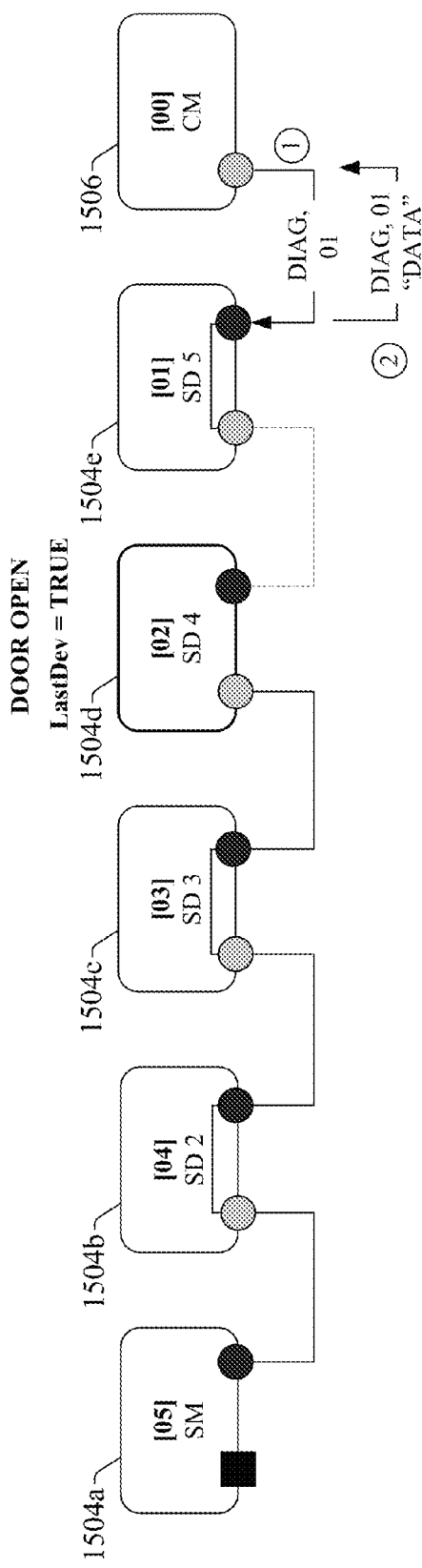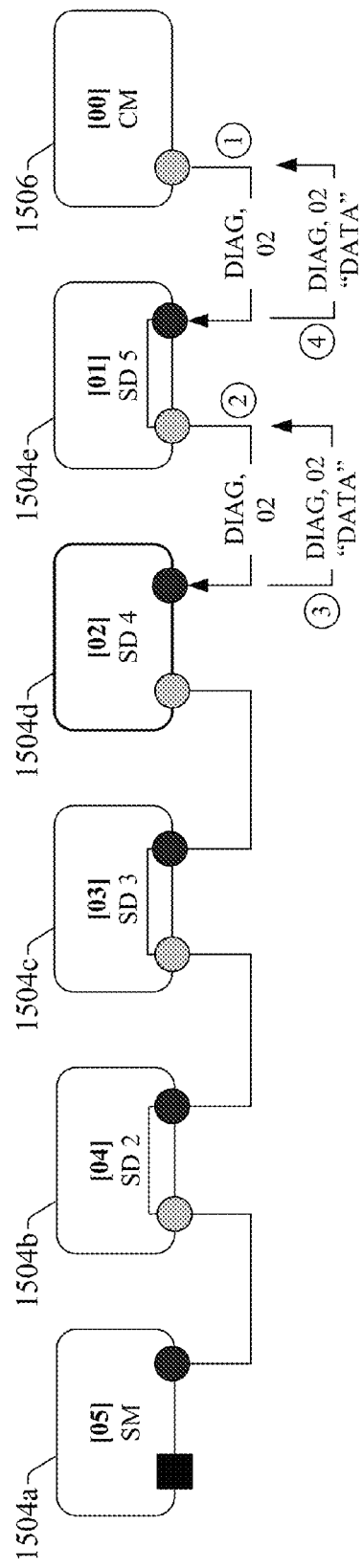
FIG. 15C
FIG. 15D

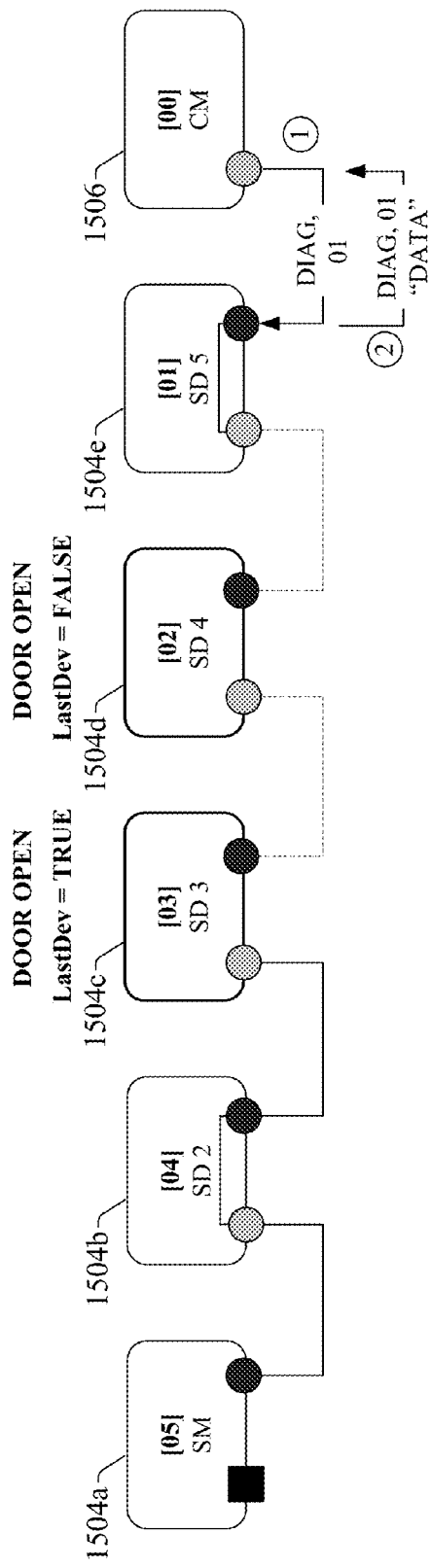
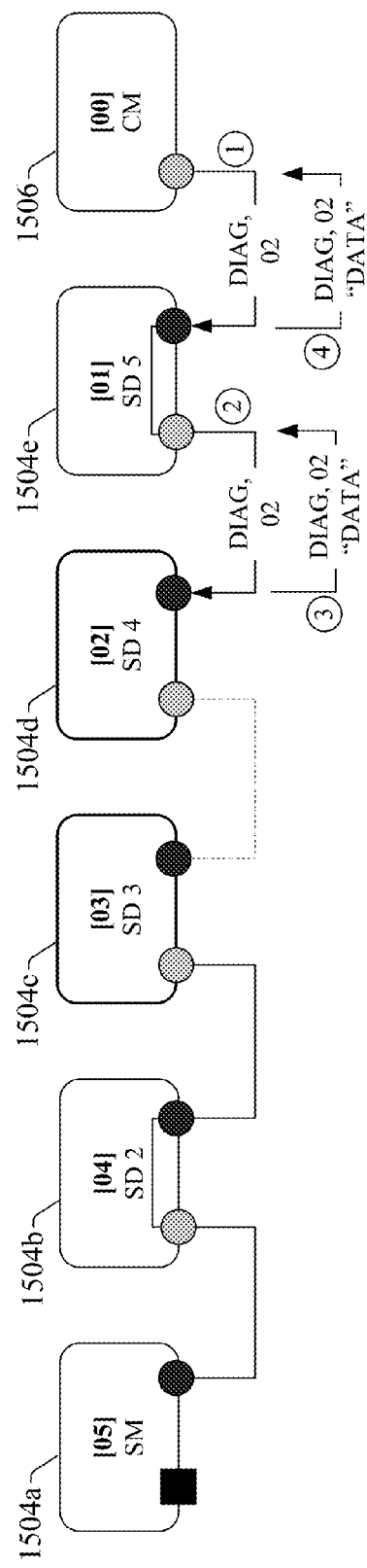
FIG. 16C
FIG. 16D

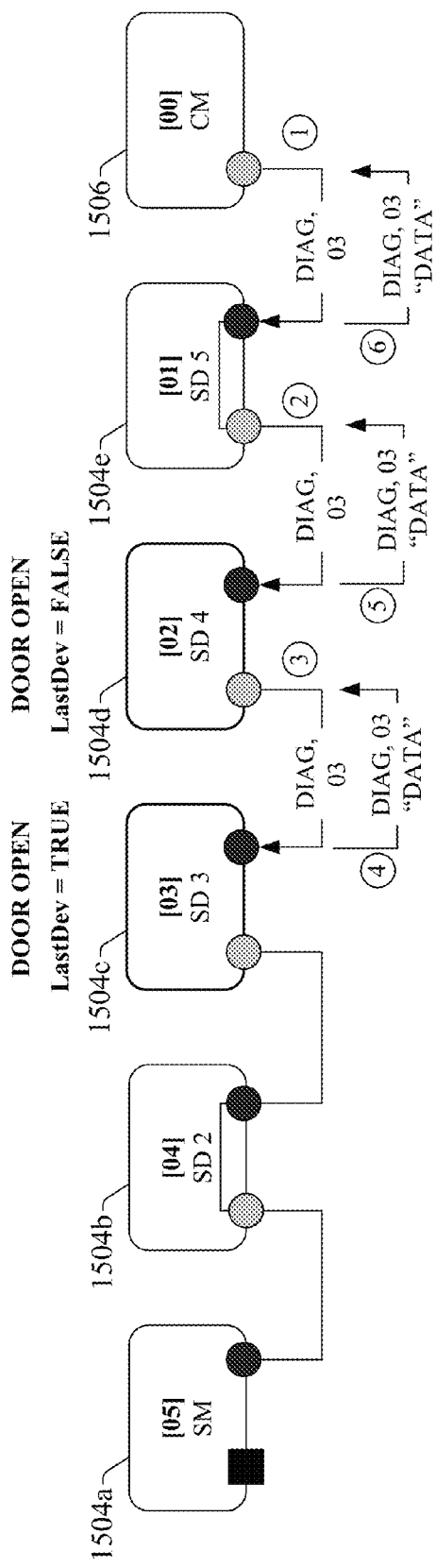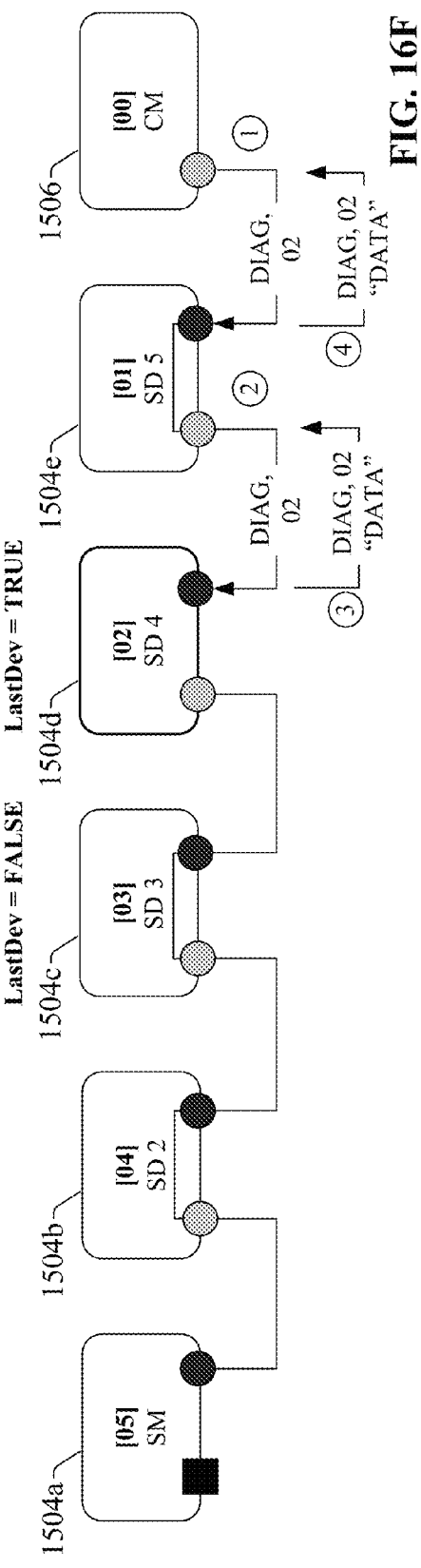
FIG. 16E
FIG. 16F

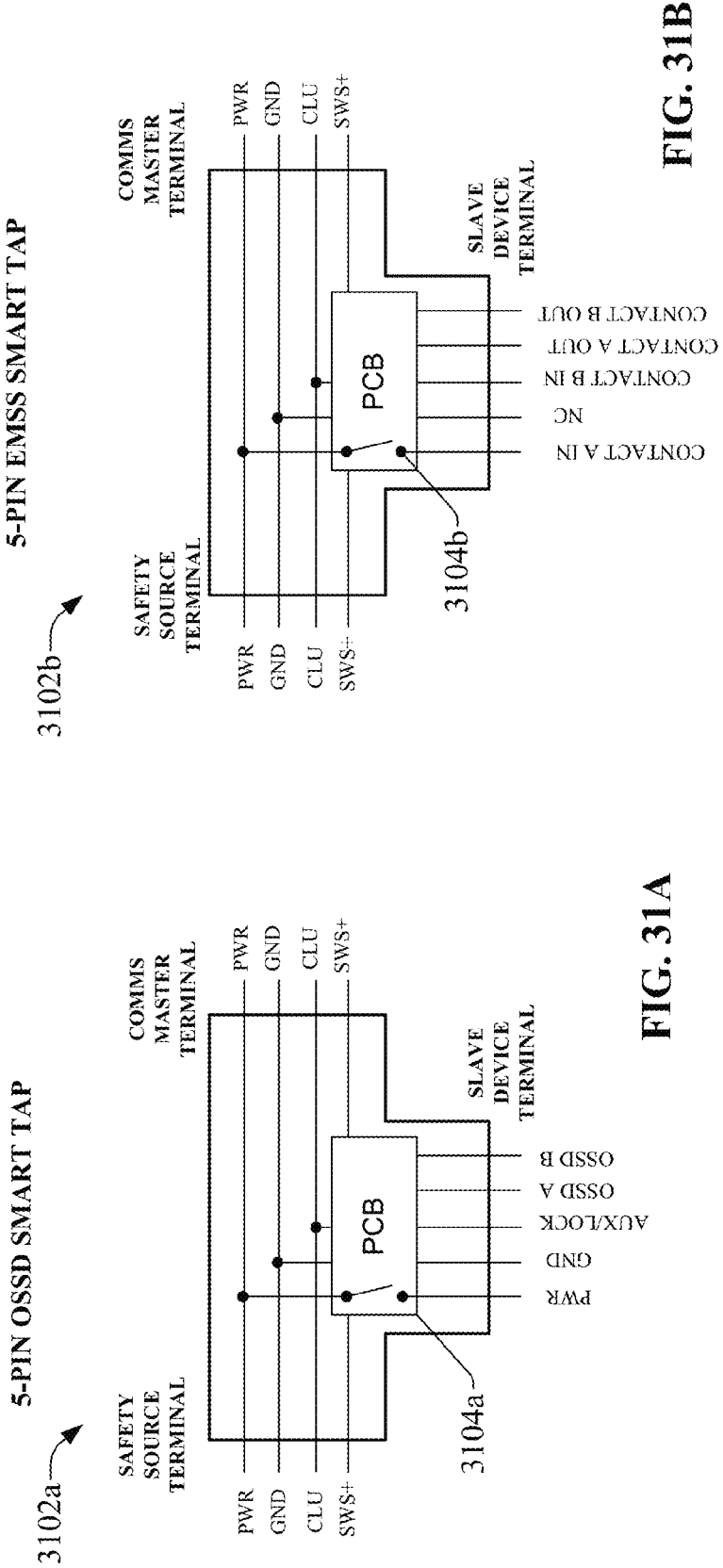

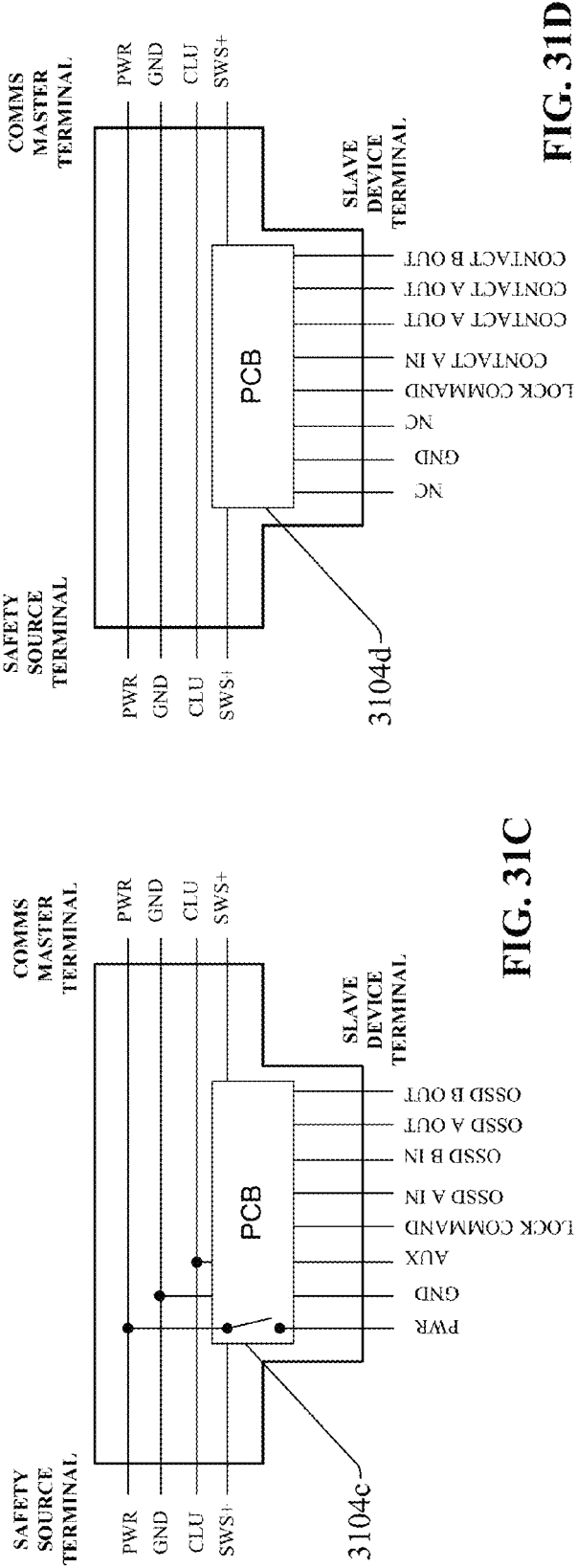

SMART TAPS FOR A SINGLE-WIRE INDUSTRIAL SAFETY SYSTEM

CROSS-REFERENCE TO RELATED APPLICATIONS

This application is a continuation-in-part of U.S. patent application Ser. No. 14/580,178, filed on Dec. 22, 2014, and entitled "DIAGNOSTICS AND ENHANCED FUNCTIONALITY FOR SINGLE-WIRE SAFETY COMMUNICATION," the entirety of which is incorporated herein by reference.

BACKGROUND

The subject matter disclosed herein relates generally to industrial safety systems, and, more particularly, to a single-wire safety architecture that facilitates safety-rated monitoring of safety input devices as well as diagnostics and enhanced functionality over a single-wire communication channel.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a safety device is provided, comprising a safe state detection component configured to determine whether the safety device is in a safe state; a pulse detection component configured to verify that a modulated pulse pattern contained in a safety signal portion of a safety signal received on an input terminal of the safety device corresponds to a defined pulse pattern; a status word control component configured to write device status data to a device data portion of the safety signal; and a safety signal relaying component configured to output the safety signal on an output terminal of the safety device in response to verification that the modulated pulse pattern corresponds to the defined pulse pattern and a determination that the safety device is in the safe state.

Also, one or more embodiments provide a method for operating a safety device on a single-wire safety circuit, determining, by a safety device comprising a processor, whether the safety input device detects a safe status; comparing, by the safety input device, a defined pulse pattern with a pulse pattern carried by a safety signal portion of a safety signal received on an input terminal of the safety input device; writing, by the safety device, device status data to a device data portion of the safety signal; and in response to determining that the pulse pattern matches the defined pulse pattern based on the comparing and that the safety input device detects the safe status, outputting, by the safety device, the safety signal via an output terminal of the safety device.

Also, according to one or more embodiments, a non-transitory computer-readable medium is provided having stored thereon instructions that, in response to execution, cause a safety device to perform operations, the operations comprising determining whether the safety device detects a safe status; comparing a pulse pattern carried by a safety signal portion of a safety signal received on an input terminal of the safety device with a defined pulse pattern; writing device status data to a device data portion of the safety signal; and in response to determining that the pulse pattern matches the defined pulse pattern based on the comparing and that the safety device detects the safe status, outputting the safety signal via an output terminal of the safety device.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIGS. 10A-10E are block diagrams illustrating power up, auto-detection, and sub-link phases of an example single-wire safety system.

FIGS. 11A-11F are block diagrams illustrating the enumeration phase of an example single-wire safety system.

FIGS. 12A-12B are block diagrams illustrating diagnosis of a device failure on an example single-wire safety system.

FIGS. 13A-13G are block diagrams illustrating the link identification phase of an example single-wire safety system.

FIGS. 14A-14C are block diagrams illustrating a scenario in which a safety device on a previously established single-wire safety link has been reset and cleared of its address.

FIGS. 15A-15D are block diagrams illustrating safety and diagnostic modes for an example single-wire safety system.

FIGS. 16A-16F are block diagrams illustrating how messaging is performed in a scenario in which multiple safety devices switch to their safe state.

FIG. 31A-31D are diagrams illustrating electrical connections for various types of smart tap devices.

DETAILED DESCRIPTION

Figure 1:
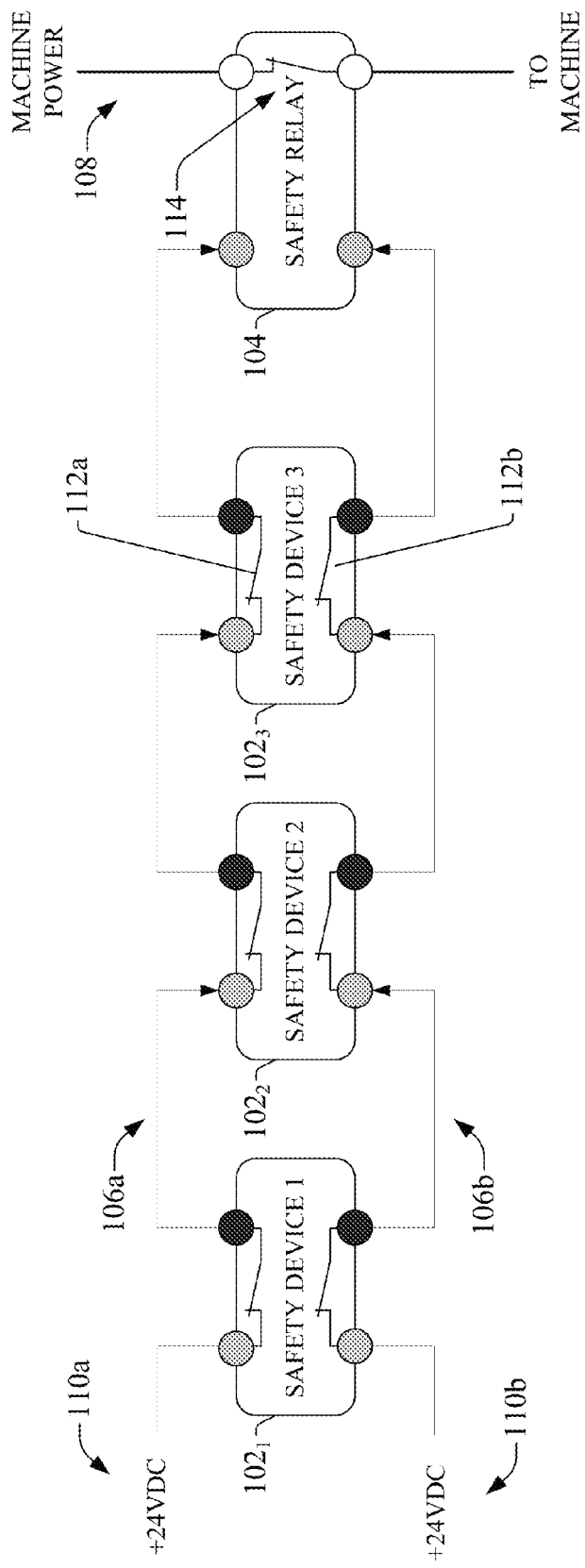
FIG. 1 is a block diagram of an example safety circuit that utilizes redundant signal paths to improve safety reliability.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Modern industrial automation systems often include a number of hazardous machine access points that, if inappropriately breached, may cause injury to an operator. These access points can expose the operator to risks associated with dangerous machine components, including but not limited to crushing by moving parts, electrocution through contact with exposed high-voltage lines or components, chemical burn, laceration or dismemberment by a moving blade, radiation exposure, or other such hazards To mitigate the risks associated with these access points, plant engineers typically implement safety systems designed to protect operators who interact with the access points. These safety systems often include a safety relay or controller that monitors the states of various safety input devices, and disconnects power to hazardous machine components if any of the safety input devices indicate a potentially unsafe condition. An example safety input device may comprise a proximity switch installed on a safety gate that provides access to a hazardous machine. The proximity switch output may be provided as an input to the safety relay, which operates a contactor to isolate power from the machine when the proximity switch indicates that the safety gate is open. In another example, an access point that allows an operator to load a part in a stamping press area may be protected by a light curtain that detects when a physical body (e.g., an operator's arm) has reached through the access point. As with the example proximity switch described above, the light curtain's output can be tied to the safety relay as an input, such that the safety relay isolates power to the press while the light curtain is broken by the detected body Other example safety input devices can include, but are not limited to, emergency stop pushbuttons, industrial safety mats that detect human presence at a particular area based on weight detection, emergency pull-cord devices, photoelectric or laser-based sensors, or other such safety detection devices.

The functional safety solutions implemented for a hazardous access point must be compliant with current industry-specific functional safety standards, such as those defined by the International Organization for Standardization (ISO) or the International Electrotechnical Commission (IEC). Such standards may define formal methodologies for determining a risk level associated with a machine, and provide statutory guidelines for designing safety systems to mitigate the risk. These safety standards dictate safety system types and configurations that must be implemented to counter a particular type of hazard.

To ensure highly reliable safety response even in the event of a failure of one or more safety input devices, safety systems are often designed with dual redundant channels for conveying a safety signal. FIG. 1 illustrates an example safety circuit that utilizes redundant signal paths to improve safety reliability. In this example, safety devices 102 are connected in series to a safety relay 104. Safety devices 102 comprise devices that verify whether the safety relay should enter the safe state based on their respective access points, including but not limited to proximity switches that determine when a safety gate is in the closed position, emergency stop pushbuttons, safety mats, light curtains, etc. Each of the safety devices 102 are equipped with dual redundant contacts 112a and 112b that are designed to close when the device is in the safe state, allowing respective 24 VDC signals 110 to pass.

Safety relay 104 includes at least one resettable contact 114 that controls the connection of machine power 108 to at least one machine, motor, or industrial device. Safety relay 104 will only allow the contact 114 to be reset if both 24 VDC signals are detected, indicating that all safety devices 102 have validated their safety functions. If any of the safety devices 102 switch to a safe state (e.g., a light curtain is broken, an emergency stop button is pressed, a safety door is opened, etc.), the circuit to the safety relay 104 is broken, and the safety relay 104 isolates power from the machine, placing the industrial system in a safe state by preventing hazardous motion.

The use of two separate paths through the safety devices improves safety reliability by ensuring that the safety relay 104 disconnects machine power when a safety device switches to a safe state even in the event that one of the safety device's internal contacts has failed. That is, even if one of the two contacts within a safety device has fused closed, the second contact will still open in response to detection of the safe state, ensuring that the safety relay 104 will see the loss of the 24 VDC signal and disconnect power from the machine. While providing an enhanced degree of safety reliability, implementation of dual redundant signal paths consumes additional terminal space and doubles the wiring requirement relative to a single-wire solution. Moreover, the presence of two separate channels introduces the possibility of cross faults between the two lines, which can prevent the safety relay from detecting an open in the safety circuit.

Figure 2:
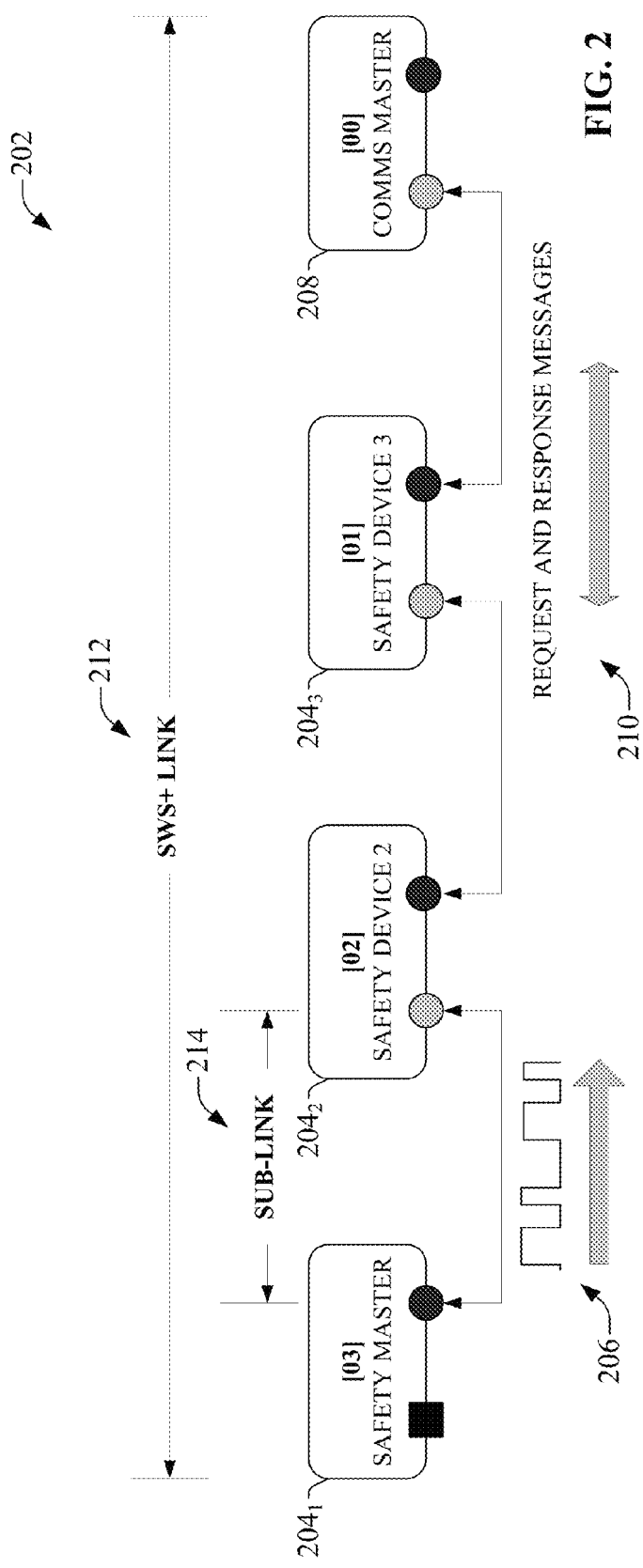
FIG. 2 is a block diagram of an example single-wire safety system architecture.

To address these and other issues, one or more embodiments of the present disclosure provide a single-wire safety system architecture that provides reliable safety device monitoring without the need for dual redundant signal channels. FIG. 2 illustrates an example single-wire safety system architecture 202 according to one or more embodiments. The safety system architecture 202 comprises a safety relay acting as a communications master 208 (referred to herein as a "comms master") and three safety devices 204 connected in series with the safety relay (although any number of safety devices may be added to the safety circuit without departing from the scope of this disclosure). The safety devices are configured for compliance with a single-wire safety communication protocol, to be described in more detail herein. Safety device $204_1$, which is farthest from the comms master 208 in the communication chain, serves as a safety master. A safety device acting as safety master generates a defined pulse train 206 that is passed through each safety device in the chain to the comms master 208 (the safety relay), which remains in operational mode as long as the defined pulse train 206 is recognized. The total path between the safety master $204_1$ and the comms master 208 comprises a single-wire safety plus (SWS+) link 212, which is made up of multiple sub-links 214 between adjacent safety devices on the circuit. When one of the safety devices 204 identifies the loss of its safety function (e.g., opening of a safety gate, pressing of an emergency stop button, etc.) and enters the safe state, that device ceases to pass the pulse train 206 to downstream devices, preventing the signal from reaching the comms master 208. Upon detecting loss of the pulse train signal, the comms master 208 isolates power to the industrial system components (e.g., machine, industrial device, motor, etc.).

In some embodiments, to ensure a high degree of safety reliability without the use of dual redundant signal channels, each safety device on the circuit is configured to perform a two-channel evaluation of the pulse signal. Moreover, the safety master $204_1$, which generates the pulse train 206, can be configured to monitor two-channel feedback of the output signal, such that short-circuiting of the signal to 24 VDC, 0 VDC, or to other clocked signals can be detected.

The architecture implements a bi-directional communication protocol on the single-wire safety channel, allowing the devices in the chain to share information—including but not limited to status data, address information, presence indications, etc.—via the same channel over which the pulsed signal is sent. The single-wire protocol allows the safety devices to exchange request and response messages 210 over the channel, while coordinating sending and receiving of these messages with transmission of the pulse train 206.

Figure 3:
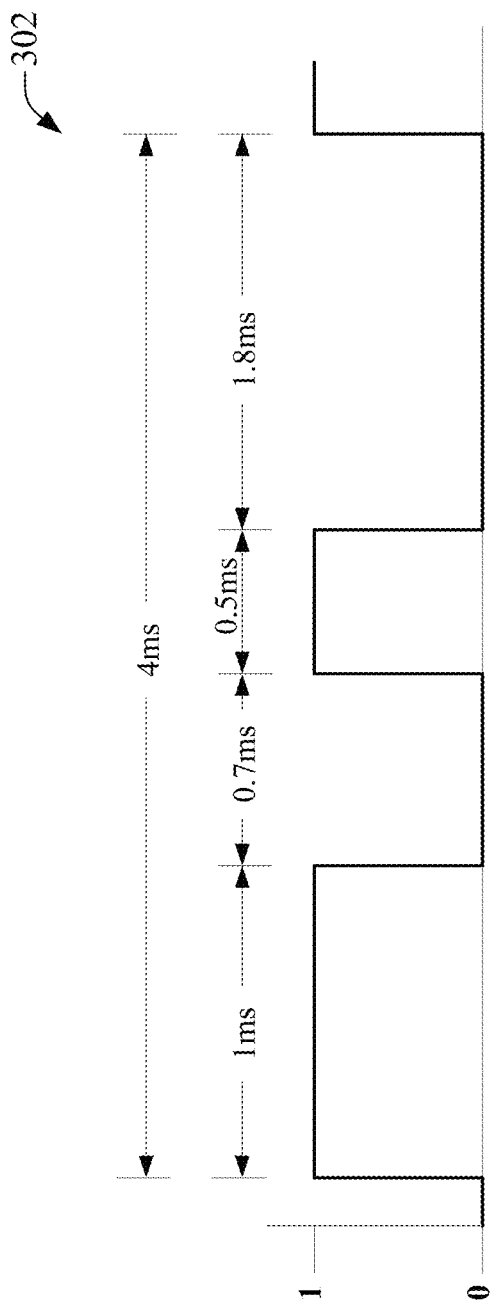
FIG. 3 is a timing chart of an example pulse signal that can be generated by a safety master device.

FIG. 3 is a timing diagram of an example pulse signal 302 that can be generated by the safety master device. The pulse pattern illustrated in FIG. 3 is not intended to be limiting, and it is to be appreciated that any pulse pattern may be implemented without departing from the scope of one or more embodiments of this disclosure. In this example, the pulse signal 302 has a total period of 4 ms, comprising a 1 ms ON signal, a 0.7 ms OFF signal, a 0.5 ms ON signal, and a 1.8 ms OFF signal. Safety devices and comms masters compliant with the single-wire protocol can be configured to recognize and generate this pulse pattern. The comms master can be configured to enable the safety relay outputs when this pulse pattern is received from the safety device nearest to the comms master on the safety circuit.

Figure 4:
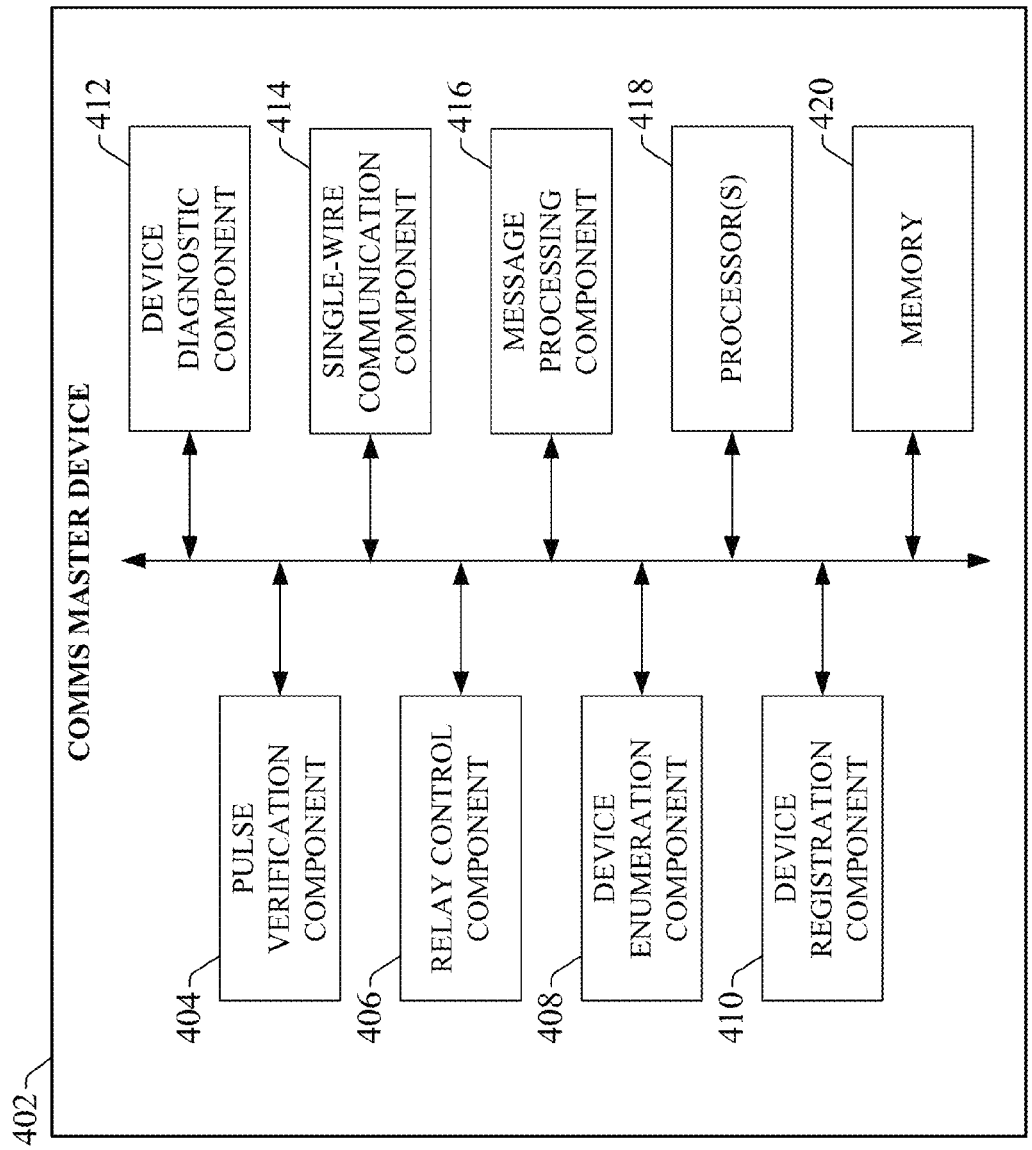
FIG. 4 is a block diagram of an example comms master device.

FIG. 4 is a block diagram of an example comms master device according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Comms master device 402 can include a pulse verification component 404, a relay control component 406, a device enumeration component 408, a device registration component 410, a device diagnostic component 412, a single-wire communication component 414, a message processing component 416, one or more processors 418, and memory 420. In various embodiments, one or more of the pulse verification component 404, relay control component 406, device enumeration component 408, device registration component 410, device diagnostic component 412, single-wire communication component 414, message processing component 416, the one or more processors 418, and memory 420 can be electrically and/or communicatively coupled to one another to perform one or more of the functions of the comms master device 402. In some embodiments, components 404, 406, 408, 410, 412, 414, 416 can comprise software instructions stored on memory 420 and executed by processor(s) 418. Comms master device 402 may also interact with other hardware and/or software components not depicted in FIG. 4. For example, processor(s) 416 may interact with one or more external user interface devices, such as a keyboard, a mouse, a display monitor, a touchscreen, or other such interface devices.

Pulse verification component 404 can be configured to receive a pulse signal via a single-wire safety input terminal and identify a defined pulse pattern conveyed on the signal (e.g., the example pulse pattern illustrated in FIG. 3 or another pulse pattern). Relay control component 406 can be configured to control the state of one or more safety relays based on detection of the defined pulse pattern by the pulse verification component 404. Device enumeration component 408 can be configured to generate and exchange message signals with respective safety devices on a safety circuit in connection with setting and recording device identifiers (addresses) for each safety device. Device registration component 410 can be configured to exchange message signals with the safety devices in connection with collecting information about the safety devices (e.g., device types, hardware and software revision numbers, device signatures, etc.), and registering the collected device information in memory 420.

Device diagnostic component 412 can be configured to exchange message signals with the safety devices in connection with collecting fault or status information from the devices. Single-wire communication component 414 can be configured to coordinate bi-directional data traffic on the signal-wire channel. Message processing component 416 can be configured to process input messages received on the single-wire safety input terminal and to send output messages on the single-wire safety output terminal for transmission on the single-wire safety channel. Messages sent and received via the single-wire safety input terminal can include, but are not limited to, enumeration messages, device information request and response messages, messages indicating that the comms master device is active, and other such messages.

The one or more processors 418 can perform one or more of the functions described herein with reference to the systems and/or methods disclosed. Memory 420 can be a computer-readable storage medium storing computer-executable instructions and/or information for performing the functions described herein with reference to the systems and/or methods disclosed.

Figure 5:
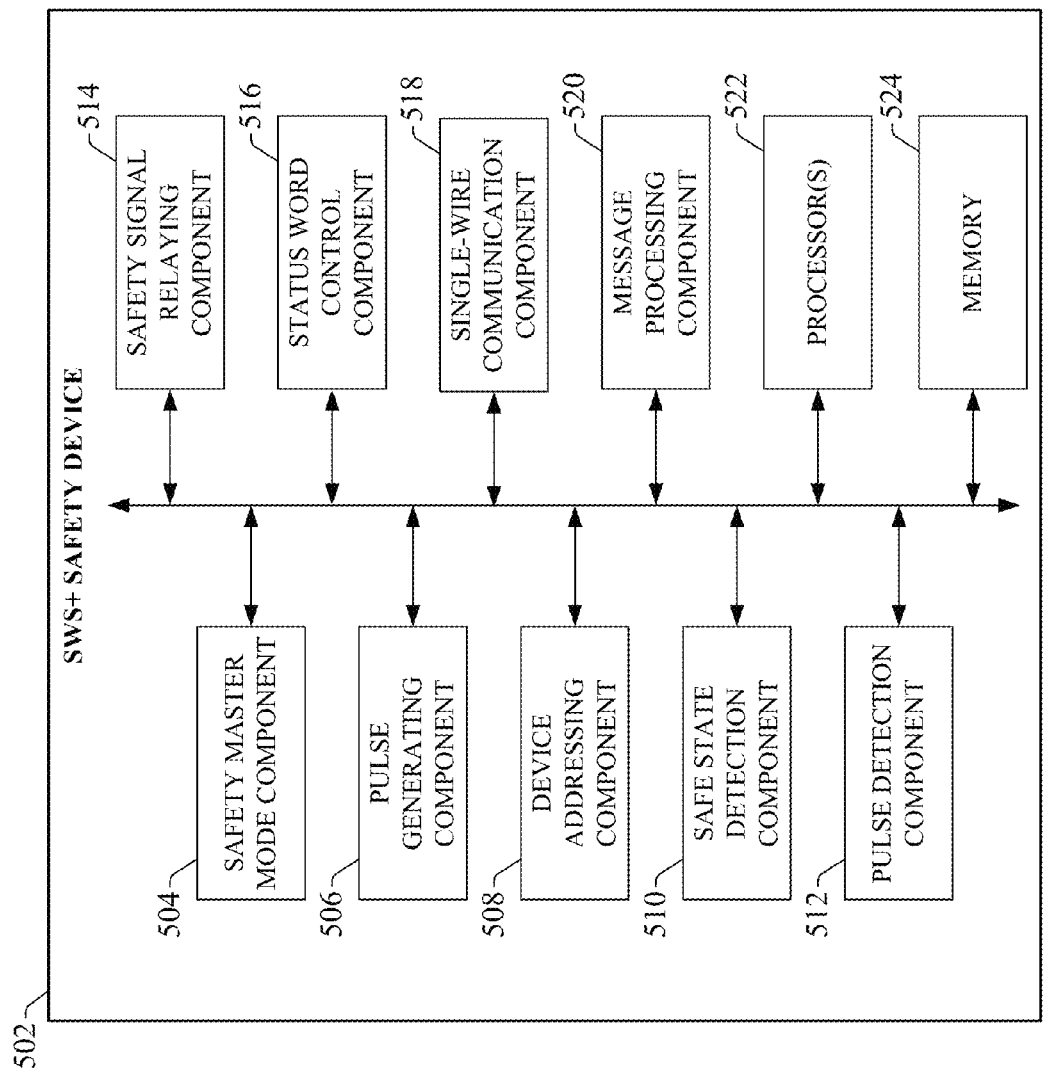
FIG. 5 is a block diagram of an example SWS+ safety device.

FIG. 5 is a block diagram of an example SWS+ safety device 502 according to one or more embodiments of this disclosure. SWS+ safety device 502 can comprise substantially any type of safety input device, including but not limited to an emergency stop pushbutton, a light curtain, photo sensor, a safety mat, a safety door switch (e.g., a proximity switch or reed switch), an emergency pull cord device, a laser scanner, or other type of safety input device.

SWS+ safety device 502 can include a safety master mode component 504, a pulse generating component 506, a device addressing component 508, a safe state detection component 510, a pulse detection component 512, a safety signal relaying component 514, a status word control component 516, a single-wire communication component 518, a message processing component 520, one or more processors 522, and memory 524. In various embodiments, one or more of the safety master mode component 504, pulse generating component 506, device addressing component 508, safe state detection component 510, pulse detection component 512, safety signal relaying component 514, status word control component 516, single-wire communication component 518, message processing component 520, the one or more processors 522, and memory 524 can be electrically and/or communicatively coupled to one another to perform one or more of the functions of the SWS+ safety device 502. In some embodiments, components 504, 506, 508, 510, 512, 514, 516, 518, and 520 can comprise software instructions stored on memory 524 and executed by processor(s) 522. SWS+ safety device 502 may also interact with other hardware and/or software components not depicted in FIG. 5. For example, processor(s) 522 may interact with one or more external user interface devices, such as a keyboard, a mouse, a display monitor, a touchscreen, or other such interface devices.

Safety master mode component 504 can be configured to control whether the SWS+ safety device 502 operates as a safety master device within a single-wire safety system. If the SWS+ safety device 502 operates in safety master mode, the device 502 will generate the pulsed safety signal to be placed on the single-wire communication channel. Alternatively, if the SWS+ safety device 502 does not operate in safety master mode, the device 502 will receive the pulsed safety signal from an upstream safety device via the single-wire communication channel and, if the safety device 502 is not in a safe state, relay the pulse signal to the next downstream device on the safety circuit. In one or more embodiments, the safety master mode component 504 can switch the SWS+ safety device to safety master mode in response to detecting the presence of a terminator on the device's single-wire safety channel input terminal.

The pulse generating component 506 can be configured to generate the pulse pattern (e.g., pulse signal 302 of FIG. 3 or another pattern) and output the pulse pattern on the device's single-wire safety channel output terminal if the device 502 is operating in safety master mode. The device addressing component 508 can be configured to set an address for the SWS+ safety device 502, and to report this address to other devices on the safety circuit via messages sent over the single-wire communication channel. The safe state detection component 510 can be configured to determine whether the SWS+ safety device 502 is in its safe state. The conditions for identifying the safe state of the SWS+ safety device depend on the type of safety device. For example, a door-mounted reed switch is considered to be in its safe state when the switch is not in proximity to its corresponding magnet, indicating that the safety door on which the switch is mounted is opened. In another example, a light curtain is considered to be in its safe state when objects are detected between the light curtain's transmitter and receiver photo-arrays.

Pulse detection component 512 can be configured to identify presence of the defined pulse pattern on the device's single-wire safety channel input terminal. The safety signal relaying component 514 can be configured to relay the pulsed safety signal from the single-wire safety channel input terminal to a single-wire communication output terminal for transmission to the next downstream device if certain defined conditions are satisfied. The defined conditions can include at least detection of a valid pulse pattern on the safety signal received at the safety input terminal (as determined by the pulse detection component 512), and verification that the SWS+ safety device is not in its safe state (as determined by the safe state detection component 510).

Status word control component 516 can be configured to set status bits and words based on detected statuses of the SWS+ safety device, and to send the status bits and words to other devices on the safety circuit via the single-wire communication channel. Single-wire communication component 518 can be configured to coordinate bi-directional communication on the single-wire communication channel. Message processing component 520 can be configured to process input messages received on either the single-wire safety channel input terminal or the single-wire safety channel output terminal, and to send output messages on either the input or output terminal. As will be described in more detail herein, input messages received on the input or output terminal via the single-wire channel can include, but are not limited to, requests to provide device information, requests for the safety device's signature, enumeration messages, or other such input messages. Output messages can include, but are not limited to, response messages including the safety device's signature or device information, enumeration messages, device presence messages, relayed requests for another device's information, or other such messages.

The one or more processors 522 can perform one or more of the functions described herein with reference to the systems and/or methods disclosed. Memory 524 can be a computer-readable storage medium storing computer-executable instructions and/or information for performing the functions described herein with reference to the systems and/or methods disclosed.

Figure 6:
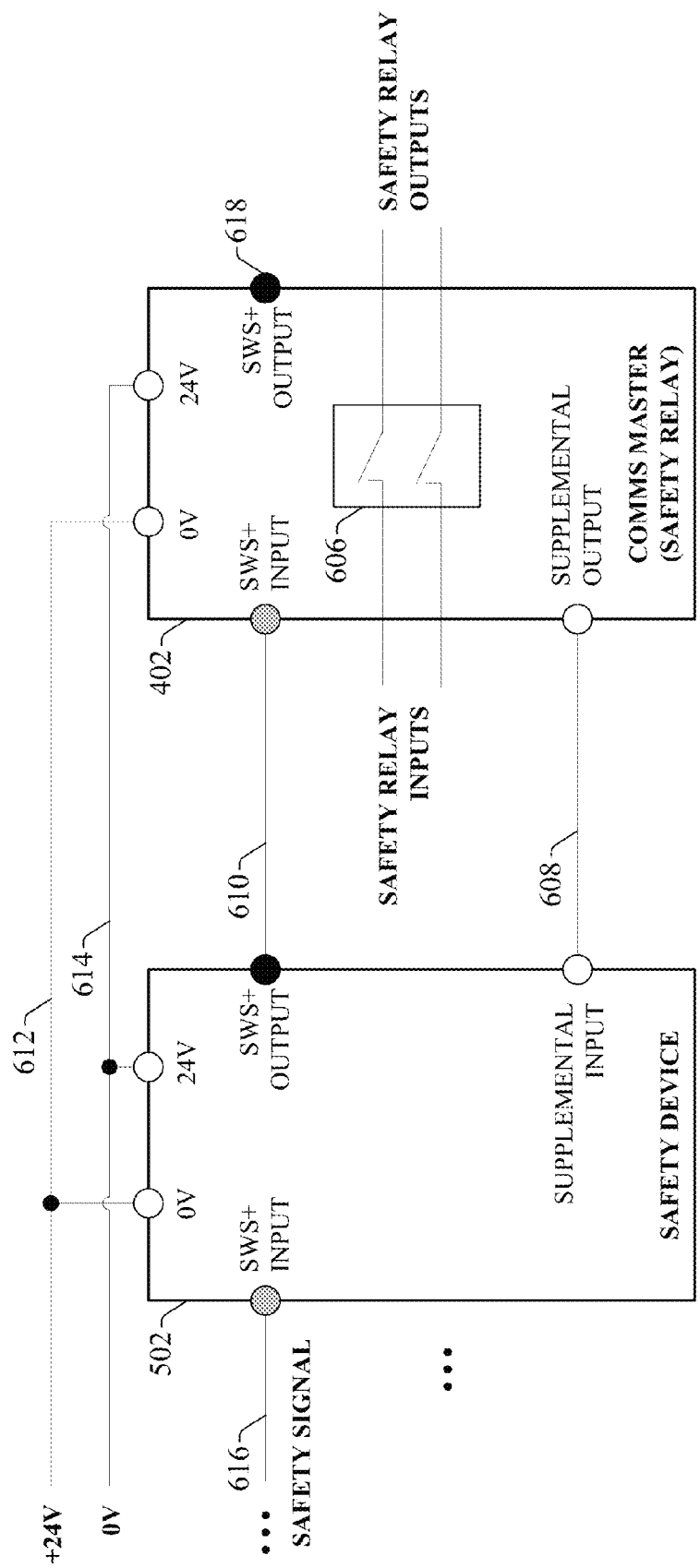
FIG. 6 is an example wiring schematic illustrating connections between a safety device and a comms master.

FIG. 6 is an example wiring schematic illustrating connections between a safety device and a comms master. In this example, safety device 502 includes terminals for 0V and 24 VDC power, an SWS+ INPUT terminal, and an SWS+ OUTPUT terminal. During normal operation (SWS mode), the SWS+ INPUT terminal receives the pulsed safety signal from an upstream safety device on line 616, and the SWS+ OUTPUT terminal sends the safety signal to the next downstream device on line 610 (in the illustrated example, the next downstream device is the comms master 402; in the present disclosure, the terms "upstream" and "downstream"

are relative to the direction of the pulsed safety signal from the safety master to the comms master). Safety device 502 will only send the pulse signal out on the SWS+ OUTPUT terminal if the valid pulse pattern is present on the SWS+ INPUT terminal and the safety device 502 is not in the safe state. During diagnostic or configuration mode, safety device 502 uses the SWS+ INPUT and SWS+ OUTPUT terminals to exchange configuration or diagnostic messages with adjacent devices over lines 616 and 610 (the single-wire channel) in a bi-directional manner, as will be described in more detail herein.

FIG. 6 depicts safety device 502 as being wired for normal operation, whereby the safety device 502 resides between two other devices on the safety circuit. However, if safety device 502 is the last device on the safety circuit, such that there are no other upstream devices from which to receive the safety signal, a terminator can be connected to the SWS+ INPUT terminal. When this terminator is detected on the SWS+ INPUT terminal, safety device 502 is configured to operate in safety master mode, whereby the safety device generates the pulsed safety signal for the safety circuit, as will be described in more detail herein.

Comms master 402 includes terminals for 0V and 24 VDC power, an SWS+ INPUT terminal for receiving the pulse signal on line 610, and an SWS+ OUTPUT terminal 618 for sending the pulse signal to another device (e.g., an expansion relay module or other device). Since the comms master 402 is typically a safety relay configured to comply with the single-wire communication protocol described herein, the comms master 402 also includes one or more safety contacts 606 for controlling application of machine power to one or more industrial machines or devices.

In some embodiments, comms master 402 may also include a SUPPLEMENTAL OUTPUT terminal for sending supplemental messages to safety devices (or other types of devices) on the safety circuit via a dedicated line 608 that is separate from the SWS channel. These messages can be received via SUPPLEMENTAL INPUT terminal on safety device 502. For example, comms master 402 may use the SUPPLEMENTAL OUTPUT terminal to send lock commands to safety input devices that have integrated mechanical locks; e.g., remotely actuated door locks that include proximity switches to determine when the door is in the closed position. In such scenarios, the comms master can be programmed to actuate the locks in response to defined conditions to prevent the doors from being opened during dangerous operations. In another example, the comms master 402 may be configured to output a signal on the SUPPLEMENTAL OUTPUT terminal that, when received by the safety input devices, forces the safety input devices to switch from operational mode to the safe state (configuration or diagnostic mode). The SUPPLEMENTAL OUTPUT terminal can also send instructions to safety output devices. For example, comms master may output a sign al on the SUPPLEMENTAL OUTPUT terminal directed to a safety contactor, where the signal indicates to the safety contactor that energization of its contactors is enabled. In such scenarios, the safety contactor may be configured to only permit energization of its contactors if the appropriate enable signal is seen on its SUPPLEMENTAL INPUT terminal.

Figure 7:
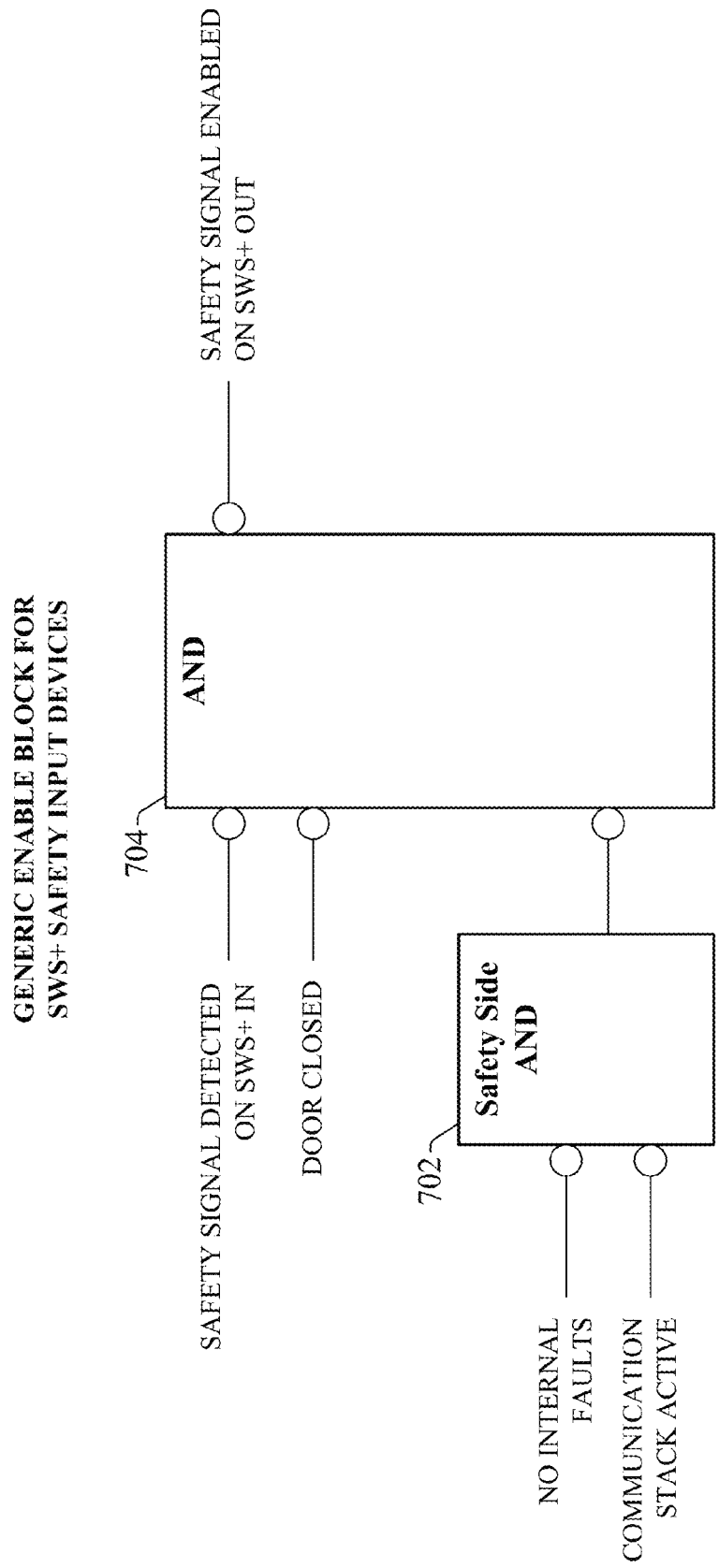
FIG. 7 is an example logic diagram illustrating enable conditions for an SWS+ OUTPUT terminal of a single-wire safety input device.

FIG. 7 is an example logic diagram illustrating the enable conditions for outputting the safety signal on the SWS+ OUTPUT terminal of safety device 502. The illustrated logic diagram can be implemented, for example, by the safety signal relaying component 514 illustrated in FIG. 5. In this example, the safety device is assumed to be a safety door switch that uses a proximity switch or reed switch to determine when a safety door or gate is in the closed position. AND block 704 determines whether the safety signal is detected on the safety device's SWS+ INPUT terminal, and whether the safety device registers its safety function is valid (in this example, the safe state is active when the door is closed) and whether the SUPPLEMENTAL OUTPUT is requesting the device to be in the safe state. The safety side AND block 702 determines whether any internal device faults are active, and whether the device's communication stack has become active. If no (a) internal faults are detected, (b) the communication stack is active, (c) the door is closed, (d) the SUPPLEMENTAL OUTPUT is not requesting a safe state, and (e) the safety signal is detected on the SWS+ INPUT terminal, the safety device enables the safety signal on the SWS+ OUTPUT terminal, thereby passing the received pulsed safety signal to the next sub-link of the single-wire safety channel.

Figure 8:
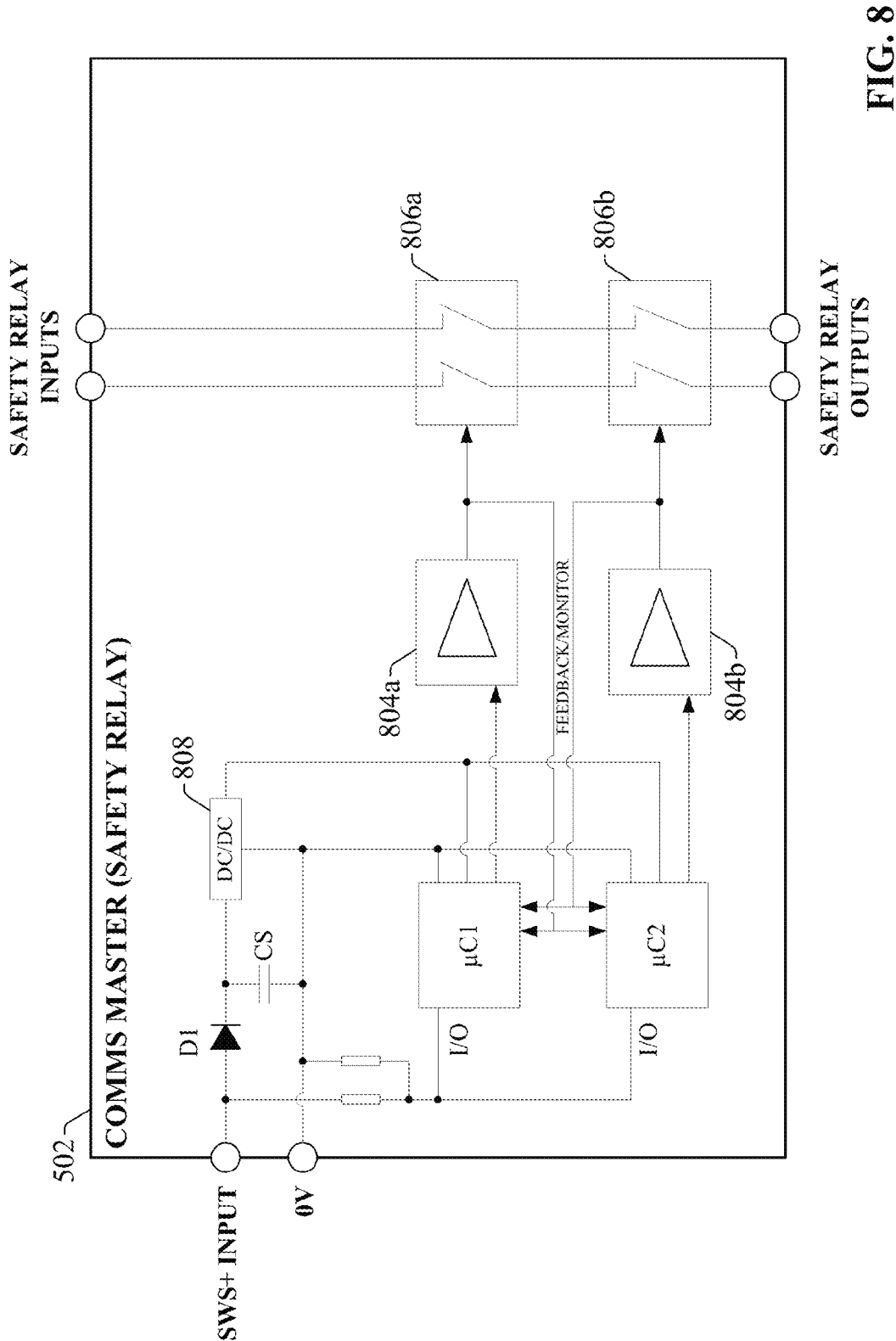
FIG. 8 is an example generalized electrical schematic that can be used to confirm receipt of a defined pulse signal on an SWS+ INPUT terminal of a comms master device.

FIG. 8 is an example generalized electrical schematic that can be used to confirm receipt of the defined pulse pattern on the SWS+ INPUT terminal of the comms master 402. The example schematic can reliably verify the pulse signal using independent redundant verification. For clarity, the circuitry used to control diagnostic and configuration message communication is omitted from FIG. 8, and the illustrated schematic only includes elements for confirming receipt of the defined pulse signal. It is to be appreciated that the schematic depicted in FIG. 8 is only intended to be exemplary, and that any suitable electrical design for controlling safety relay outputs based on presence or absence of a specified pulse pattern is within the scope of one or more embodiments of this disclosure.

The comms master 402 receives the pulsed safety signal via the SWS+ INPUT terminal, and splits the received signal between a power storage capacitor CS (e.g., an electrolyte capacitor) and two microcontrollers μC1 and μC2. A DC/DC converter 808 connected to the storage capacitor CS generates a supply power having a supply voltage of 5V from the input 24V pulse train signal. The 0V terminal receives the 0V ground potential. While all safety input devices on the safety circuit are in their respective safe states, comms master 402 is provided with the supply voltage via the diode D1, the storing capacitor CS and the DC/DC converter 808, representing the necessary operating voltage. When powered by the output of the DC/DC converter 808, the microcontrollers μC1 and μC2 are activated. If these microprocessors now additionally detect a valid pulse code at their I/O terminals, the driver units 804a and 804b are controlled to trigger the relay pairs 806a and 806b for providing a switched-on status of the safety relay outputs. Consequently, SWS+ INPUT must receive a voltage different from 0V, which additionally must have a valid pulse pattern in order to cause the comms master 402 to output a valid output signal.

With this safety device topology, it is possible to fulfill the requirements of category 4 of the safety standards using only a single-channel connection. The high safety category is achieved due to the predetermined pulse pattern conveyed on the signal and the two-channel evaluation of this signal using both microprocessors. Furthermore, by feeding back the output signals of the driver units 804a and 804b to both microprocessors in a parallel way, a plausibility check can be performed to ensure fault-free operation of the microprocessors.

When any of the safety input devices on the safety circuit go to the safe state (e.g., a light curtain is broken, an emergency stop pushbutton is pressed, etc.), the pulse signal is no longer received at the SWS+ INPUT terminal of the comms master 402, causing relay pairs 806a and 806b to open, thereby disconnecting power from the industrial devices fed by the safety relay outputs. Opening of the safety relay outputs is triggered when either of two criteria is met—when one or both of microcontrollers µC1 and µC2 do not detect a valid pulse pattern on their input terminals, or when the microcontrollers do not receive a supply voltage from DC/DC converter 808. Thus, a failure of one of the microcontrollers, one of the driver units 804a and 804b, or one of the relay pairs 806a and 806b does not prevent safe operation of the comms master 402.

Figure 9:
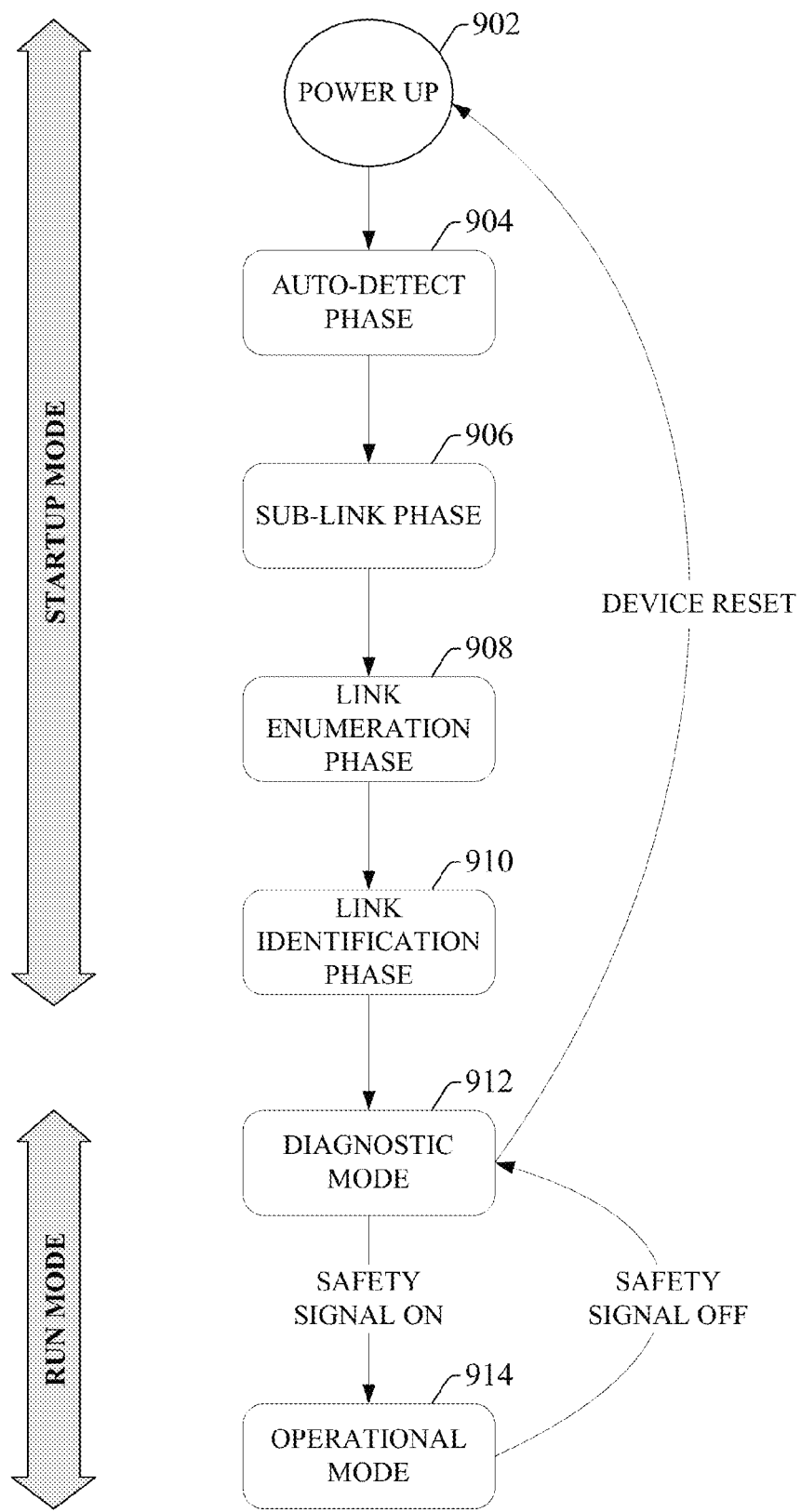
FIG. 9 is a state diagram illustrating the sequence of operations for a single-wire safety architecture.

FIG. 9 is a state diagram illustrating the sequence of operations for a single-wire safety architecture according to one or more embodiments. The operations can be classified according to startup mode operations (phases 902-910) and run mode operations (phases 912-914). FIG. 9 provides a general overview of the sequence of events during startup and operation of the single-wire safety circuit. The individual phases will be described in more detail herein. Startup mode begins with power up 902, during which power is applied to the safety input devices and comms master device comprising the single-wire safety circuit. As the devices on the circuit are powered up, the system enters the auto-detect phase, during which each device initializes, identifies adjacent devices on the circuit, and reports its presence to the adjacent devices. When two adjacent devices have detected each other, the sub-link phase 906 is entered, during which a communication sub-link between the two adjacent devices is established. As will be described in more detail herein, establishment of sub-links between adjacent devices is performed asynchronously, and it is not necessary for the comms master to be powered up before two adjacent safety input devices can establish a sub-link with one another. By allowing adjacent devices to establish sub-links asynchronously as they are powered up and identified, regardless of the state of the comms master, the total SWS+ link (comprising all sub-links between adjacent devices) can be established quickly.

When at least the sub-link between the comms master and its adjacent safety input device has been established, the system enters the link enumeration phase 908, during which the comms master addresses each device on the system. As will be described in more detail herein, the comms master may begin enumerating devices before all sub-links on the circuit have been established, provided there is a path of established sub-links between the comms master and at least one safety input device. Thus, there may be some overlap between the sub-link phase 906 and the link enumeration phase 908. After the link enumeration phase 908, the system enters the link identification phase 910, during which the comms master collects device information from each safety input device on the circuit, including but not limited to device type or model information, vendor information, hardware and software revision information, device data signatures, etc. The comms master records this device information on local memory.

Once phases 902-910 have completed, the system can enter normal operation (run mode). During diagnostic mode 912, the system determines whether the pulsed safety signal is present at the comms master, indicating that all safety input devices on the circuit are in their respective operation states. If the safety signal is detected ("safety signal on"), the system enters operational mode 914, during which the comms master allows its relays (e.g., relay pairs 806a and 806b of FIG. 8) to be closed, providing power to the industrial machines and devices connected to the safety relay outputs. If the safety signal is no longer detected at the comms master ("safety signal off"), indicating that one or more of the safety input devices has entered the safe state, the system transitions back to diagnostic mode 912, during which the comms master begins polling the safety input devices individually to determine which device has been switched and to collect other diagnostic information, as will be described in more detail herein. Message exchange between devices during diagnostic mode 912 is performed over the same single-wire communication channel over which the pulsed safety signal is sent. If a safety device on the circuit is reset (e.g., power is cycled on the device), steps 902-910 are repeated for that device.

Figure 10A:
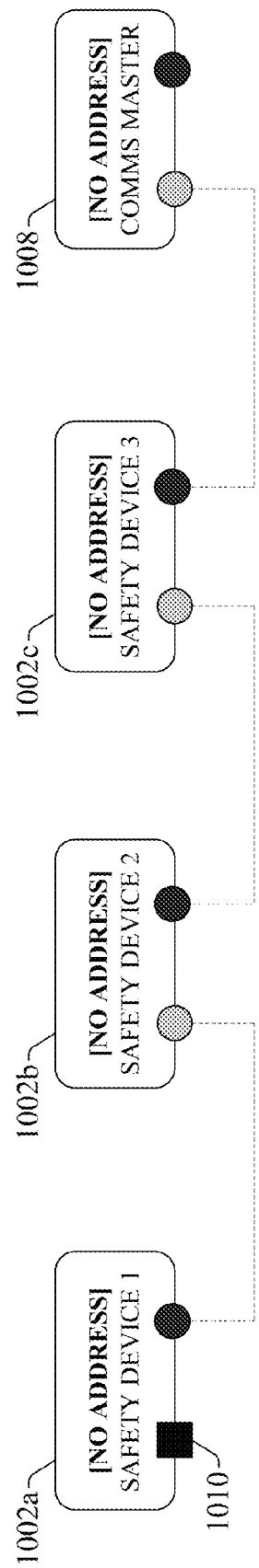

FIG. 10A-10E are block diagrams illustrating the power up, auto-detection, and sub-link phases according to one or more embodiments. FIG. 10A is a simplified block diagram of an example single-wire safety circuit prior to initial power up. The safety circuit includes three safety devices 1002a-1002c and a comms master 1008. Safety devices 1002a-1002c can comprise any types of safety input devices compatible with the single-wire communication protocol described herein, including but not limited to safety door switches, light curtains, photoelectric sensors, laser scanners, safety mats, emergency stop pushbuttons or pull cord devices, or other such safety devices.

The SWS+ OUTPUT terminal of each device on the safety circuit (depicted in black in FIG. 10A) is wired to the SWS+ INPUT terminal (in grey) of the next downstream device. Safety device 1002a, which is the last device on the safety circuit, is fitted with a terminator 1010 on its SWS+ INPUT terminal. As the last device, safety device 1002a will operate as the safety master for the single-wire safety circuit by generating the pulse pattern to be placed on the channel. The safety master device (safety device 1002a) and the comms master 108 act as anchors for the single-wire safety circuit.

Devices 1002a-1002c and 1008 initially lack SWS addresses prior to being powered up. As the devices are powered up, sub-links between adjacent devices are established in a piecemeal fashion depending on the order in which the devices become active. Turning to FIG. 10B, if safety device 1002b is the first device to power up, that device outputs an "I am here" (IAH) signal on its SWS+ INPUT terminal, sending the IAH message (labeled "1" in FIG. 10B) via the single-wire channel to the SWS+ OUTPUT terminal of the next upstream device (device 1002a). Since safety device 1002b has not yet obtained an address, the IAH signal is sent with a 0×FF address packet. Since safety device 1002a has not yet powered up, safety device 1002b does not yet receive a response to the IAH signal from that device. Safety device 1002b also begins listening for incoming IAH signals on its SWS+ OUTPUT terminal.

In this example, safety device 1002c is the second device to power up, as shown in FIG. 10C. As with safety device 1002b, safety device 1002c begins sending an IAH message with a 0×FF address packet (labeled "2" in FIG. 10C) to the next upstream device—safety device 1002b—via the single-wire channel. Since safety device 1002b is active, it responds to the IAH message received from safety device 1002c with its own IAH message (labeled "3" in FIG. 10C). Safety device 1002b outputs this response IAH message on its SWS+ OUTPUT terminal, causing the response message to be sent via the single-wire channel to safety device 1002c. The single-wire communication components 518 of the respective safety devices coordinate the sending and receiving of the messages bi-directionally on the single-wire channel. Meanwhile, safety device 1002*b* continues to send its IAH message to safety device 1002*a*, which has not yet become active.

Once IAH messages 2 and 3 have been exchanged, the sub-link between safety devices 1002*b* and 1002*c* (labeled sub-link 2) becomes active and IAH packets and responses continue to be exchanged between those two devices until the entire link (comprising all sub-links between the safety master and the comms master) becomes active. The IAH packets between safety devices 1002*b* and 1002*c* continue to be sent with 0×FF address packets until the devices are addressed during the enumeration phase, which will be initiated by the comms master 1008 after that device becomes active and establishes a sub-link with its nearest safety device.

Turning to FIG. 10D, safety device 1002*a* is the third device to power up, causing that device to detect the IAH message that safety device 1002*b* has been sending since its activation. Upon detection of this IAH message, safety device 1002*a* sends an IAH response (labeled "4") to safety device 1002*b*, and the sub-link between safety devices 1002*a* and 1002*b* (sub-link 3) is established. Since the SWS+ INPUT terminal of safety device 1002*a* has been fitted with terminator 1010, that device does not attempt to output an IAH message on that terminal.

Finally, as illustrated in FIG. 10E, the comms master 1008 is the fourth and last device on the circuit to power up. Upon activation, comms master 1008 sends its own IAH message (labeled "5") to device 1002*c* via the single-wire channel. Safety device 1002*c* responds with its own IAH message (labeled "6"), causing the sub-link between those two devices (sub-link 1) to be established. Once sub-link 1 has been established, comms master 1008 can initiate the enumeration phase and begin enumerating the safety devices 1002*a*-1002*c*.

By allowing safety devices 1002*a*-1002*c* to begin establishing sub-links between one another as they become active without waiting for the comms master 1008 to power up, the complete communication link between the safety master 1002*a* and comms master 1008 can be established quickly, since some or all of the sub-links between safety devices 1002*a*-1002*c* may already be established when the comms master 1008 becomes active. It is to be appreciated that the order of activation depicted in FIGS. 10A-10E is only intended to be exemplary, and that the comms master 1008 is not required to be the last device to be activated. As will be described below, once sub-link 1 is established between comms master 1008 and its adjacent safety device 1002*c*, the comms master 1008 will initiate the enumeration phase and begin assigning addresses to the safety devices on the safety circuit. The comms master 1008 can begin enumerating the safety devices even if some sub-links have not yet been established (e.g., in the event that comms master 1008 becomes active before one or both of safety devices 1002*a* and 1002*b* have powered up), such that the comms master 1008 enumerates each safety device when a communication path between the comms master 1008 and the safety device becomes available.

Safety input devices that are compliant with the single-wire safety protocol described herein can automatically configure themselves as either a normal safety input device or as a safety master device. In this regard, the safety master mode component 504 of the safety input devices can detect the presence of a terminator (e.g., terminator 1010) on the SWS+ INPUT terminal, and cause the safety input device to switch to safety master mode operation if the terminator is detected. Since all compliant safety input devices are capable of operating in safety master mode, each device also includes a pulse generating component 506 configured to generate the defined pulse pattern and to output a safety signal modulated with the pulse pattern on its SWS+ OUTPUT terminal. The pulse generating component 506 is activated by the safety master mode component 504 based on presence of the terminator on the SWS+ INPUT terminal.

Upon establishing an active sub-link, the comms master 1008 initiates the enumeration phase, during which the safety devices 1002*a*-1002*c* are assigned addresses. FIGS. 11A-11F are block diagrams illustrating the enumeration phase according to one or more embodiments. The example illustrated in FIGS. 11A-11F assumes that all sub-links have been established at the time the enumeration phase is initiated (that is, the comms master 1008 is the last device on the circuit to become active). However, in one or more embodiments the comms master 1008 can begin enumerating when sub-link 1 is established, even if other sub-links are not yet active, as will be described in more detail below.

Figure 11A:
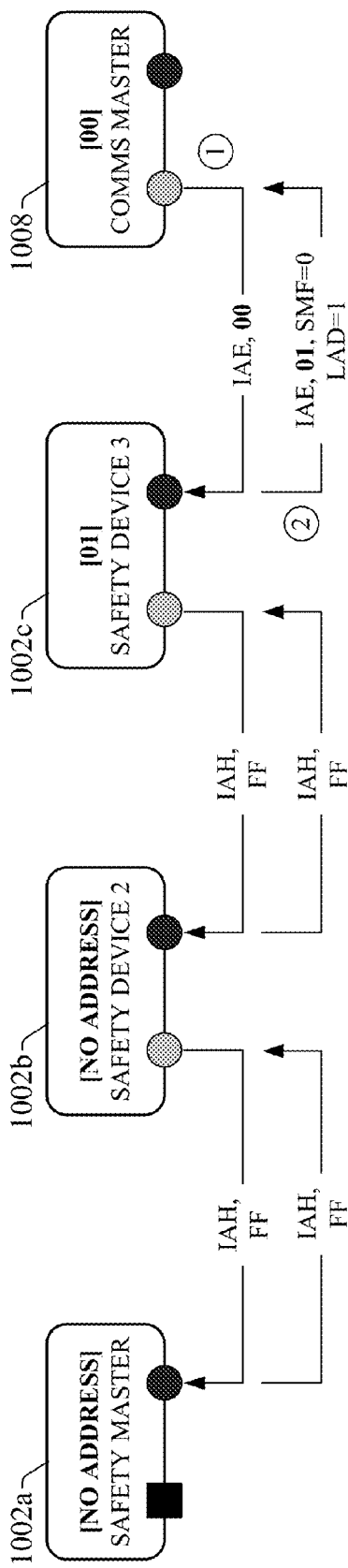

When sub-link 1 has been established between the comms master 1008 and its nearest safety device (safety device 1002*c*), comms master 1008 assigns address 00 to itself, ceases transmission of its IAH message, and sends an "I am enumerating" (IAE) message to safety device 1002*c* together with its address of 00, as shown in FIG. 11A (the IAE message is labeled "1"). Comms master 1008 outputs this IAE message on its SWS+ INPUT terminal, sending the message to safety device 1002*c* via the single-wire communication channel. Upon receipt of the IAE message, safety device 1002*c* reads the address included in the message (00), increments this address by one (01), and assigns itself this incremented address. Safety device 1002*c* also determines whether the safety master 1002*a* has been found. In the example depicted in FIG. 11A, although the sub-link to the safety master 1002*a* has been established, the safety master has not yet been addressed and therefore has not been found at this stage. Accordingly, safety device 1002*c* sets a "safety master found" (SMF) bit to 0, indicating that the safety master has not yet been found. Also, since no other devices have been addressed at this stage, safety device 1002*c* sets a "last addressable device" (LAD) value to "1" (representing its own address).

After programming itself with its new address and determining the SMF and LAD values as described above, safety device 1002*c* then sends a return IAE message (labeled "2" in FIG. 11A) to the comms master 1008 over the single-wire channel (output on the safety device's SWS+ OUTPUT terminal). The return IAE message includes the safety device's self-assigned address (01), the SMF value (0), and the LAD value (1). In this way, the comms master 1008 remains updated on the enumeration progress.

In one or more embodiments, the comms master 1008 will send the IAE message (message 1) once, and await for the response message (message 2). If the response message is not received at the comms master's SWS+ INPUT terminal within a defined period of time, the comm master 1008 will resend the IAE message. This sequence will repeat until the response IAE message is received at the comms master 1008, or until a defined number of allowable re-sends has been reached, causing a time-out error. Once comms master receives the response IAE message from safety device 1002*c*, the two devices will continue to exchange their IAE message and response until the safety master (safety device 1002*a*) is found.

Figure 11B:
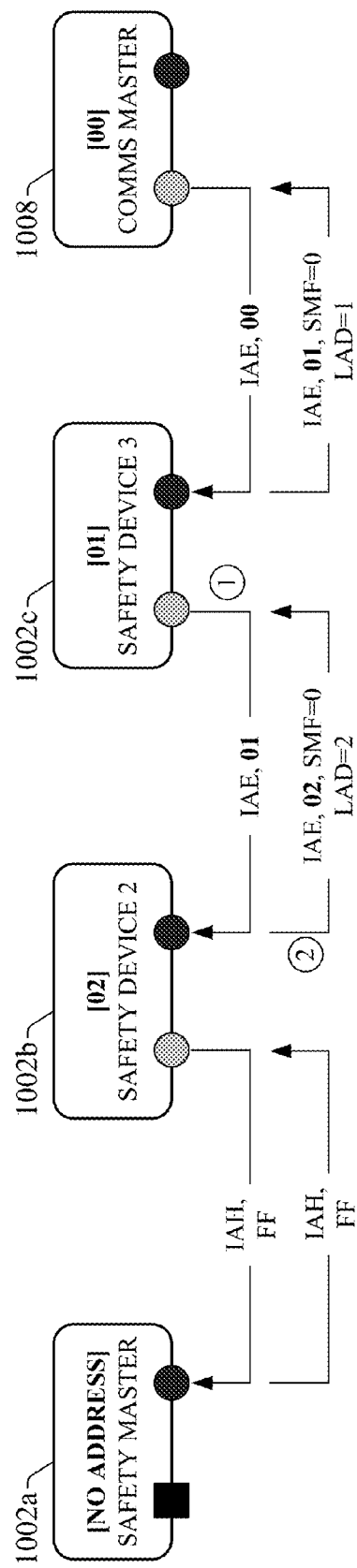

Since sub-link 2 between safety device 1002*c* and 1002*b* is active at this time, safety device 1002*b* also ceases transmission of its IAH message and sends an IAE message to safety device 1002*c* via the single-wire channel, as shown in FIG. 11B. This IAE message is labeled "1" in FIG. 11B. The IAE message—which includes the address of the sending device—is output on the SWS+ INPUT terminal of safety device 1002*c*, and received at the SWS+ OUTPUT terminal of safety device 1002*b*. Upon receipt of the IAE message from safety device 1002*c*, safety device 1002*b* performs similar operations to those performed by safety device 1002*c* in response to receipt of the IAE message from the comms master 1008. That is, safety device 1002*b* reads the address contained in the received IAE message (01) and assigns itself the next incremental address (02). Safety device 1002*b* then sends a response IAE message (labeled "2" in FIG. 11B)—including its newly assigned address and appropriate SMF and LAD values—to safety device 1002*c* via the single-wire channel. At this stage, the safety master (safety device 1002*a*) has still not been found (SMF=0), and the last addressable device is the device addressed 02 (LAD=2).

Figure 11C:
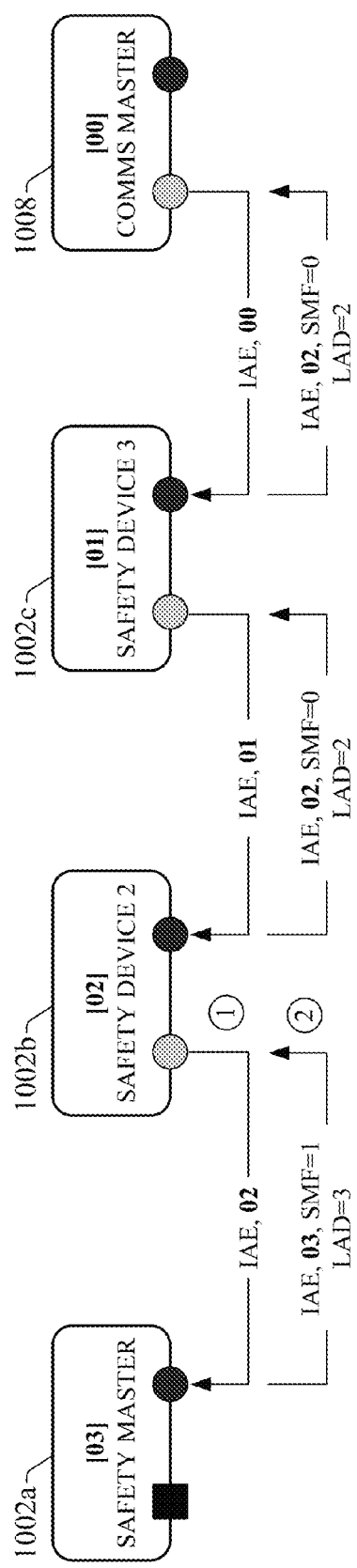

As shown in FIG. 11C, upon receipt of the response IAE message from safety device 1002*b*, safety device 1002*c* updates its own IAE response message to comms master 1008 to report that address 02 has been configured and to reflect the new last addressable device by setting LAD=2, ensuring that the comms master is kept updated on the enumeration process. Meanwhile, the newly addressed safety device 1002*b* determines that sub-link 3 between itself and the safety master 1002*a* is established, and therefore replaces the IAH message being output on its SWS+ INPUT terminal with an IAE message (labeled "1 in FIG. 1C) directed to the safety master 1002*a* over the single-wire channel. In response, the safety master 1002*a* sets its own address to 03 and sets its SMF value to 1, indicating that the safety master has been found. Safety master 1002*a* then outputs a response IAE message (labeled "2" in FIG. 11C) on its SWS+ OUTPUT terminal directed to safety device 1002*b*. The response IAE message from the safety master 1002*a* reports its address (03), a value of SMF=1, and a value of LAD=3.

Figure 11D:
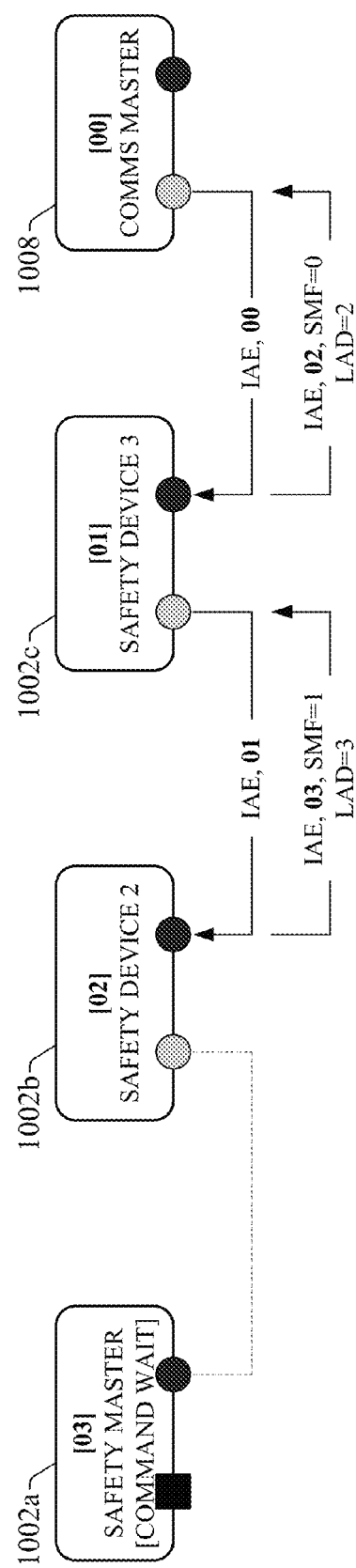

In general, all devices on the safety circuit will continue to exchange their IAE messages and responses until detecting that SMF=1, at which time the devices will enter a "command wait" mode. Accordingly, when safety master 1002*a* receives the IAE message from safety device 1002*b* and programs its address, the safety master 1002*a* enters the "command wait" mode, as shown in FIG. 11D. Upon receipt of the IAE response message from safety master 1002*a*, safety device 1002*b* reads the SMF value reported by the safety master, and modifies its own IAE response message to safety device 1002*c* to reflect the new last addressable device (LAD=3) and the fact that the safety master has been found (SMF=1). As shown in FIG. 11E, safety device 1002*b* then enters "command wait" mode, while safety device 1002*c* modifies its IAE response message to the comms master 1008 to set SMF=1 and LAD=3, thereby informing the comms master that the safety master has been found. As shown in FIG. 11F, safety device 1002*c* then enters "command wait" mode, at which stage all safety devices 1002*a*-1002*c* are awaiting instructions from the comms master 1008, and the complete SWS link between the safety master 1002*a* and the comms master 1008 is formed. The comms master 1008 records the device address information on local memory.

As illustrated in the sequence described above in connection with FIGS. 11A-11F, each of the three sub-links between devices is substantially independent of the other sub-links. As such, the comms master can begin the enumeration phase even if some sub-links have not yet been established, provided sub-link 1 between the comms master and its nearest safety device is active. Although the example illustrated in FIGS. 11A-11F assumes that all sub-links have been established at the time the enumeration phase is initiated (that is, the comms master 1008 is the last device on the circuit to become active), it is possible that the comms master will power up before one or more of the safety devices on the circuit become active in some scenarios. For example, if safety device 1002*c* and comms master 1008 power up before safety devices 1002*a* and 1002*b*, sub-link 1 between the comms master 1008 and safety device 1002*c* will be established before sub-link 2 (between safety devices 1002*b* and 1002*c*) and sub-link 3 (between safety master 1002*a* and safety device 1002*b*) are active. Nevertheless, comms master 1008 can initiate enumeration of safety device 1002*c* while sub-links 2 and 3 are in the process of becoming active. Once enumerated, the non-addressed IAH message being sent from safety device 1002*c* to safety device 1002*b* is changed to an addressed IAE message while awaiting power-up of safety device 1002*b*. When safety device 1002*b* becomes active and sub-link 2 is established (upon safety device 1002*c* receiving an IAH message from safety device 1002*b*, as illustrated in FIG. 10C), safety device 1002*b* receives the IAE message from safety device 1002*c* and initiates its enumeration sequence as previously described. This process is repeated for the safety master 1002*a* when that device becomes active. Enumerating devices on the safety circuit as the devices and sub-links therebetween become available, rather than waiting for the complete communication link between the safety master and the comms master to be established before initiating enumeration, can reduce latency between power-up and device enumeration.

Figure 12A:
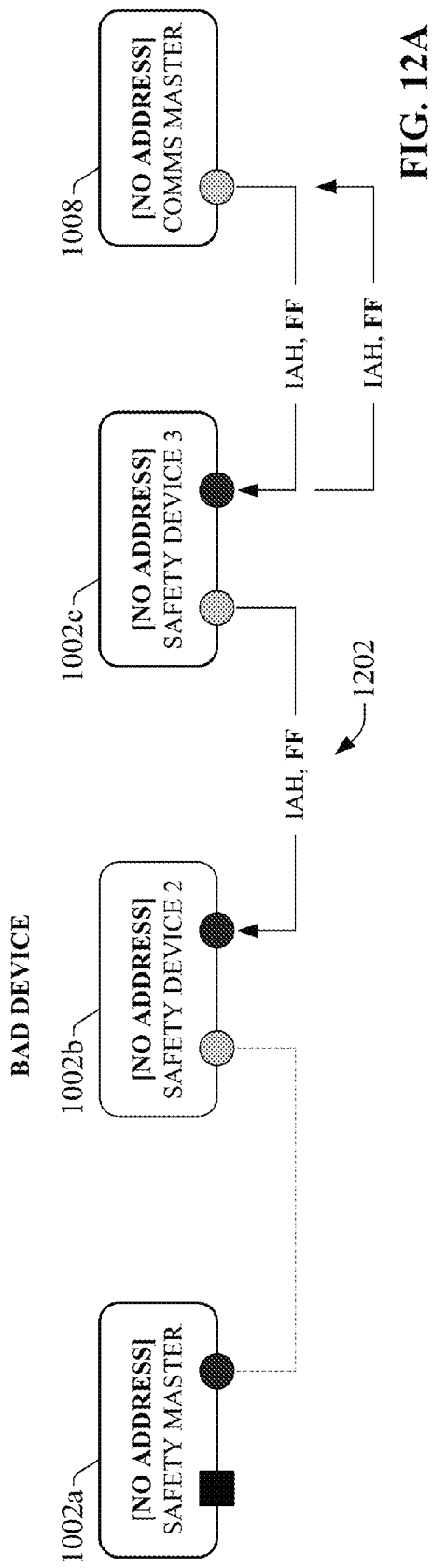

Since the safety devices provide the comms master with updated information regarding the progress of sub-link creation, the architecture described above can allow problems with sub-link start-up to be diagnosed without requiring a time-out. FIGS. 12A-12B are block diagrams illustrating diagnosis of a device failure according to one or more embodiments. In this example, safety devices 1002*a* and 1002*c* and comms master 1008 have powered up during the sub-link phase, but safety device 1002*b* has not activated due to a power issue, a device fault, or other issue. Since safety device 1002*c* and comms master 1008 are active, those devices exchange IAH messages as shown in FIG. 12A, thereby establishing the sub-link between those devices. However, faulty safety device 1002*b* does not respond to the IAH message 1202 sent by safety device 1002*c*. With the sub-link between the comms master and its nearest safety device established, the comms master 1008 initiates the enumeration phase, causing IAE messages to be exchanged between the comms master and safety device 1002*c*, as shown in FIG. 12B. As described above in connection with FIGS. 11A-11F, the response IAE message 1204 from safety device 1002*c* to comms master 1008 includes the newly configured address (01), the current SMF value (SMF=0, since the safety master 1002*a* has not yet been found), and the current LAD value (LAD=1).

Since safety device 1002*b* had not powered up and therefore does not respond to the IAH message sent by safety device 1002*c*, comms master 1008 and safety device 1002*c* will continue to exchange the IAE messages shown in FIG. 12B, indicating to the comms master that the safety device addressed 01 remains the last addressable device and that the safety master has not yet been found. One or both of these values may be displayed on the comms master 1008 as diagnostic data (e.g., as a digital display, via LED indictors, on an integrated monitor on the comms master, etc.), allowing a user to determine which device in the chain has failed to activate. In this example, since the comms master 1008 indicates address 01 as the last addressable device, the user is directed to the safety device following the first safety input device in the chain. The faulty device can be corrected or replaced without resetting the comms master 1108 or safety device 1002c, which continue to exchange their IAE messages while faulty safety device 1002b is being investigated and corrected. Note that any devices between the faulty device and the comms master 1008 can still be queried by the comms master, since those devices can be addressed and accessed without waiting for the faulty device to become active. Once safety device 1002b is fixed and becomes active, it will see the IAH message 1202 being sent by safety device 1002c and the sub-link will be created between 1002c and 1002b. Safety device 1002b will then respond to the next IAE message.

After all sub-links have been established and all devices on the safety circuit have been enumerated, the comms master 1008, if not connected to a SWS+ link before, initially has no record or history for the safety input devices on the circuit. The comms master 1008 is considered "unestablished" until it has collected device information from all safety input devices on the circuit and stored the information in memory. Accordingly, after the link enumeration phase has completed, the system enters the link identification phase, during which the comms master 1008 collects device information from the safety input devices via the single-wire channel FIGS. 13A-13D are block diagrams illustrating the link identification phase. As shown in FIG. 13A, the comms master 1008 initiates the link identification phase by sending a "get device identification" (GDI) message (labeled "1" in FIG. 13A) to its nearest safety input device (safety device 1002c) via the single-wire channel (that is, by outputting the GDI message on the SWS+ INPUT terminal of the comms master). The GDI message includes the address (01) of the safety device being polled by the comms master. In response to detecting this GDI message on its SWS+ OUTPUT terminal, safety device 1002c reads the address included in the message and, in response to determining that the address matches its own address, responds with a GDI response message (labeled "2" in FIG. 13A), which includes its address (01) and device information ("INFO"). In one or more embodiments, the device information can comprise a data block defined by the safety device and containing identification information for that device. For example, the device information can include one or more of a vendor identifier, a device type (e.g., light curtain, safety mat, emergency stop push button, laser scanner, etc.), a product code, a hardware revision number, a software revision number, a product name, or other such information. The device information provided by the safety device 1002c also includes a device signature that can subsequently be used by the comms master to identify the set of device information and to verify the identity of the safety device without the need to retrieve the device information a second time, as will be described in more detail herein.

Table 1 below shows an example set of device information data items that can be included in the GDI response message sent by the safety input devices. All device information data items are stored on the respective safety devices as read-only values, which are retrieved by the safety device and sent in the GDI response message when the GDI request is received from the comms master.

TABLE 1

Device Information (INFO)

| Device Attribute | Size (Bytes) | Range |
| --- | --- | --- |
| VendorID | 1 | 1-254 |
| DeviceType | 1 | |
| ProductCode | 1 | 1-254 |
| HardwareRevision | 1 | A-Z (A = 1) |
| SWMajorRevision | MS 4 bits | 1-15 |
| SWMinorRevision | LS 4 bits | 1-15 |
| ProductName | 32 | |
| ConfigurationSignature | 2 | 1-65535 |

Upon receipt of the GDI response message from safety device 1002c, comms master 1008 stores the device information in local memory in association with address 01, and polls address 02 for its device information, as shown in FIG. 13B. Comms master 1008 sends a GDI message directed to address 02 (labeled "1" in FIG. 13B) to safety device 1002c via the single-wire channel. Upon receipt of this message on its SWS+ OUTPUT terminal, safety device 1002c reads the address included in the GDI message and, in response to determining that the address does not match its own address, relays the GDI message (labeled "2" in FIG. 13B) to the next device in the safety circuit (safety device 1002b) by outputting the message on its SWS+ INPUT terminal. Determining that the address matches its own address (02), safety device 1002b sends a GDI response message (labeled "3" in FIG. 13B) back to safety device 1002c, which relays the response to the comms master 1008 as message "4". Comms master 1008 records the received device information for address 02, then polls address 03 (safety master 1002a) for its device information in a similar manner, as shown in FIG. 13C.

Another way for the comms master to retrieve GDI information from slave devices is to send one broadcast message and wait for responses from all devices. After the link enumeration phase has completed, the system enters the link identification phase, during which the comms master 1008 collects device information from the safety input devices via the single-wire channel. There are two methods that can be used for collecting this data and are explained herein.

One method that the comms master can use to collect device information from slave devices is to send a broadcast request. FIGS. 13E-13H are block diagrams illustrating the link identification phase. As shown in FIG. 13E, the comms master 1008 initiates the link identification phase by sending a "get device identification" (GDI) message (labeled "1" in FIG. 13E) to its nearest safety input device (safety device 1002c) via the single-wire channel (that is, by outputting the GDI message on the SWS+ INPUT terminal of the comms master). The GDI message contains a specific address (FF). In response to detecting this GDI message on its SWS+ OUTPUT terminal, safety device 1002c reads the address included in the message and, in response to determining that the address is a broadcast address (FF), responds with a GDI response message (labeled "2" in FIG. 13E), which includes its address (01) and device information ("INFO"). Device 1002c then relays the GDI broadcast message to the next device upstream in (labeled "1" in FIG. 13F), which is device 1002b. Device 1002b reads the address included in the message and, in response to determining that the address is a broadcast address, responds with a GDI response message (labeled "2" in FIG. 13F), which includes its address (02) and device information ("INFO"). Upon device 1002c receiving this response from device 1002b, it will relay the response untouched to comms master 1008 (message "3" in FIG. 13F). After sending the GDI response downstream, device 1002*b* then relays the broadcast message upstream (labeled "1" in FIG. 13G) to device 1002*a*. Device 1002*a* reads the address included in the message and, in response to determining that the address is a broadcast address, responds with a GDI response message (labeled "2" in FIG. 13G), which includes its address (02) and device information ("INFO"). Upon device 1002*c* receiving this response from device 1002*b*, it will relay the response untouched to comms master 1008 (labeled "3" in FIG. 13G). Devices 1002*b* and 1002*c* relay the message from 1002*a* untouched to the comms master 1008 ((labeled "3" and "4" in FIG. 13G).

Once device information has been collected for all safety input devices, including the safety master, comms master 1008 is considered established. The device information saved on the comms master 1008 can subsequently be used for diagnostic purposes in the event of a problem on the safety circuit. Since the established comms master now has the device information—including device signatures—for all safety input devices stored on local memory, the comms master can subsequently confirm the presence of the previously recognized safety devices without retrieving the entire set of device information from each device. Instead, the comms master 1008 need only request the device signatures from safety devices 1002*a*-1002*c* in order to verify that the expected safety devices are present.

For example, in the event that power is cycled on the established comms master 1008, the comms master will verify that device information has already been collected for the safety devices (that is, that the comms master has already been established), and proceed to confirm whether the previously collected device information is still valid by sending "get device signature" (GDS) messages to each device via the single-wire channel, starting with safety device 1002*c* as shown in FIG. 13D. In response to the GDS message (labeled "1" in FIG. 13D), safety device 1002*c* sends a GDS response message (labeled "2") including its address (01) and its device signature ("SIGNATURE"). Upon receipt of this response, the comms master 1008 verifies that the signature included in the GDS response message matches the previously collected device signature for address 01. This is repeated for each device, with the GDS messages and responses being relayed through the safety devices in a similar manner to the GDI messages until all devices on the circuit are verified as being the same devices that were identified during the link identification phase. Verifying the previously established safety devices using device signatures mitigates the need to re-collect the larger set of device identification data from each device, thereby minimizing bandwidth usage and initialization latency.

In the event that a safety input device on the safety circuit has been replaced with a new device during the time that the established comms master has been powered down, the comms master can detect that the device has been replaced by comparing the device signature contained in the new device's GDS response message with the previously recorded device signature for that device's address. Upon detecting the signature mismatch, the comms master 1008 can retrieve the device information for the new device by sending a GDI message directed to the new device's address.

Another way for the comms master to retrieve GDS information from slave devices is to send one broadcast message and wait for responses from all devices. The broadcast message method works the same as the GDI broadcast method described above.

FIGS. 14A-14C illustrate a scenario in which a safety device on a previously established safety link has been reset and cleared of its address. In this example, safety device 1002*b* has been reset on a previously established safety link. Upon powering back up, safety device 1002*b* sends a non-addressed "I am here" message (labeled "1" in FIG. 14A) to its nearest upstream neighbor device (safety master 1002*a*) via the single-wire channel; that is, by outputting the IAH message on its SWS+ INPUT terminal (since the next downstream device from safety device 1002*b* is already in "diagnostic" mode, the reset safety device 1002*b* does not receive an IAH message from that device, as would typically be the case if the safety link was being newly established). As shown in FIG. 14B, safety master 1002*a* responds to IAH message 1 with an IAH response message (labeled "2"). Upon the next broadcast message sent by the comms master for diagnostics data (labeled "1" in FIG. 14C), device 1002*b* will reply with a new I Am New (IAN) indication and an address of (FF) (labeled "3" in FIG. 14C). The comms master 1008 receives this message and now knows that a new device is on the link. The link is then re-enumerated and GDI and GDS information is gathered by the comms master.

Figure 15A:
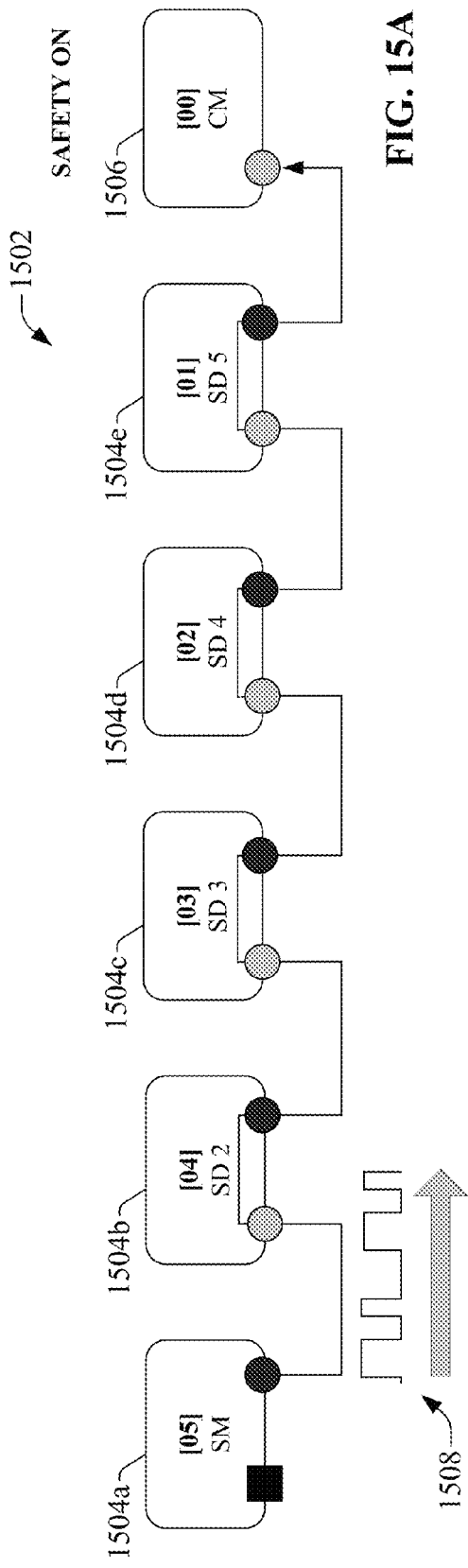

Upon completion of the sub-link, link enumeration, and link identification phases described above, the safety circuit enters run mode and normal safety operation commences. FIGS. 15A-15D are block diagrams illustrating safety and diagnostic modes according to one or more embodiments. As shown in FIG. 15A, example single-wire safety circuit 1502 comprises a comms master 1506 and five safety devices 1504*a*-1504*e*, where safety device 1504*a* operates in safety master mode and safety devices 1504*b*-1504*e* operate in normal mode. As safety master, safety device 1504*a* generates the pulsed safety signal 1508 that is placed on the single-wire safety channel. During operation mode, during which all safety devices 1504*a*-1504*e* are in their respective operational states, pulsed safety signal 1508 is relayed along the single-wire channel by the respective safety devices and received at the SWS+ INPUT terminal of comms master 1506. Each safety device that receives the pulsed safety signal 1508 on its SWS+ INPUT terminal during safety mode verifies that the received pulse pattern matches the defined pulse pattern (e.g., pulse signal 302 or another defined pulse pattern). In accordance with the enable block illustrated in FIG. 7, each safety device outputs the pulsed safety signal on its SWS+ OUTPUT terminal if (a) the pulse pattern is confirmed to be the correct pulse pattern, (b) the safety function is valid (e.g., door closed, emergency stop pushbutton disengaged, light curtain unbroken, etc.), (c) there are no internal faults on the safety device, and (d) the communication stack for the safety device is active. The pulsed safety signal is thus relayed through the safety devices via the single-wire channel to the SWS+ INPUT terminal of the comms master 1506.

Comms master 1506 detects and verifies that the pulse pattern received on the safety signal matches the defined pulse pattern (e.g., pulse signal 302 or another defined pulse pattern). As long as the defined pulse pattern is recognized on its SWS+ INPUT terminal, comms master 1506 allows its safety contactors to switch to the closed state, providing power to the industrial machines and/or devices connected to its safety relay outputs (Operational mode).

Figure 15B:
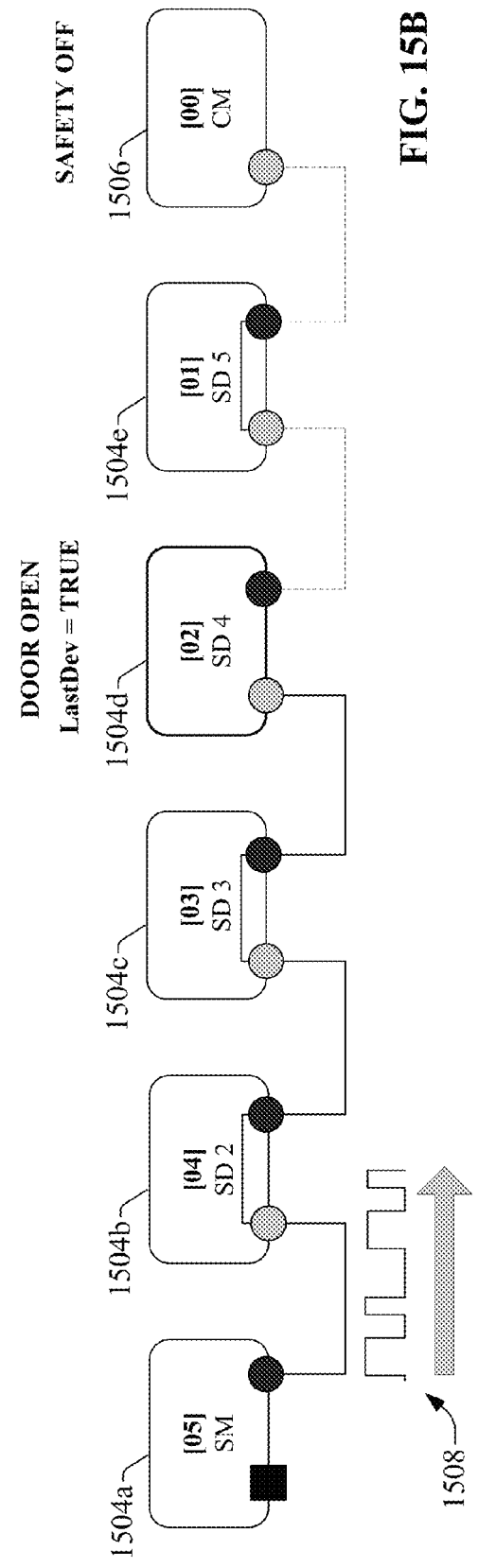

FIG. 15B illustrates a scenario in which safety device 1504*d*—corresponding to a door safety switch—switches to its unsafe state (e.g., the corresponding safety door has been opened). Upon switching to the safe state, safety device 1504 stops relaying the pulsed safety signal to the next downstream device on the safety circuit (safety device

1504e), preventing the pulsed safety signal from reaching the comms master 1506. Upon detecting loss of the safety signal, comms master 1506 opens its safety contactors and isolates power from the connected industrial machines and/or devices (Safe State). In addition to blocking the safety signal, safety device 1504d also sets a "last device" (Last-Dev) flag indicating that it is the last device on the safety circuit capable of receiving the safety signal from the safety master 1504a.

Upon detecting loss of the safety signal, comms master 1506 initiates diagnostic mode and begins collecting information from the safety devices. The comms master can retrieve data by addressing specific devices starting with device (01) or can send a broadcast address of (FF) to retrieve data from all devices. The following will described addressing specific devices. See the description above in connection with FIGS. 13E-13F for requesting and retrieving data using a broadcast message. As shown in FIG. 15C, comms master 1506 begins by sending a diagnostic message (DIAG) to address 01 (safety device 1504e) via the single-wire channel (e.g., by outputting the DIAG message on its SWS+ INPUT terminal). The DIAG message (labeled "1" in FIG. 15C) includes the address (01) for which status information is requested. Upon receiving the DIAG message on its SWS+ OUTPUT terminal and determining that the address contained in the DIAG message corresponds to its own address, safety device 1504e responds by sending a DIAG response message (labeled "2" in FIG. 15C) comprising its address number (01) and diagnostic status data (DATA). Safety device 1504e outputs this DIAG response message on its SWS+ OUTPUT terminal, sending the response via the single-wire channel.

The diagnostic status data sent by the safety device can comprise any suitable diagnostic information available on the safety device, including at least the value of the safety device's LastDev flag. For example, the diagnostic data may comprise a pre-formatted status word divided into pre-defined status bits and registers, where the values of the bits and registers are set by status word control component 516. Since safety device 1504 is still in its safe state, its LastDev flag has not been set. Accordingly, the DIAG response message from safety device 1504e reports a value of LastDev=FALSE. The DIAG response message can also include other status and fault information for the safety device in addition to the LastDev flag. This can include both error codes that are common to all SWS safety devices as well as device-specific status and fault information. Example device-specific status information that can be included in the DIAG response message can include, but is not limited to, door open and closed status (for door safety switches), beam on and off statuses and beam strength warnings (for light curtains), button on and off statuses (for emergency stop pushbuttons and pull-cords), or other such information.

Upon receiving this DIAG response message and determining that safety device 1504e is not the last available device on the circuit (based on the value of the LastDev flag), comms master 1506 next sends a DIAG message to address 02 (corresponding to safety device 1504d), as shown in FIG. 15D. Safety device 1504e receives this DIAG message on its SWS+ OUTPUT terminal and, in response to determining that the address contained in the message does not match its own address, relays the DIAG message to the next upstream device (safety device 1504d) by outputting the DIAG message on its SWS+ INPUT terminal. Safety device 1504d responds with a response DIAG message including its address (02) and diagnostic data including at least the value of its LastDev flag (LastDev=TRUE). This DIAG response message is relayed to comms master 1506 via safety device 1504e, informing the comms master 1506 that the safety device addressed 02 is the last accessible device on the safety circuit. Based on this information, comms master 1506 determines that safety device 1504d is in its unsafe state, and can report this information to the user (e.g., via a display indication, by sending a notification to a mobile device of a specified user, etc.). In some embodiments, comms master 1506 can also retrieve information about the identified safety device from the previously registered device identification information (see FIGS. 13A-13D) and provide this information to the user as well. For example, based on the registered device information, comms master 1506 knows that the safety device corresponding to address 02 is a safety door switch, and therefore the unsafe state corresponds to a detected door open status. The comms master 1506 can therefore generate a notification that the safe state is due to the safety door corresponding to safety input device 02 being open.

Once the last device capable of receiving the safety signal from the safety master 1504a is found (that is, once the device whose LastDev flag is set to TRUE is identified), the comms master 1506 will then send the next DIAG message request. The comms master 1506 will only send DIAG messages to devices up to the device that is blocking the safety signal, mitigating unnecessary polling of active devices between the safety master 1504a and the safety device responsible for blocking the safety signal.

While the safe state of the comms master is due to safety device 1504d being in the safe state, safety master 1504a continues to send the pulsed safety signal along the single-wire channel. However, the safety signal will only be relayed as far as the SWS+ INPUT terminal of safety device 1504d. Upon returning to its operational state (when the safety door corresponding to safety device 1504d has been closed), safety device 1504d will detect the pulsed safety signal on its SWS+ INPUT terminal and resume relaying the safety signal. If device 1504e has not entered the safe state, it too will relay the pulsed signal to the comms master 1506. Subsequently, comms master 1506 detects the safety signal on its SWS+ INPUT terminal and switches operational mode back to ON, allowing the safety contactors to be closed and power to be provided on the safety relay outputs.

Figure 16A:
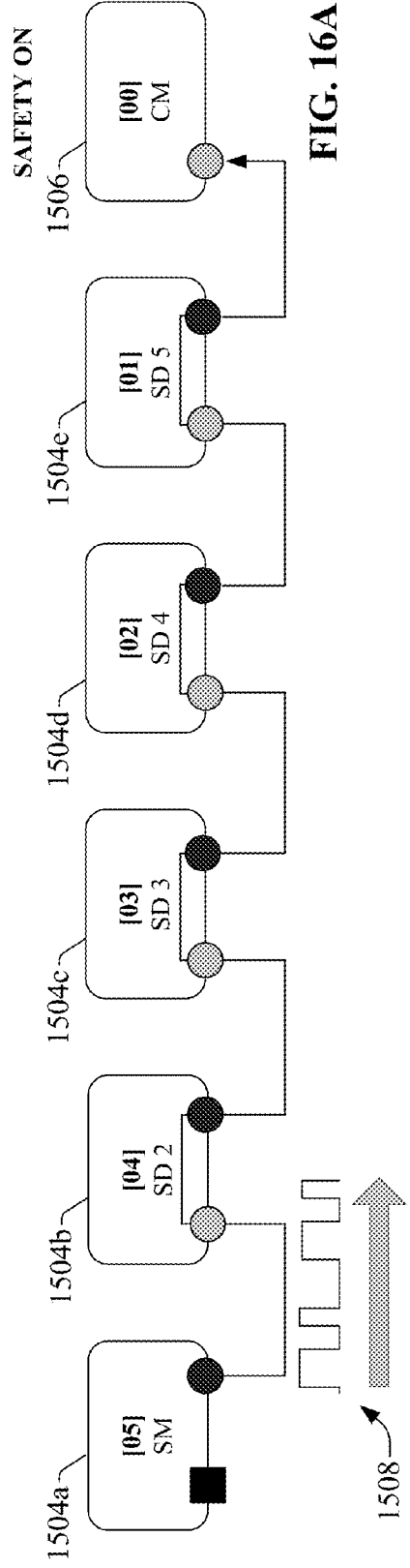
Figure 16B:
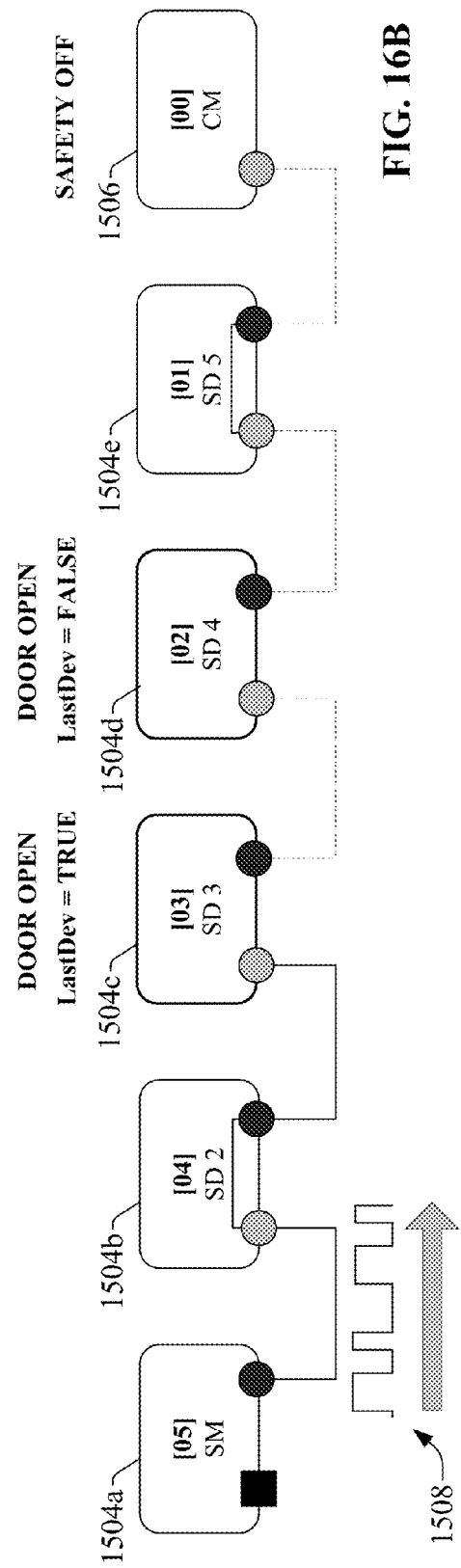

FIGS. 16A-16F are block diagrams illustrating how messaging is performed in a scenario in which multiple safety devices switch to their safe state due to their doors being opened. Initially, the safety circuit is operating in operational mode, wherein all safety devices 1504a-1504e are in their respective operational states and are relaying the pulsed safety signal 1508 to comms mater 1506, as shown in FIG. 16A. The safety door corresponding to safety device 1504d is then opened, followed by the safety door corresponding to safety device 1504c, as shown in FIG. 16B. When safety device 1504d switches to its safe state, it initially sets its LastDev flag to TRUE, as described above in the previous example. However, when safety device 1504c subsequently switches to its safe state and ceases relaying the safety signal, safety device 1504d detects the loss of the safety signal on its SWS+ INPUT terminal and resets its LastDev flag to FALSE. Meanwhile, safety device 1504c sets its LastDev flag to TRUE. In general, a given safety device sets its LastDev flag to TRUE if (a) the safety device is in its safe state, and (b) if the safety device still detects the safety signal on its SWS+ INPUT terminal. When these two conditions are true, the safety device becomes aware that it is the last device capable of receiving the safety signal and sets its LastDev flag to TRUE.

When the comms master switches from operational to the safe state in response to safety device 1504*d* switching to its safe state, comms master 1506 begins polling the devices for diagnostic information, by sending either a broadcast message or by asking each device individually in a round robin manner for information as shown in FIG. 16C. The illustrated example assumes that the comms master polls the devices individually; however, the broadcasting technique described above in connection with FIGS. 13E-13G may also be used. Safety device 1504*e* reports a value of Last-Dev=0, so comms master 1506 waits for more responses, as shown in FIG. 16D. Although safety device 1504*d* (corresponding to address 02) is in its safe state, it is not the last device capable of receiving the safety signal generated by safety master 1504*a*, and therefore reports LastDev=0. Accordingly, comms master 1506 proceeds to poll address 03, which reports LastDev=1, as shown in FIG. 16E. At this stage, comms master 1506 reports the statuses of safety devices 1504*c*, 1504*d*, and 1504*e* (e.g., doors open or doors closed).

Upon determining that safety device 1504*c* is the stopping point for the safety signal, comms master 1506 will continue to send DIAG requests to devices 1504*e*, 1504*d*, and 1504*c*. If devices 1504*a* or 1504*b* enter the safe state, they too will begin to respond to the requests and the LastDev=TRUE indicator will move to the safety device closest to the safety master with a door open.

When the safety door corresponding to safety device 1504*c* is closed, as shown in FIG. 16F, safety device 1504*c* replies to the next diagnostic request with its Safety Signal Enable SSE=TRUE. Safety devices 1504*d* and 1504*e* relay this message untouched to the comms master. In addition, safety device 1504*d* sends a confirmation message back to safety device 1504*c* acknowledging receipt of the SSE=TRUE bit. Safety device 1504*c* will then resume relaying the safety signal. Meanwhile, since safety device 1504*d* is still in its safe state (door open) but now detects the presence of the safety signal on its SWS+ INPUT terminal, that device sets its LastDev flag to TRUE. Consequently, upon receipt of the next DIAG message, safety device 1504*d* sends a DIAG response message that includes a value of LastDev=TRUE, and will not attempt to relay the message upstream. The comms master 1506 continues to send DIAG requests until all safety devices have sent their SSE=TRUE bits in their diagnostic message responses, been confirmed, and the safety signal is relayed to the comms master.

The foregoing examples describe a number of message types (IAH, IAE, GDI, GDS, etc.) that can be exchanged between SWS safety devices via the single-wire safety channel Some embodiments of the SWS safety devices described herein may support additional types of messaging. For example, in one or more embodiments, the comms master may be configured to send remote restart commands to selected devices via the single-wire channel. These remote restart commands may include the address of the safety device to be restarted, such that when the targeted device receives the command on its SWS+ OUTPUT terminal and verifies the matching address, the safety device will initiate a restart sequence.

As described in the foregoing examples, the safety input device designated as the safety master modulates the safety signal according to a defined pulse pattern (e.g., the pulse pattern depicted in FIG. 3), and this safety signal is relayed from the safety master to the comms master over the single-wire channel. In some embodiments, one or more additional pulse patterns can be defined for use by the safety system devices for other purposes. For example, two different pulse patterns may be defined to convey respective two different types of safety states (e.g., a "doors closed" state and a "doors locked" state). The comms master can be configured to recognize which of the defined patterns is present on the single-wire channel and operate in accordance with the particular safe state corresponding to the detected pulse pattern (which may depend on user-defined programming downloaded to the comms master). For example, the comms master may be programmed to only enable a defined subset of its safety relay outputs if a first defined pattern is detected (e.g., a pattern corresponding to a "doors closed but unlocked" state), and to enable the remaining safety relay outputs if the second defined pattern is detected (corresponding to a "doors closed and locked" state).

FIGS. 17-28 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 17:
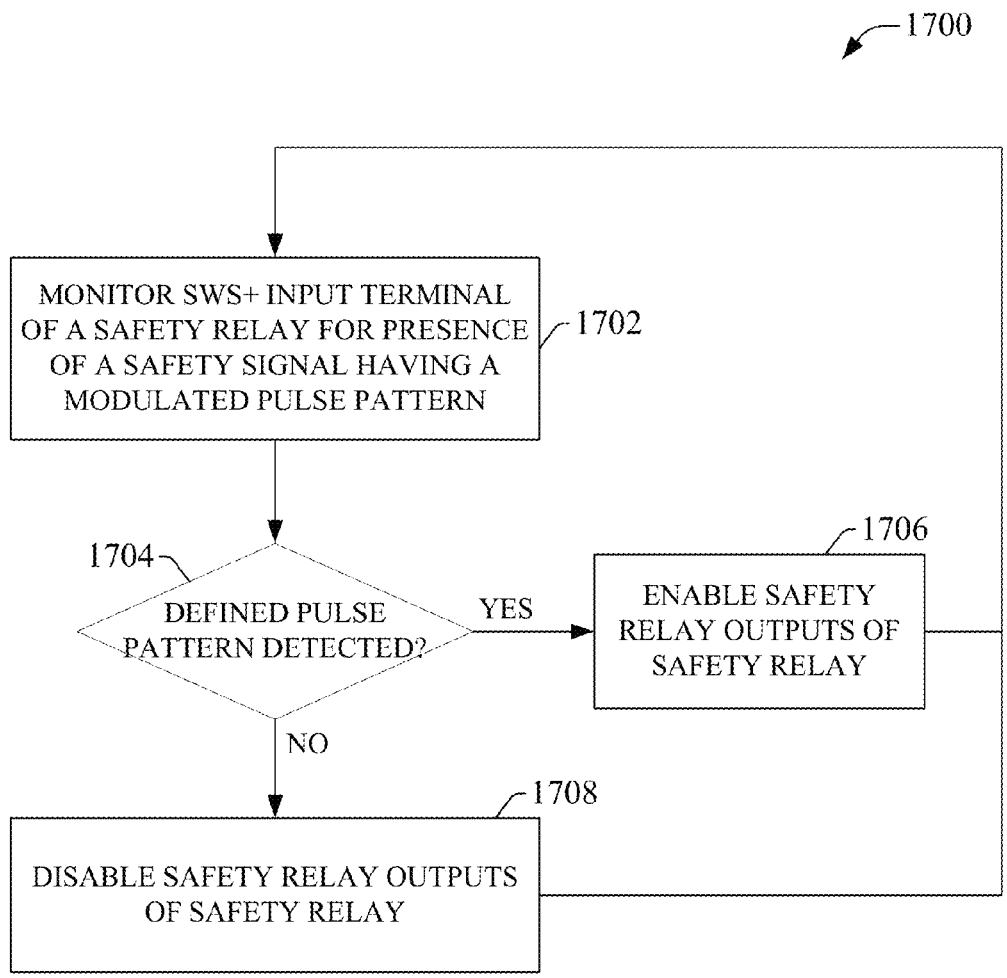
FIG. 17 is a flowchart of an example methodology for controlling safety relay outputs of a safety relay.

FIG. 17 illustrates an example methodology 1700 for controlling safety relay outputs of a safety relay. At 1702, an SWS+ INPUT terminal of a safety relay compatible with a single-wire safety (SWS+) protocol is monitored for presence of a safety signal having a modulated pulse pattern. At 1704, a determination is made regarding whether the pulse pattern detected on the safety signal matches a defined pulse pattern. If it is determined that the pulse pattern matches the defined pulse pattern, the methodology moves to step 1706, where the safety relay outputs of the safety relay are enabled and the monitoring continues at step 1702. Alternatively, if the detected pulse pattern does not match the defined pulse pattern, the methodology moves to step 1708, where the safety relay outputs are disabled, and the monitoring continues at step 1702.

Figure 18:
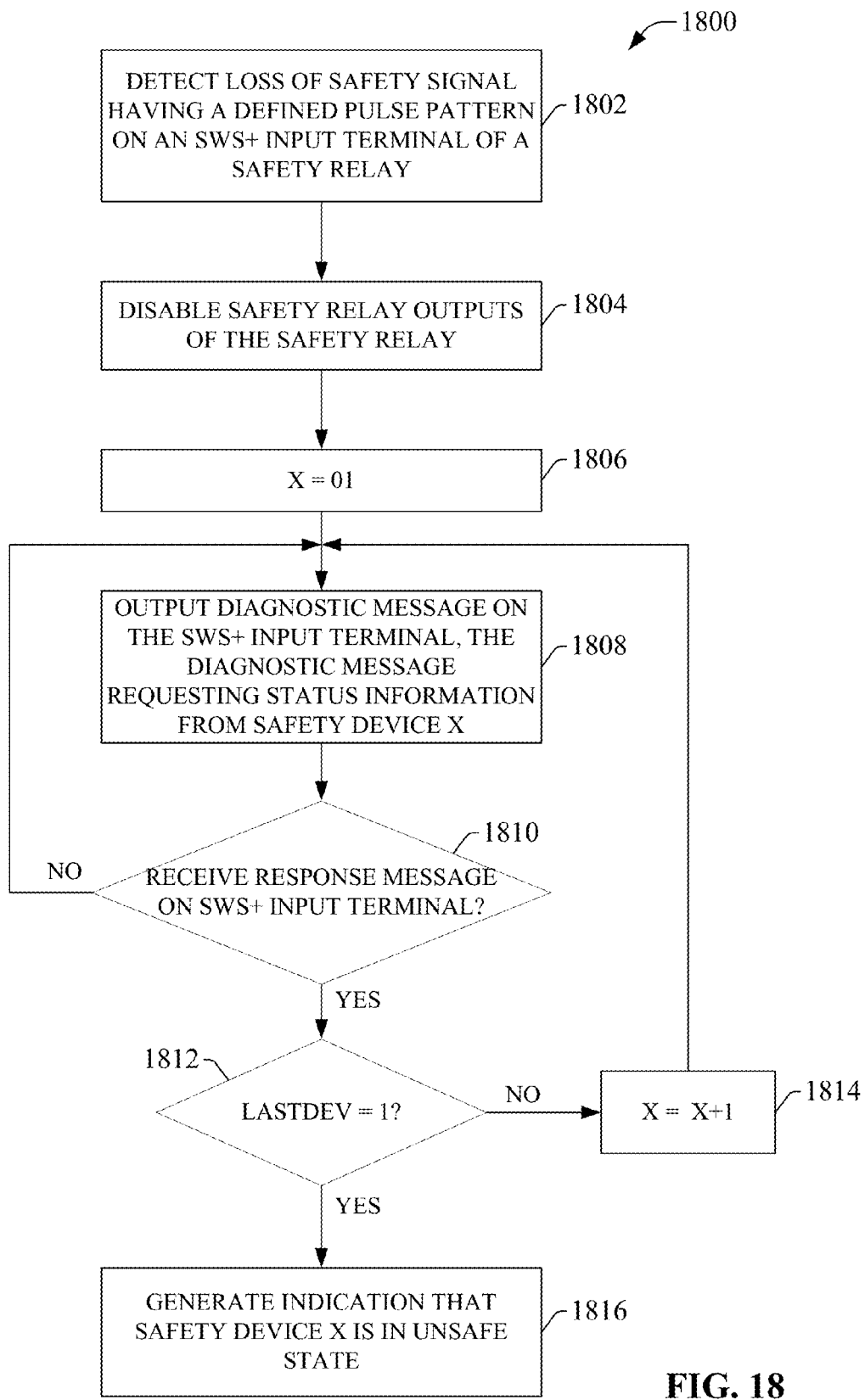
FIG. 18 is a flowchart of an example methodology for obtaining diagnostic information from one or more safety input devices on a single-wire safety circuit in response to a detected loss of a safety signal.

FIG. 18 illustrates an example methodology 1800 for obtaining diagnostic information from one or more safety input devices on a single-wire safety circuit in response to a detected loss of a safety signal. This example shows the comms master polling one device at a time; however, it is to be appreciated that the methodology 1800 may be modified such that the comms master obtains diagnostic information using a broadcast message. Initially, at 1802, the loss of a safety signal having a defined pulse pattern is detected on an SWS+ INPUT terminal of a safety relay. At 1804, the safety relay outputs of the safety relay are disabled in response to the detected loss of the safety signal.

At 1806, a variable X representing an address of a safety input device is set to 01. At 1808, a diagnostic message (e.g., the DIAG message described in connection with FIGS. 15A-15D) is output on the SWS+ INPUT terminal of the safety relay, the diagnostic message requesting status information from the safety device corresponding to address X. At 1810, a determination is made regarding whether a response message is received on the SWS+ INPUT terminal within a defined time period subsequent to outputting the diagnostic message. If no response message is received within a defined period, the methodology returns to step 1808 and the diagnostic message is output again. Alternatively, if the response message is received, the methodology moves to step 1812, where a determination is made regarding whether a LastDev flag contained in the response message is set to 1.

The LastDev indication indicates that the safety device corresponding to address X is the last device on the single-wire safety circuit able to receive the safety signal. If it is determined that the LastDev indication is 0, the methodology moves to step 1814, where X is incremented by one, and another diagnostic message directed to the next address is output at step 1808. Alternatively, if it is determined that LastDev=1, the methodology moves to step 1816, where an indication is generated that safety device X is in its unsafe state (e.g., light curtain broken, emergency stop pushbutton engaged, object detected by laser scanner, etc.).

Figure 19:
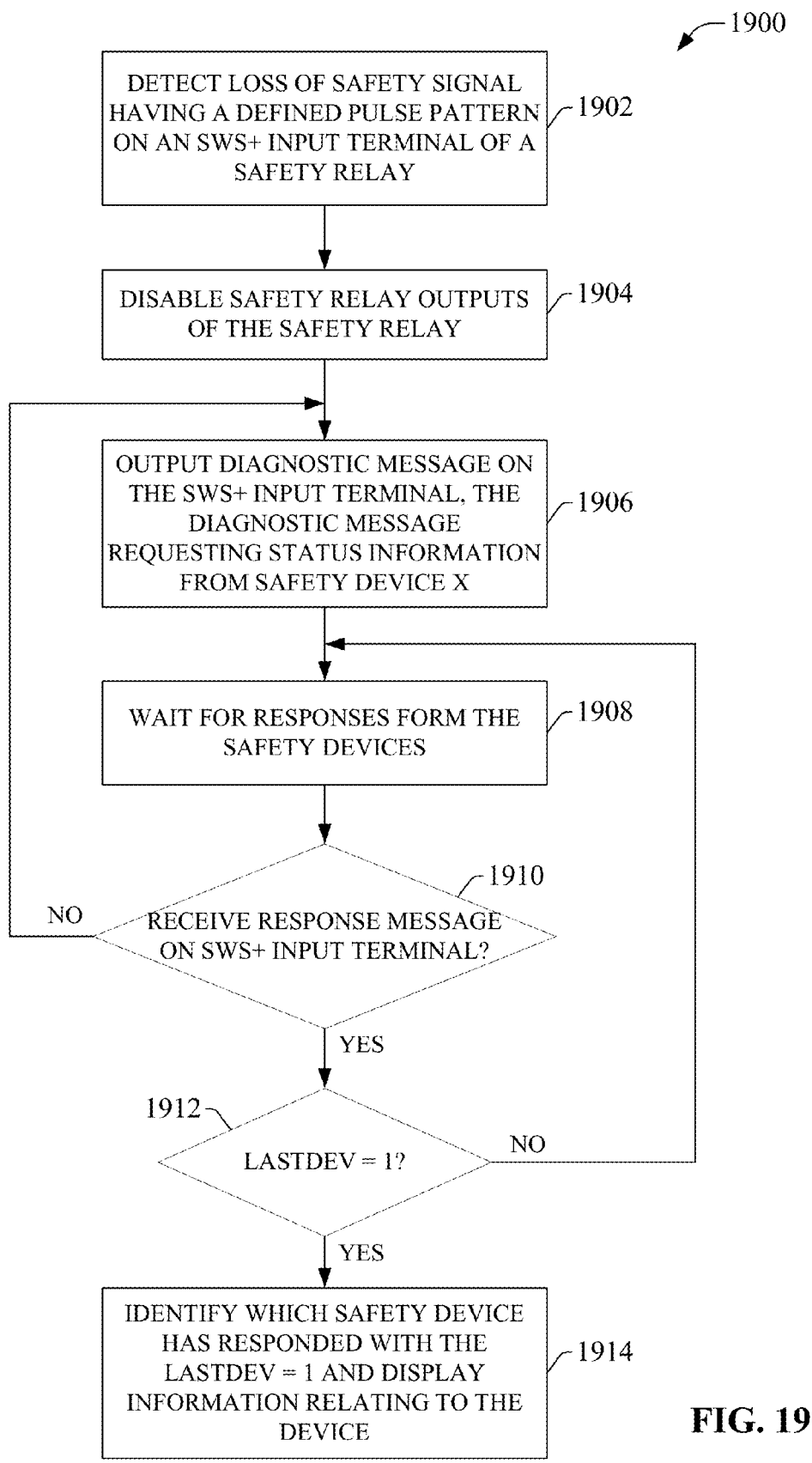
FIG. 19 is a flowchart of an example methodology for obtaining diagnostic information from one or more safety input devices on a single-wire safety circuit in response to a detected loss of a safety signal

FIG. 19 illustrates an example methodology 1900 for obtaining diagnostic information from one or more safety input devices on a single-wire safety circuit in response to a detected loss of a safety signal. This example shows the comms master polling all the devices at once with a broadcast message. Initially, at 1902, the loss of a safety signal having a defined pulse pattern is detected on an SWS+ INPUT terminal of a safety relay. At 1904, the safety relay outputs of the safety relay are disabled in response to the detected loss of the safety signal. At 1906, a broadcast diagnostic message is sent out on the single-wire channel via the SWS+ INPUT terminal of the safety relay.

At 1908, the comms master waits for responses from the safety devices. At 1910, a determination is made regarding whether a response message is received on the SWS+ INPUT terminal within a defined time period subsequent to outputting the diagnostic message. If no response message is received within a defined period, the methodology returns to step 1906 and the diagnostic message is output again. Alternatively, if the response message is received, the methodology moves to step 1912, where a determination is made regarding whether a LastDev flag contained in the response message is set to 1. If the Last Dev flag is set to 1 then the process move onto 1914, where the comms master identifies which safety device responded with the LastDev set to 1 and displays the information to the user. Alternately if the LastDev is not set to 1 then the methodology moves back to 1908 to wait for the next response.

Figure 20:
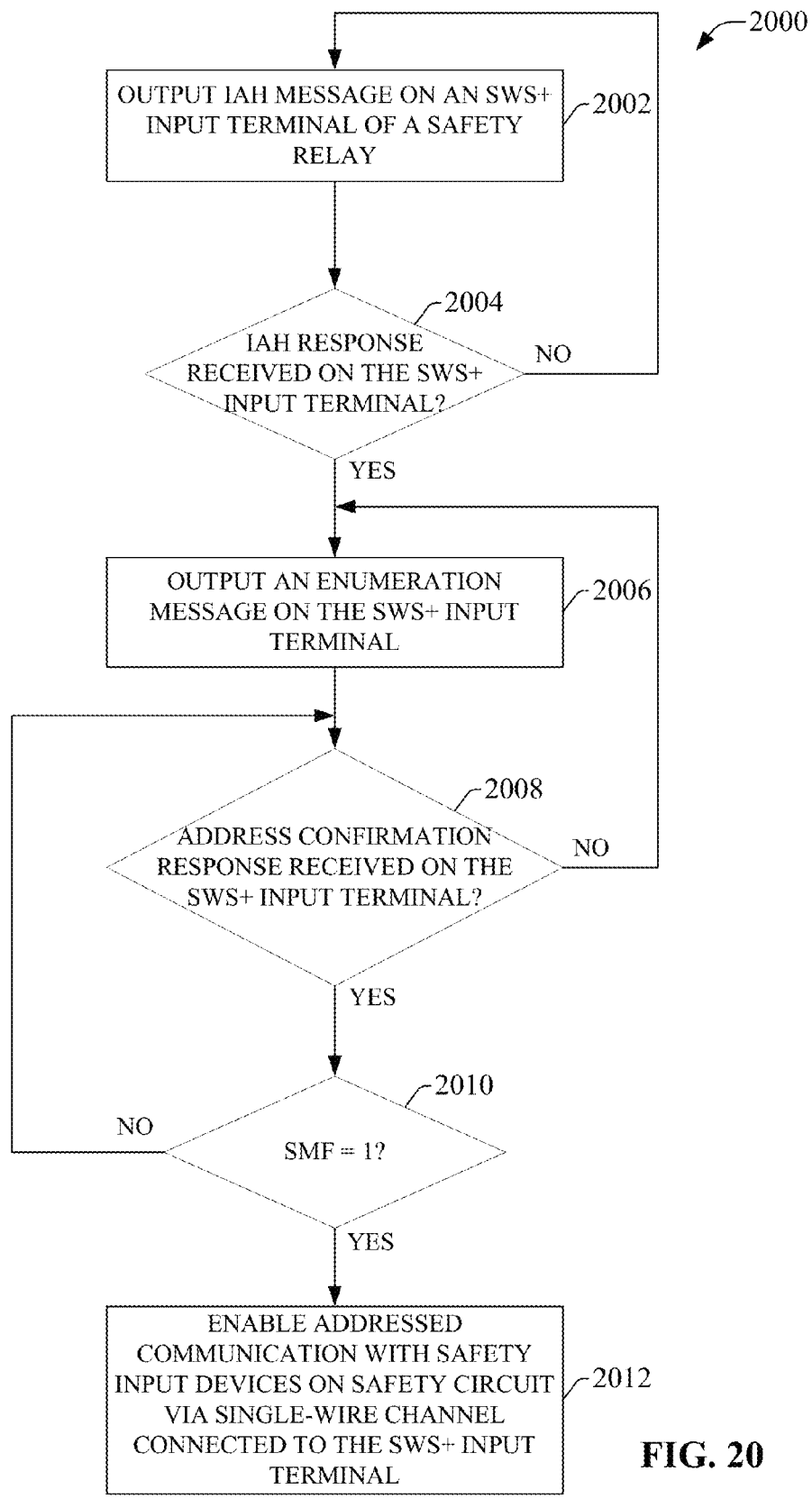
FIG. 20 is a flowchart of an example methodology for enumerating safety input devices on a single-wire safety circuit by a safety relay.

FIG. 20 illustrates an example methodology 2000 for enumerating safety input devices on a single-wire safety circuit by a safety relay. Initially, at 2002, an "I am here" (IAH) message is output on an SWS+ INPUT terminal of the safety relay. At 2004, a determination is made regarding whether an IAH response is received on the SWS+ INPUT terminal within a defined time period after outputting the IAH message. If an IAH response is not receive, the methodology returns to step 2002 and the IAH message is output again. Alternatively, if the IAH response is received, the methodology moves to step 2006, where an enumeration message is output on the SWS+ INPUT terminal of the safety relay.

At 2008, a determination is made regarding whether an address confirmation response message is received on the SWS+ INPUT terminal of the safety relay within a defined time period after outputting the enumeration message. The address confirmation response message indicates that a safety input device on the single-wire safety circuit has been addressed. If the address confirmation message is not received, the methodology returns to step 2006, where the enumeration message is output again. Alternatively, if the address confirmation message is received, the methodology moves to step 2010, where a determination is made regarding whether a Safety Master Found (SMF) flag included in the address confirmation response message is set to 1. The SMF flag indicates that a safety input device designated as the safety master (that is, the device that is to generate the pulsed safety signal for the single-wire safety channel) has been discovered and addressed. If the SMF flag included in the address confirmation message is equal to zero, the methodology returns to step 2008, where the next response is waited for. Steps 2006 through 2010 are repeated until an address confirmation message is received containing an SMF value of 1. In response to determining that SMF=1 at step 2010, the methodology moves to step 2012, where the safety relay enables addressed communication with the safety input devices on the safety circuit via the single-wire safety channel connected to the SWS+ INPUT terminal.

Figure 21:
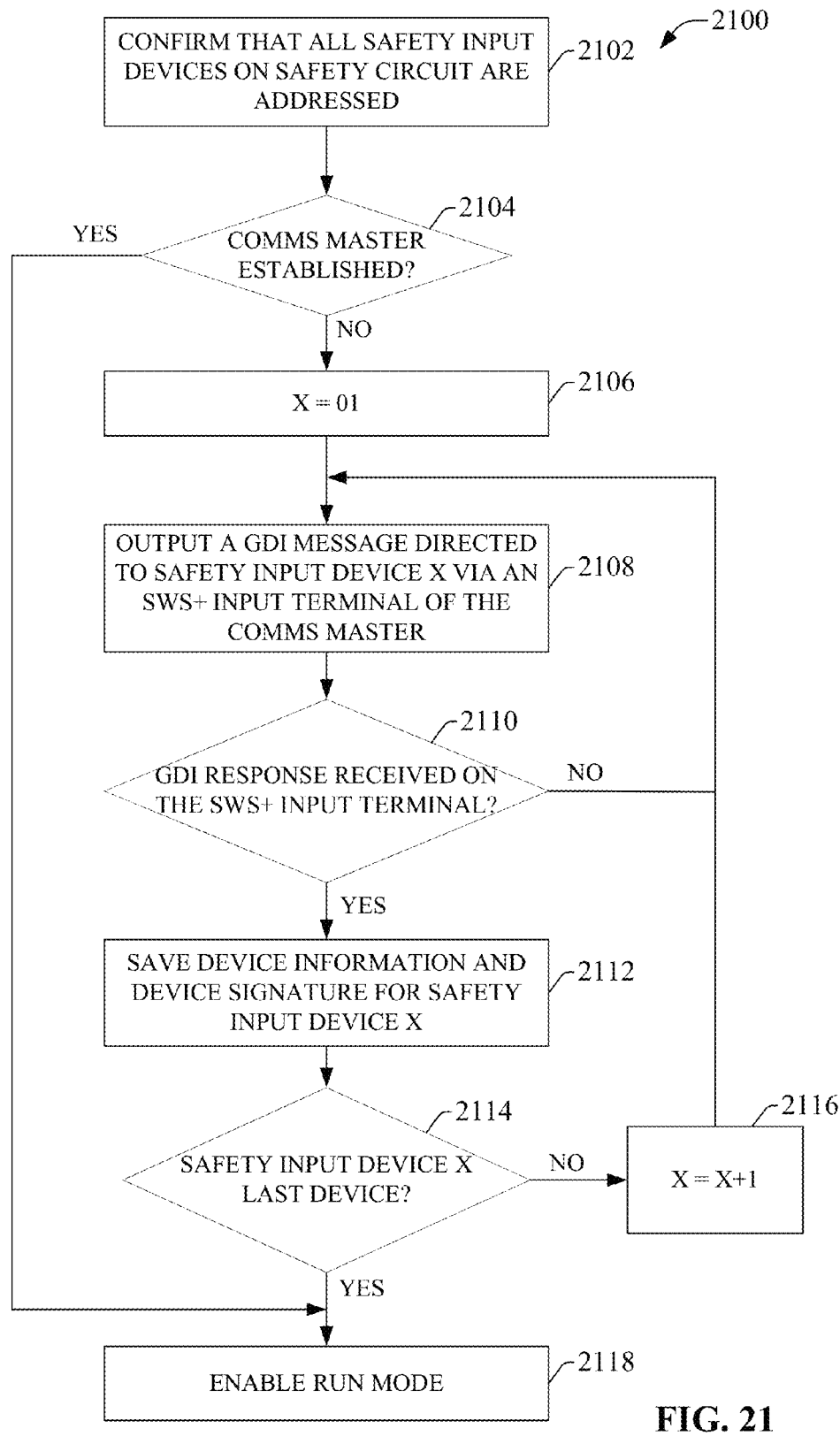
FIG. 21 is a flowchart of an example methodology for establishing a comms master on a single-wire safety circuit.

FIG. 21 illustrates an example methodology 2100 for establishing a comms master on a single-wire safety circuit. In some scenarios, the comms master may be a safety relay that serves as the comms master for the safety circuit. Initially, at 2102, the comms master confirms that all safety input devices on the single-wire safety circuit are addressed (e.g., using methodology 2000 of FIG. 20). At 2104, a determination is made regarding whether the comms master has been established; that is, whether the comms master has collected and stored device information and device signatures for all safety input devices on the safety circuit. If it is determined that the comms master has been established (that is, that the comms master has the device information for all safety input devices stored in local memory), the methodology moves to step 2118, where run mode (diagnostics can begin) is enabled. Alternatively, if it is determined that the comms master has not yet been established, a variable X representing an address of a safety input device for which device information is to be collected is set to 01 at step 2106. At 2108, a "get device identification" (GDI) message directed to safety input device X is output via an SWS+ INPUT terminal of the comms master.

At 2110, a determination is made regarding whether a GDI response is received on the SWS+ INPUT terminal within a defined time period after outputting the GDI message. If no GDI response is received, the methodology returns to step 2108, and the GDI message is output again. Alternatively, if the GDI response message is received, the methodology moves to step 2112, where device information and a device signature for safety input device X contained in the GDI response is saved on the comms master. At 2114, a determination is made regarding whether safety input device X is the last device in the safety circuit. If safety input device X is not the last device, address variable X is incremented at step 2116, and the methodology returns to step 2108, where another GDI message directed to the next safety input device is output by the comms master. Steps 2108-2116 are repeated for all safety input devices on the safety circuit. When it is determined at step 2114 that safety input device X is the last device, the methodology moves to step 2118, where run mode operation (diagnostics can begin) is enabled.

Figure 22:
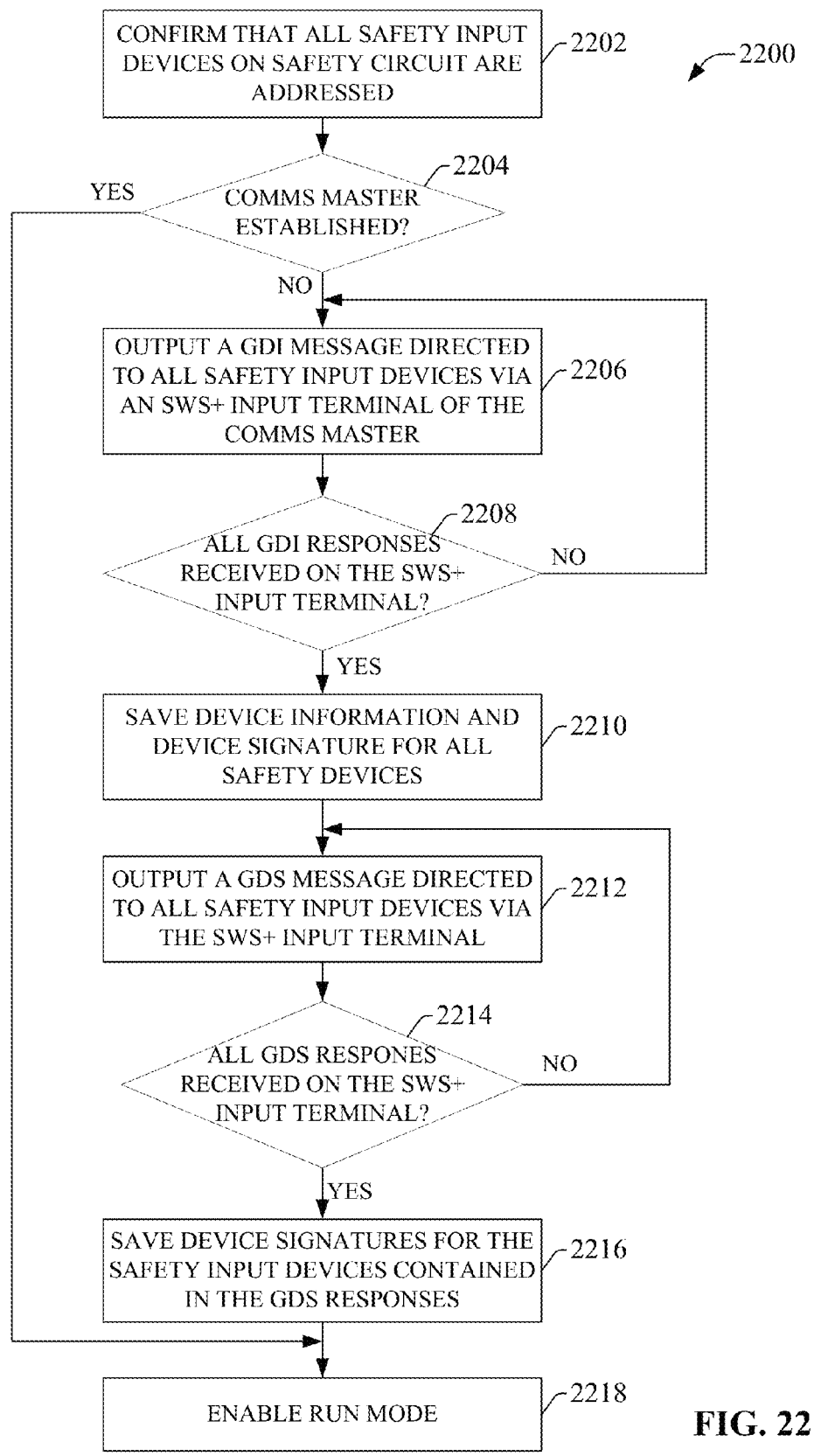
FIG. 22 is a flowchart of an example methodology for establishing a comms master on a single-wire safety circuit.

FIG. 22 illustrates an example methodology 2200 for establishing a comms master on a single-wire safety circuit. In some scenarios, the comms master may be a safety relay that serves as the comms master for the safety circuit. Initially, at 2202, the comms master confirms that all safety input devices on the single-wire safety circuit are addressed (e.g., using methodology 2000 of FIG. 20). At 2204, a determination is made regarding whether the comms master has been established; that is, whether the comms master has collected and stored device information and device signatures for all safety input devices on the safety circuit. If it is determined that the comms master has been established (that is, that the comms master has the device information for all safety input devices stored in local memory), the methodology moves to step 2218, where run mode operation (ready to send diagnostics messages) is enabled. Alternatively, if it is determined that the comms master has not yet been established, the methodology moves to 2206, where a "get device identification" (GDI) message directed to all safety input devices is output via an SWS+ INPUT terminal of the comms master.

At 2208, a determination is made regarding whether all the GDI responses have been received on the SWS+ INPUT terminal within a defined time period after outputting the GDI message. If not all the GDI responses are received, the methodology returns to step 2206, and the GDI message is output again. Alternatively, if the GDI response message is received, the methodology moves to step 2210, where device information for all the safety input devices contained in the GDI response is saved on the comms master.

At 2212, a "get device signature" (GDS) message directed to all safety input devices is output via an SWS+ INPUT terminal of the comms master. At 2214 a determination is made regarding whether all the GDS responses have been received on the SWS+ INPUT terminal within a defined time period after outputting the GDS message. If not all the GDS responses are received, the methodology returns to step 2212, and the GDS message is output again. Alternatively, if all the GDS response messages are received, the methodology moves to step 2216, where device signatures for the safety input devices contained in the GDS response are saved on the comms master. The methodology then moves to 2218, where run mode operation (diagnostics can begin) is enabled.

Figure 23:
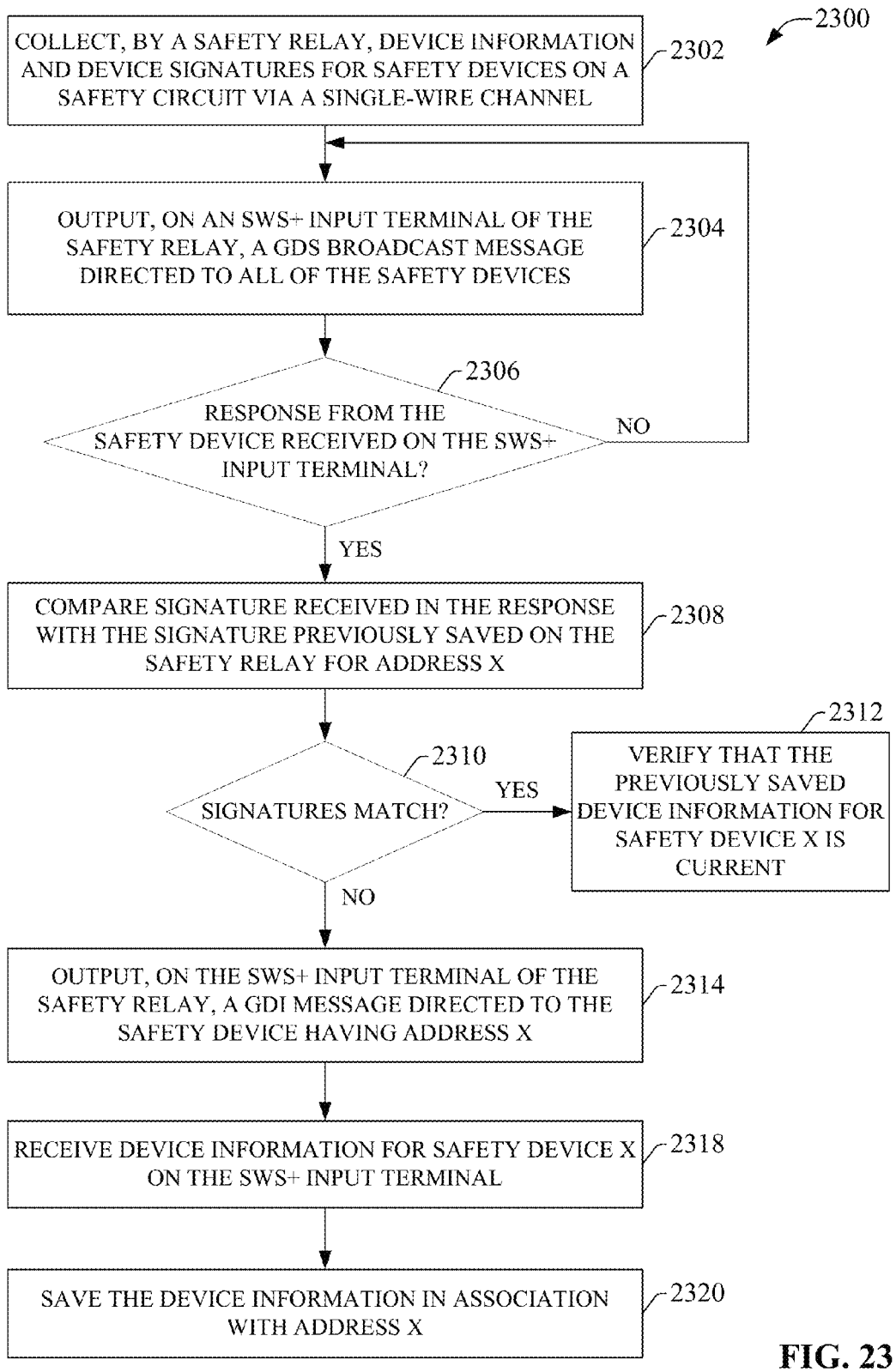
FIG. 23 is a flowchart of an example methodology for detecting and registering replacement safety input devices on a single-wire safety circuit by safety relay acting a comms master.

FIG. 23 illustrates an example methodology 2300 for detecting and registering replacement safety input devices on a single-wire safety circuit by safety relay acting a comms master. Initially, at 2302, device information and device signatures are collected for safety devices on the safety circuit via a single-wire channel (e.g., using methodology 2100 of FIG. 21 or methodology 2200 of FIG. 22). At 2304, a "get device signature" (GDS) broadcast message directed to all of the safety devices is output on an SWS+ INPUT terminal of the safety relay. At 2306, a determination is made regarding whether a response from the safety device is received on the SWS+ INPUT terminal within a defined time period. If no response is receive, the methodology returns to step 2304 and the GDS message is output again. Alternatively, if the response is received, the methodology moves to step 2308, where a device signature received in the response is compared with the device signature previously saved on the safety relay for address X.

At 2310, a determination is made regarding whether the device signature received in the response matches the previously saved device signature. If the signatures match, it is verified at step 2312 that the previously saved device information for safety device X is current (that is, that safety device X is the same device that was previously registered). Alternatively, if the signatures do not match (indicating that safety device X is a replacement device that has not been registered with the safety relay), the methodology moves to step 2314, where a "get device information" (GDI) message directed to the safety device having address X is output on the SWS+ INPUT terminal. At 2318, device information for safety device X is received on the SWS+ INPUT terminal (e.g., via a GDI response message, as described above in connection with methodologies 2100 and 2200). At 2320, the device information received at step 2318 is saved on the safety relay in association with address X.

Figure 24:
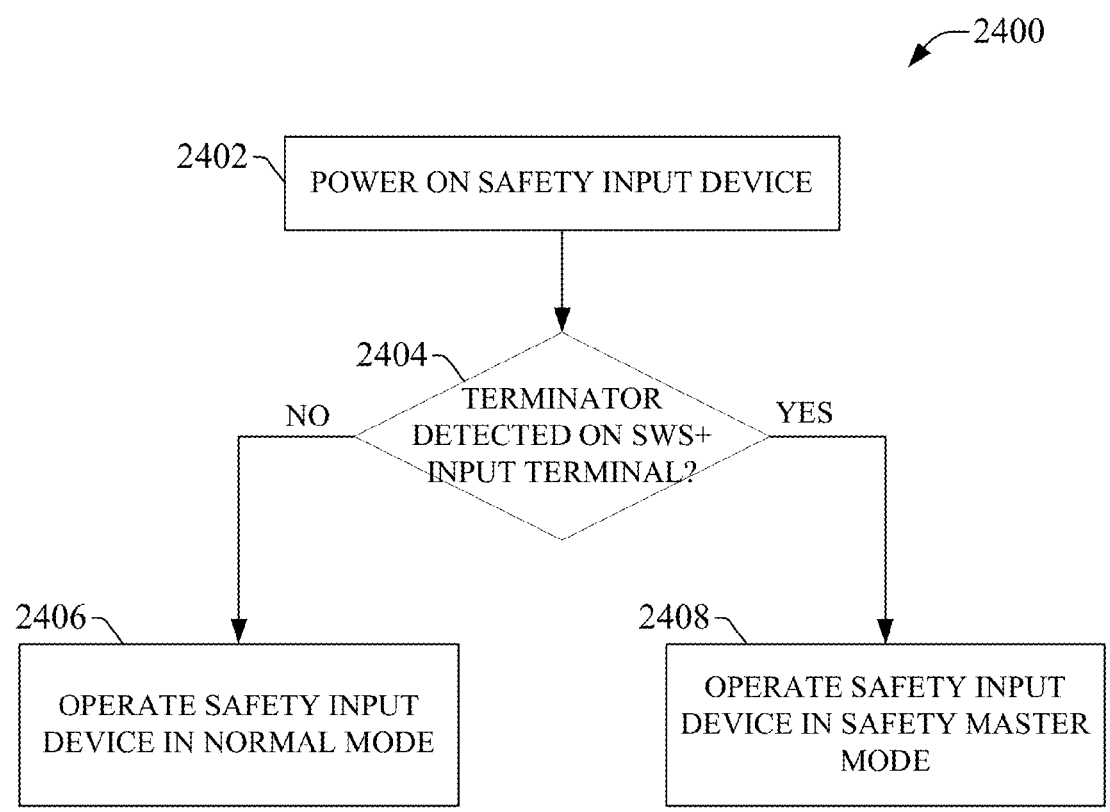
FIG. 24 is a flowchart of an example methodology for configuring a role of a safety input device on a single-wire safety circuit.

FIG. 24 illustrates an example methodology 2400 for configuring a role of a safety input device on a single-wire safety circuit. Initially, at 2402, a safety input device (e.g., an emergency stop button, a light curtain, a door safety switch, an emergency pull cord device, etc.) is powered on. The safety input device is compatible with the single-wire safety protocol described herein, and includes at least an SWS+ INPUT terminal and an SWS+ OUTPUT terminal for receiving and relaying signals on the single-wire safety channel. At 2404, a determination is made regarding whether a terminator is detected on the SWS+ INPUT terminal of the safety input device.

If no terminator is detected, the safety input device operates in normal mode (step 2406). Alternatively, if the terminator is detected, the safety input device operates in safety master mode (step 2408), whereby the safety input device serves as the safety signal source for the single-wire safety circuit on which it is installed. While operating in safety master mode, the safety input device generates a safety signal modulated with a defined pulse pattern and outputs the safety signal on its SWS+ OUTPUT terminal.

Figure 25:
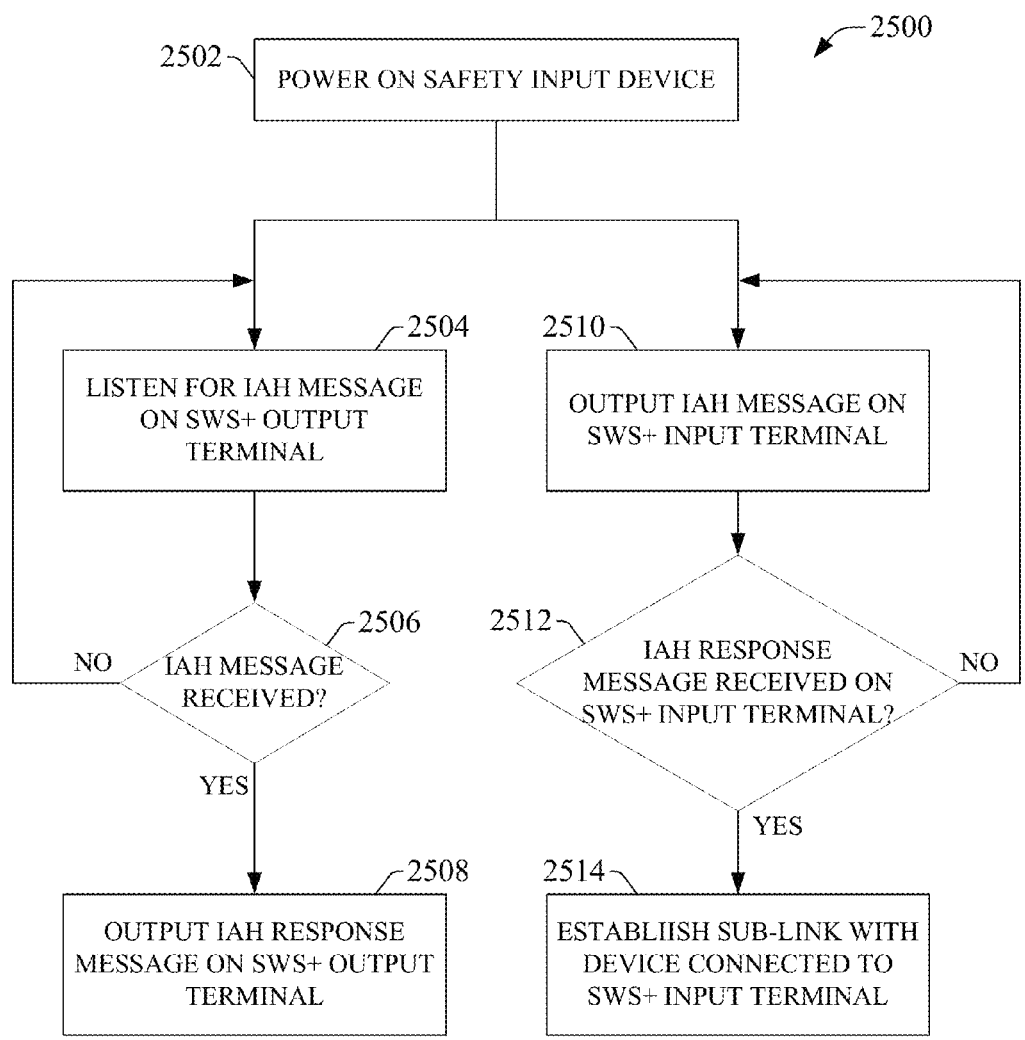
FIG. 25 is a flowchart of an example methodology for establishing sub-links between safety input devices on a single-wire safety circuit.

FIG. 25 illustrates an example methodology 2500 for establishing sub-links between safety input devices on a single-wire safety circuit. Initially, at 2502, a safety input device is powered on for the first time on a single-wire safety circuit. Since the safety input device has not previously communicated with other devices on the safety circuit, the device initially has no address. Upon power-up, the safety input device both listens for an "I am here" (IAH) message on its SWS+ OUTPUT terminal (step 2504) and outputs an IAH message on its SWS+ INPUT terminal (step 2510). At 2506, a determination is made regarding whether an IAH message is received on the SWS+ OUTPUT terminal. If no IAH message is received, the safety input device continues listening for an IAH message at step 2504. Alternatively, if an IAH message is received (indicating that the device on the output side of the safety input device is active and is sending an IAH message via the single-wire channel), the methodology moves to step 2508, where the safety input device outputs an IAH response message on its SWS+ OUTPUT terminal.

Meanwhile, at step 2512, a determination is made regarding whether an IAH response message is received on the SWS+ INPUT terminal of the safety input device within a defined time period after sending the IAH message at step 2510. If the IAH response message is not received, the safety input device outputs the IAH message again at step 2510. Alternatively, if the IAH response message is received, the methodology moves to step 2514, where a sub-link is established between the safety input device and the upstream device connected to the safety input device's SWS+ INPUT terminal.

Figure 26:
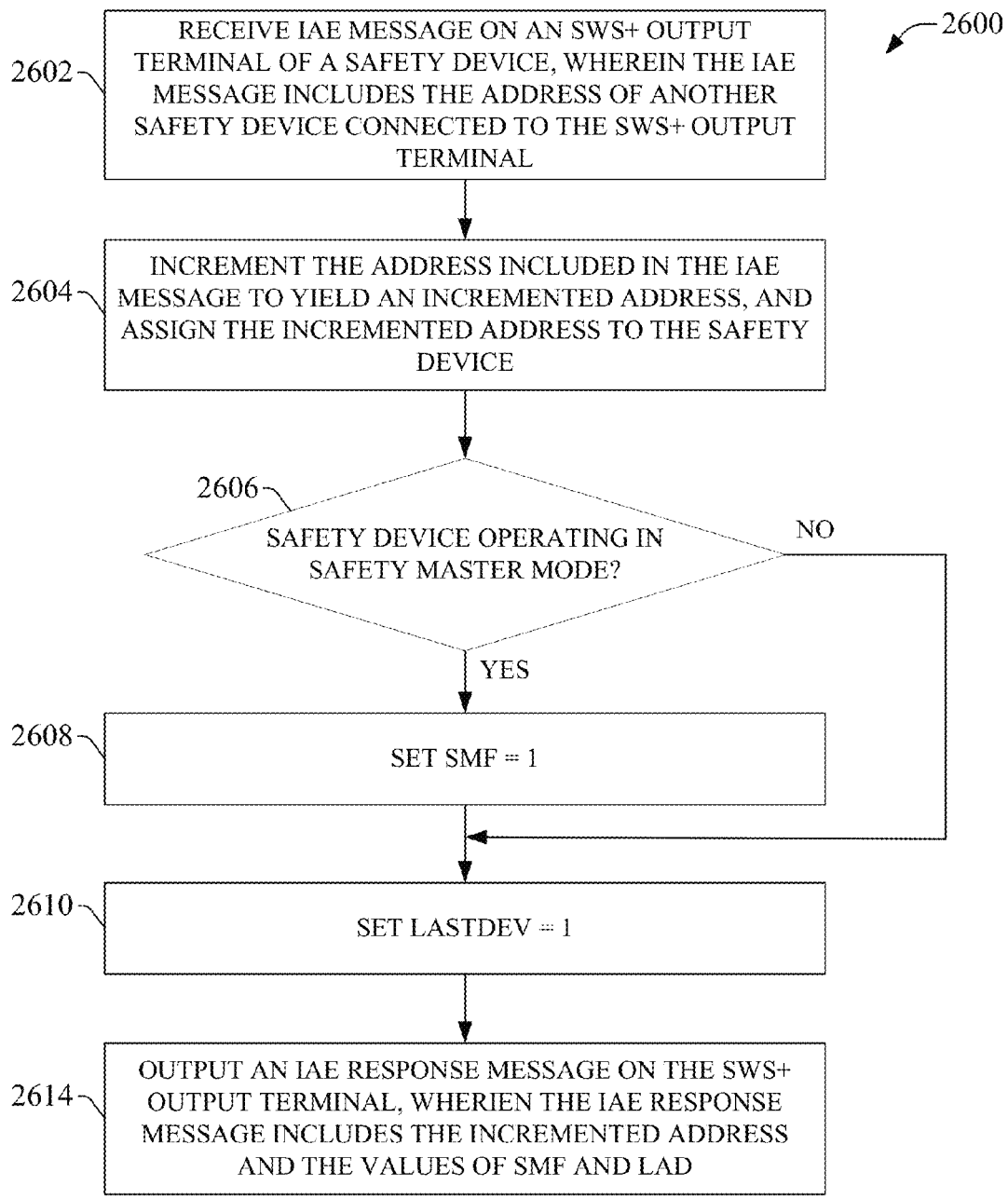
FIG. 26 is a flowchart of an example methodology for enumerating a safety input device on a single-wire input circuit.

FIG. 26 illustrates an example methodology 2600 for enumerating a safety input device on a single-wire safety circuit. Initially, at 2602, an "I am enumerating" (IAE) message is received on an SWS+ OUTPUT terminal of a safety device, wherein the IAE message includes at least the address of another safety device connected to the SWS+ OUTPUT terminal. At 2604, the address included in the IAE message is incremented to yield an incremented address, and the incremented address is assigned to the safety device.

At 2606, a determination is made regarding whether the safety device is operating in safety master mode (e.g., as previously determined using methodology 2400 of FIG. 24). If the safety device is operating in safety master mode, the safety device sets a "safety master found" (SMF) bit to 1 at step 2608. Alternatively, if the safety device is not operating in safety master mode, the methodology moves to step 2610 without setting the SMF bit. At 2610, the LastDev bit is set to 1. At 2612, an IAE response message is output on the SWS+ OUTPUT terminal of the safety device, wherein the IAE response message includes the incremented address (the new address of the safety device) and the values of SMF and LAD.

Figure 27:
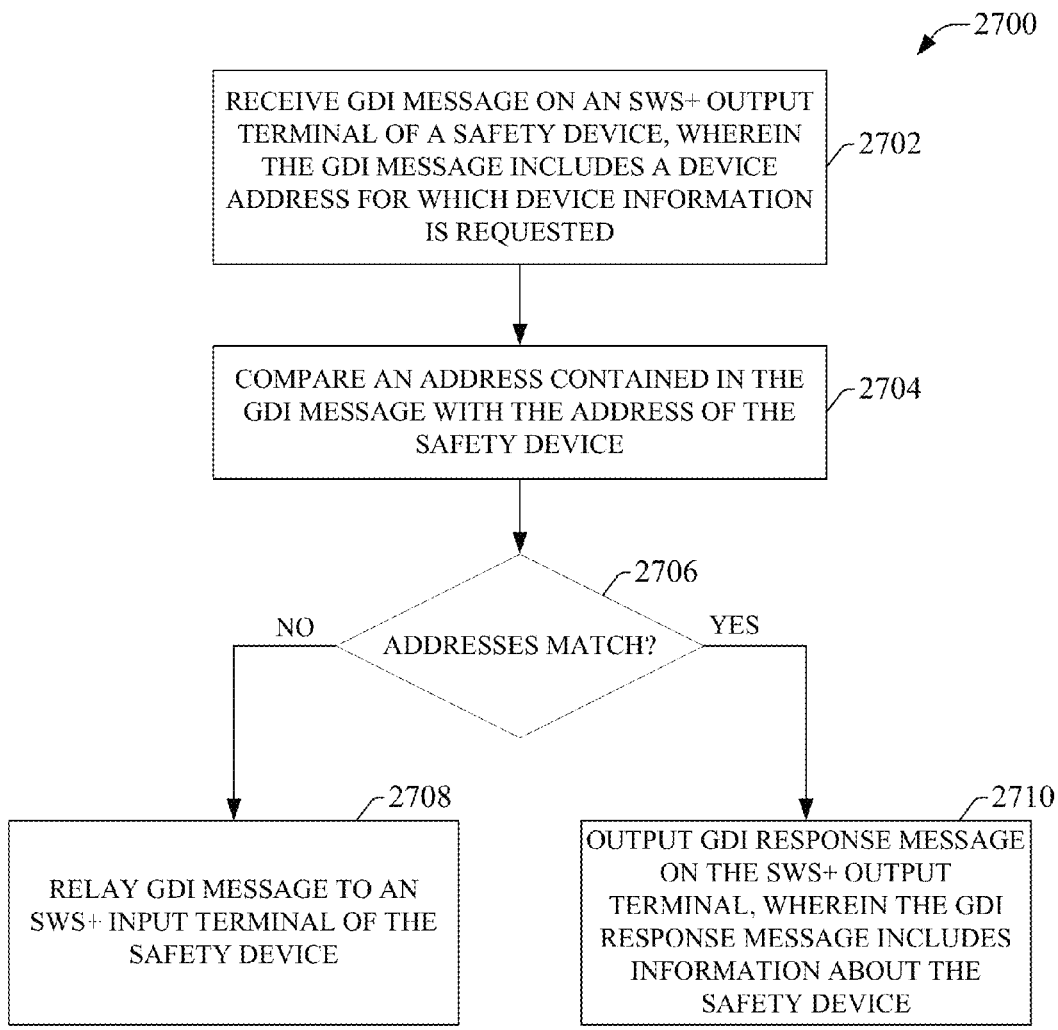
FIG. 27 is a flowchart of an example methodology for processing a request for device information from a comms master by a safety device.

FIG. 27 illustrates an example methodology 2700 for processing a request for device information from a comms master by a safety device. Initially, at 2702, a "get device information" (GDI) message is received on an SWS+ OUTPUT terminal of a safety device, wherein the GDI message includes a device address for which device information is requested. At 2704, the address contained in the GDI message is compared with the address of the safety device. At 2706, a determination is made regarding whether the addresses compared at step 2704 match. If the address contained in the GDI message does not match the address of the safety device, the safety device relays the GDI message to its SWS+ INPUT terminal at step 2708. Alternatively, if the addresses match, or the address is FF, the safety device outputs a GDI response message on its SWS+ OUTPUT terminal, wherein the GDI response message includes information about the safety device, including but not limited to a device type, a product code, vendor information, hardware and/or software revision number, fault information, status information, a device signature, or other such information. If the address of the request was a broadcast (FF) then the device relays the request upstream after responding.

Figure 28:
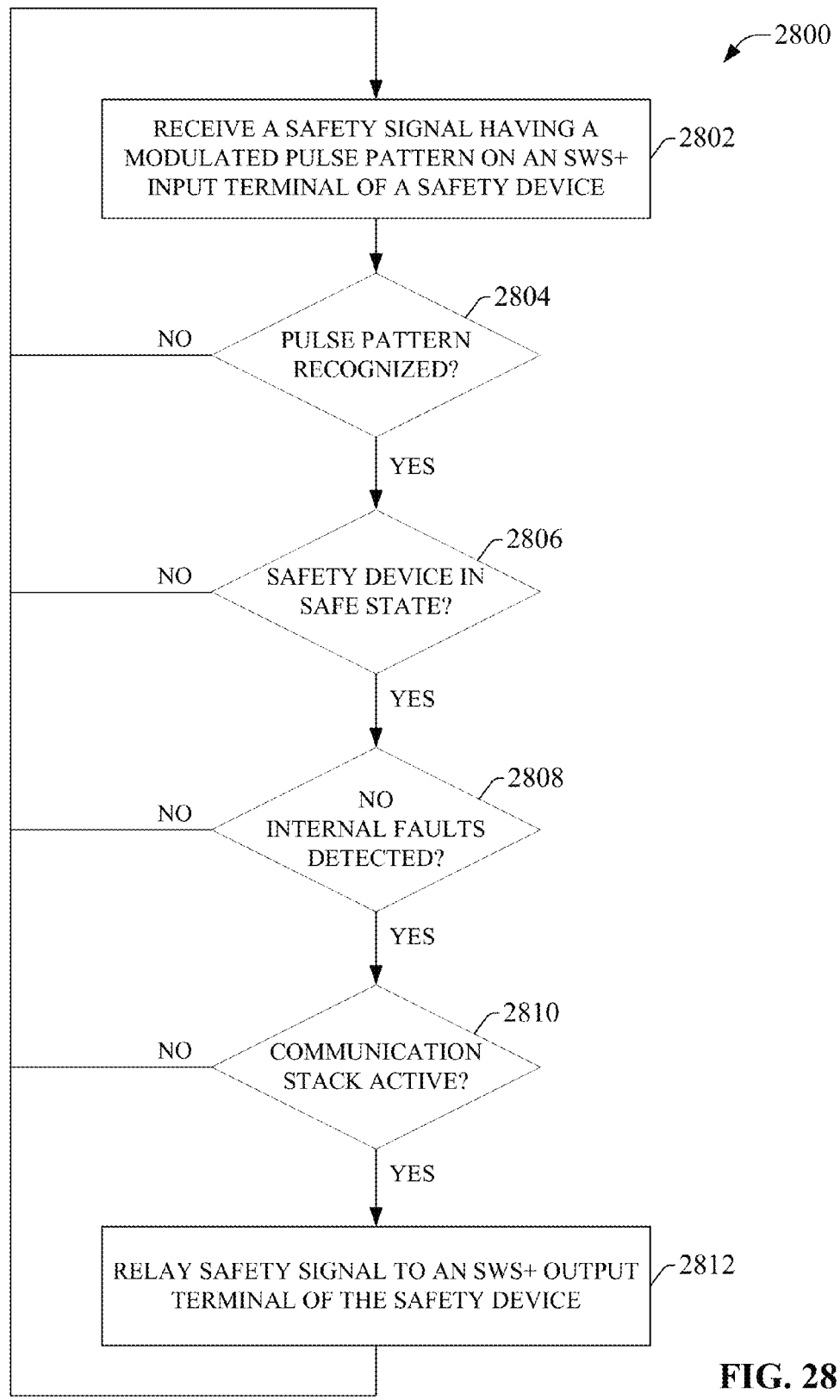
FIG. 28 is a flowchart of an example methodology for processing a pulsed safety signal received at a safety input device via a single-wire safety channel.

FIG. 28 illustrates an example methodology 2800 for processing a pulsed safety signal received at a safety input device via a single-wire safety channel. Initially, at 2802, a safety signal having a modulated pulse pattern is received on an SWS+ INPUT terminal of the safety device. At 2804, a determination is made regarding whether the pulse pattern modulated on the safety signal is recognized as a defined pulse pattern. If the pattern is recognized, a determination is made at step 2806 regarding whether the safety device is in its safe state (e.g., light curtain unbroken, emergency stop pushbutton unengaged, etc.). If the safety device is in its safe state, it is confirmed at step 2808 that no internal faults are detected on the safety device. If no internal faults are detected, a determination is made at step 2810 regarding whether the safety device's communication stack is active. If the communication stack is active, the methodology moves to step 2812, where the safety device relays the pulsed safety signal to its SWS+ OUTPUT terminal, thereby sending the signal to the next device on the safety circuit.

If any of the determination steps 2804-2810 are not satisfied, the safety device continues receiving the pulsed safety signal without relaying the signal to the next device on the safety circuit. It is to be appreciated that determination steps 2804-2810 may be performed in any order, or may be performed simultaneously.

Some embodiments of the SWS+ safety devices described herein can be configured to operate in either of two operating modes—SWS+ mode or standard mode. While operating in SWS+ mode, the safety device will operate as described in the foregoing examples as part of a single-wire safety circuit. While operating in standard mode, the safety device will operate as a standard output signal switching device (or OSSD device). In some of these multi-mode embodiments, the safety device can be configured to automatically set its correct operating mode during the startup sequence based on a determination of whether the safety device is connected to a SWS+ network. To this end, the safety device can execute an auto-detect routine during start-up that causes the device to detect whether it is being used as part of a single-wire safety circuit.

Selection of either SWS+ mode or OSSD mode will determine the functions of certain input and output terminals of the safety device. Table 2 illustrates example function mappings for respective safety device terminals when operating in either SWS+ mode or OSSD mode.

TABLE 2

Safety Device Function Chart

| Terminal | SWS + Mode | OSSD Mode |
| --- | --- | --- |
| 1 | +24 VDC | |
| 2 | SWS + Output | Safety Output B |
| 3 | 0 V | |
| 4 | SWS + Input | Safety Output A |
| 5 | Supplemental Input | Auxiliary Output |

As shown in this table, if the safety device is being operated in OSSD mode, the terminals corresponding to SWS+ INPUT and SWS+ OUTPUT will instead serve as safety outputs A and B as defined by OSSD standards, while the supplemental input terminal will serve as an auxiliary output.

Figure 29:
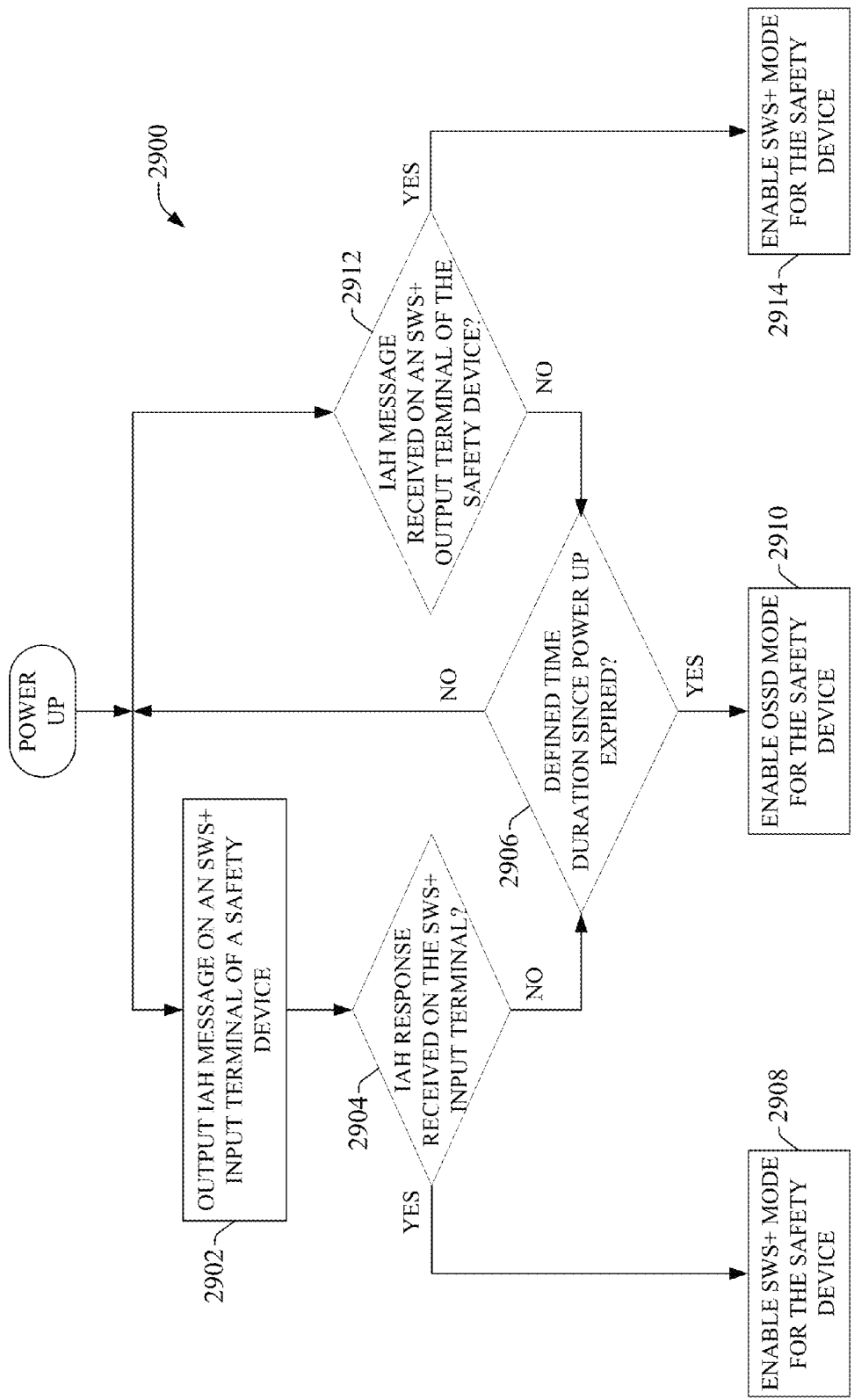
FIG. 29 is a flowchart of an example methodology for automatically detecting whether a safety device that supports auto-detection and self-configuration is currently installed as part of a single-wire safety circuit, and automatically configuring the safety device to operate in either SWS+ mode or OSSD mode based on the determination.

FIG. 29 illustrates an example methodology 2900 for automatically detecting whether a safety device that supports auto-detection and self-configuration is currently installed as part of a single-wire safety circuit, and automatically configuring the safety device to operate in either SWS+ mode or OSSD (standard) mode based on the determination. This methodology can be carried out by the safety device itself (e.g., safety device 502) upon power up. Initially, after the safety device is powered up, the safety device will begin outputting an IAH (I Am Here) message on its SWS+ INPUT terminal, as described in previous examples (see, e.g., FIGS. 10A-10E). The safety device also begins monitoring to determine whether an IAH message from an adjacent device has been received on the safety device's SWS+ OUTPUT terminal at 2912, as also described in previous examples. In general, the safety device determines that it has been installed as a component of a single-wire safety circuit if the device detects either a response to the IAH message sent out via the SWS+ INPUT terminal at step 2902 (that is, a response from an adjacent SWS+ device on the single-wire channel connected to the safety device's SWS+ INPUT terminal) or an IAH message received via the device's SWS+ OUTPUT terminal from another adjacent device on the single-wire channel connected to the device's SWS+ OUTPUT terminal.

As the device outputs its IAH message on its SWS+ INPUT terminal, a determination is made at 2904 as to whether an IAH response is received from an adjacent device on the SWS+ INPUT terminal. If an IAH response is received (YES at 2904), the safety device enables SWS+ mode at step 2908, since receipt of an IAH response from an adjacent device implies that the safety device is installed on a single-wire safety circuit. Alternatively, if no IAH response is received (NO at 2904), the methodology proceeds to step 2906, where a determination is made as to whether a defined time duration since power up has expired. The defined time duration can be any suitable time-out period (e.g., three seconds) that exceeds a maximum time duration during which the safety device would be expected to receive either an IAH response or an IAH message from an adjacent device if the safety device had been installed on a single-wire safety circuit. If the defined time duration has expired (YES at step 2906), during which duration the safety device has not received either an IAH response at step 2904 or an IAH message at step 2912, the safety device configures itself for OSSD mode, since failure to receive these messages within the defined time duration implies that the safety device is not installed on a single-wire safety circuit. Alternatively, if the defined time duration has not expired (NO at step 2906), the methodology returns to step 2902 and steps 2902-2906 are repeated until either an IAH response is received at step 2904 or an IAH message is received at step 2912.

While steps 2902-2906 are being carried out, the safety device also continues monitoring to determine whether an IAH message from an adjacent device has been received on the safety device's SWS+ OUTPUT terminal at 2912. If an IAH message is received at the SWS+ OUTPUT terminal (YES at step 2912), the safety device enables SWS+ mode, since receipt of an IAH message suggests that the safety device is installed on a single-wire safety circuit. Alternatively, if no IAH message is received (NO at step 2912), the methodology proceeds to step 2906, where a determination is made as to whether the defined time duration has expired. If the time duration has expired (YES at step 2906), the safety device configures itself for OSSD mode. If the time duration has not expired (NO at step 2906), the methodology returns to step 2912 and monitoring continues. Once the operating mode has been set according to methodology 2900, the input and output terminals will be configured to function in accordance with the selected operating mode (e.g., in accordance with Table 2 above).

The examples described above in connection with FIGS. 1-29 have depicted SWS+ safety networks that comprise a comms master device (e.g., comms master device 402) that communications with one or more safety devices having integrated SWS+ capability. That is, the safety devices described in the foregoing examples are designed to interact with each other and with the comms master in accordance with the SWS+ protocols described above. The present disclosure also provides techniques for interfacing standard safety devices that do not have integrated SWS+ capabilities with a SWS+ safety circuit. This can be achieved through the use of smart tap devices that link the standard (non-SWS+) safety devices to a SWS+ single-wire channel.

Figure 30:
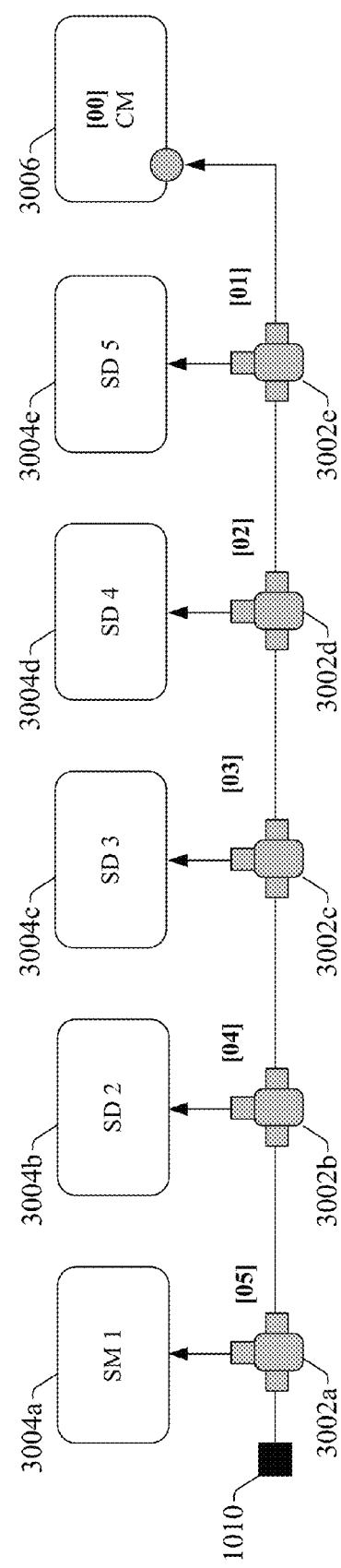
FIG. 30 is a diagram of a SWS+ safety circuit that includes a comms master device and five standard safety devices that are linked to the single wire channel using smart tap devices.

FIG. 30 is a diagram of a SWS+ safety circuit that includes a comms master device 3006 and five standard safety devices 3004 that are linked to the single wire channel using smart tap devices 3002. Each smart tap device 3002 includes SWS+ communication functionality similar to that of the SWS+ safety devices described in previous examples. However, rather than determining its current safety status based on native safety logic, the smart tap device 3002 reads its current safety status from the standard safety device connected to a slave device terminal of the tap device. The smart tap device can also be programmed or otherwise configured to proxy information relating to the safety device connected to its slave device terminal. In other respects, each smart tap device 3002 behaves in a similar manner to a SWS+ safety device. For example, each smart tap device 3002 is assigned an SWS+ address during a link enumeration phase (e.g. link enumeration phase 908), passes safety signals, and communicates with the comms master 3006 as described in previous examples. In this regard, each smart tap device 3004 can include some or all of the components described above in connection with FIG. 5 in order to facilitate operation on the SWS+ channel in a manner similar to a safety device with integrated SWS+ capability. Similar to a safety device with SWS+ capability, if a smart tap device is installed as the last device on the single-wire safety circuit (as is smart tap device 3002a in FIG. 30), a terminator 1010 can be installed on that smart tap device to designate the tap device as the safety master for the single-wire safety circuit. When designated as the safety master, this smart tap device 3002a will generate the safety signal pulse pattern to be placed on the channel, similar to a safety device with SWS+ capability.

Various types of smart tap devices can be provided for different types of standard safety devices, including 5-pin standard OSSD or EMSS devices and 8-pin standard OSSD and EMSS devices. Example electrical connections for various types of smart tap devices are illustrated in FIGS. 31A-31D. Smart tap device 3102a of FIG. 31A is configured for use with a 5-pin OSSD safety device, and includes three ports—a slave device terminal for connection to the OSSD safety device, a comms master terminal for connection to the SWS+ channel in the direction of the comms master device, and a safety source terminal for connection to the SWS+ channel in the direction of the safety master device. The printed circuit board (PCB) 3104a can include electronics that monitor the OSSD device's safety status (via the OSSD A and OSSD B lines of the slave device terminal), controls power to the OSSD device in accordance with commands receive on the SWS+ channel, and provides lock commands to locking switches or monitors the auxiliary line of non-locking switches (both of which are performed via the Aux/Lock line of the slave device terminal). PCB 3104a can also monitor current on the ground to the connected safety device. Pins on the slave device terminal connect to the OSSD device's power, ground, OSSD A, OSSD B, and auxiliary or lock connections via a suitable cable that connects the smart tap 3102a to the OSSD device. The comms master and safety source terminals include pins that connect to the power, ground, SWS+, and supplemental lines of the SWS+ circuit via suitable cables that connect these terminals to adjacent devices (either SWS+ safety devices or other smart tap devices) on the channel. PCB 3104a (or another component of the smart tap device) also includes one or more components depicted in FIG. 5 to allow the smart tap device to support functions similar to an SWS+ safety device.

Smart tap device 3102b of FIG. 31B is configured for use with a 5-pin standard EMSS safety device. The slave device terminal of smart tap device 3102b connects to the Contact A IN, Contact B IN, Contact A OUT, and Contact B OUT connections of the EMSS device via a suitable cable. In addition to implementing SWS+ safety device functionality (by implementing components similar to those described above in connection with FIG. 5), PCB 3104b can monitor and test the dry contacts of the EMSS device (via the Contact A/B IN/OUT lines of the slave device terminal), thereby determining the state of the attached safety device. The PCB 3104*b* can also monitor current on the ground connection to the attached safety device.

Smart tap device 3102*c* of FIG. 31C is configured for use with an 8-pin standard OSSD safety device. The slave device terminal of smart tap 3102*c* connects to the power, ground, OSSD A IN, OSSD B IN, OSSD A OUT, and OSSD B OUT connections of the OSSD device via a suitable cable. The slave device terminal also includes connections for an Auxiliary line and a Lock Command Line. For locking switches that are connected to the slave device terminal as a slave device, the PCB 3104*c* can convert the signal on the supplemental line of the SWS+ circuit to a 24 VDC or 0 VDC lock command that is then sent on the Lock Command line of the safety device terminal. The auxiliary line of the slave device terminal can be used to monitor the auxiliary line of the slave device, or to exchange other types of signaling with the connected safety device. Like the other smart taps, PCB 3104*c* (or another component of the smart tap device) also includes one or more components depicted in FIG. 5 to allow the smart tap device 3102*c* to support functions similar to an SWS+ safety device.

Smart tap device 3102*d* of FIG. 31D is configured for use with an S-pin standard EMSS device. The slave device terminal of smart tap 3102*d* connects to the Contact A IN, Contact B IN, Contact A OUT, and Contact B OUT lines of the EMSS safety device via a suitable cable. The slave device terminal also includes a line for a Lock Command for locking switches that may be connected to the tap as a slave device. In addition to implementing similar SWS+ functionality to that of the SWS+ safety device of FIG. 5, PCB 3104*d* of smart tap device 3102*d* can send pulsed signals through the slave device contacts and monitor the return lines to determine whether the safety device contacts are closed. PCB 3104*d* can also convert a signal on the supplemental line of the SWS+ circuit to a 24 VDC or 0 VDC lock command or permissive and apply this converted signal to the Lock Command line of the slave device terminal (for locking switches that are connected to the slave device terminal).

Figure 32:
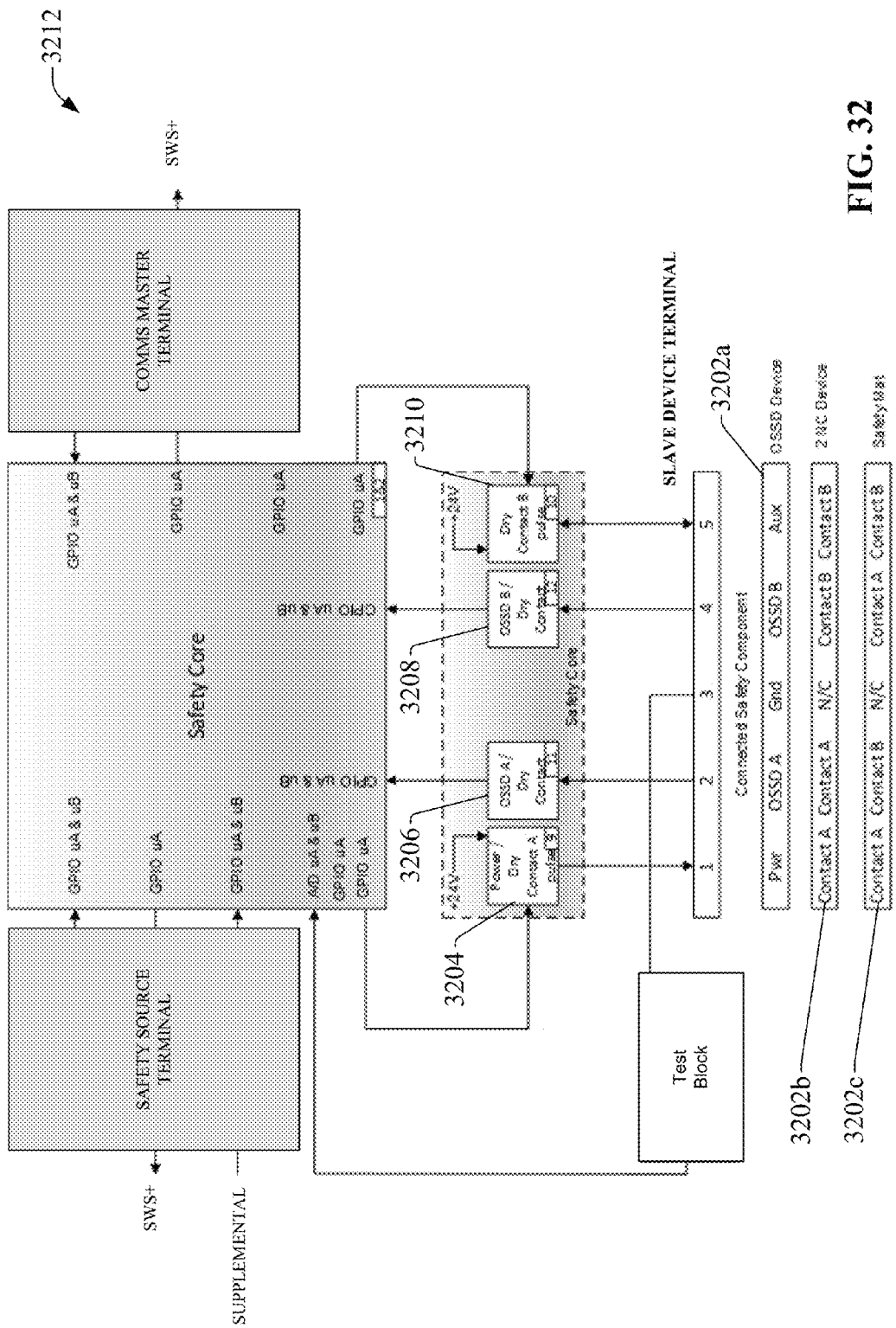
FIG. 32 is a generalized block diagram of a 5-pin smart tap device illustrating how three example types of safety devices connect to the lines of the tap's slave device terminal.

Smart tap devices perform similar functions to those of safety device having embedded SWS+ capability (e.g., safety devices 502). However, rather than determining its current safety status by monitoring a sensing input that is native to the device (e.g., a strain gauge, an optical sensor input, a pressure sensor of a safety mat, etc.), the smart tap device monitors outputs of the standard safety device connected to its slave device terminal to determine whether there is a demand on the device's safety function. FIG. 32 is a generalized block diagram of a 5-pin smart tap device 3212 illustrating how three example types of safety devices would connect to the lines of the tap's slave device terminal. As shown in FIG. 32, an example OSSD device 3212 may include connections for power, OSSD A, Ground, OSSD B, and an Auxiliary. A safety device having two normally closed (NC) contacts (e.g., an EMSS device, such as an emergency stop push-button) may include two connections each for Contact A and Contact B, and an unused line (N/C). An example safety mat device 3202*c* may have similar connections to those of the 2 NC device, but may correspond to different lines. The lines of the tap's slave device terminal are configured to accommodate these various types of 5-pin device connections. For example, function block 3204 of the slave device terminal may support both provision of 24 VDC power (for use with OSSD device 3202*a*) as well as generation and output of a dry contact pulse to a contact terminal (for use with the 2NC device 3202*b* or the safety mat device 3202*c*). Function block 3206 of the slave device terminal can be configured to support input signals from an OSSD A line for use with OSSD device 3202*a*, as well as contact inputs for use with the 2NC device 3202*b* or the safety mat device 3202*c*). Function blocks 3208 and 3210 can be similarly configured to accommodate the different types of safety device connections to which those blocks may be connected.

In order to allow a single 5-pin smart tap device to be used with a variety of different types of safety devices, one or more embodiments of the smart tap device can automatically detect the type of safety device that is connected to the tap's slave device terminal, and to configure the lines of the safety device terminal in accordance with the detected device type. That is, based on the type of safety device connected to the smart tap device, the slave device terminal will automatically configure function blocks 3204, 3206, 3208, and 3210 (as well as any other necessary components of the tap device) to provide the appropriate output signals or power, to monitor the appropriate input signals, and to implement the necessary logic required to exchange data with the connected safety device. For example, the smart tap device may determine that the connected safety device is an OSSD device (e.g., a light curtain or other OSSD device) in response to determining that, when 24 VDC power is applied to the first line of the slave device terminal (e.g., line 1 in FIG. 32), a measured current on particular line of the slave device terminal exceeds a threshold value indicative of an OSSD device.

If this measured current does not exceed the threshold value indicative of an OSSD device, the tap device may assume that the connected device is either a 2NC dry contact device or a safety mat device, in which case the line on which the 24 VDC power is being applied is assumed to be a Contact A input (since this line is used for Contact A input for both the dry contact device and the safety mat). Accordingly, the smart tap device can determine which of the two types of device is connected based on a determination of which line of the slave device terminal receives the return voltage on the Contact A output. In the example depicted in FIG. 32, if the return voltage is detected on line 2 of the slave device terminal, the tap device 3212 determines that the connected device is a 2NC dry contact device 3202*b*. Alternatively, if the return voltage is detected on line 4 of the slave device terminal, the tap device 3212 determines that the connected device is a safety mat device 3202*c*. In response to determining the type of safety device that is connected, the smart tap device 3212 configures the appropriate function blocks (e.g., function blocks 3204, 3206, 3208, 3210, etc.) to conform to the standards of the attached safety device.

It is to be appreciated that this technique for automatically determining the type of safety device connected to the slave device terminal of the smart tap device is only intended to be exemplary, and that any suitable technique for automatically identifying the type of connected safety device is within the scope of one or more embodiments described herein.

Figure 33A:
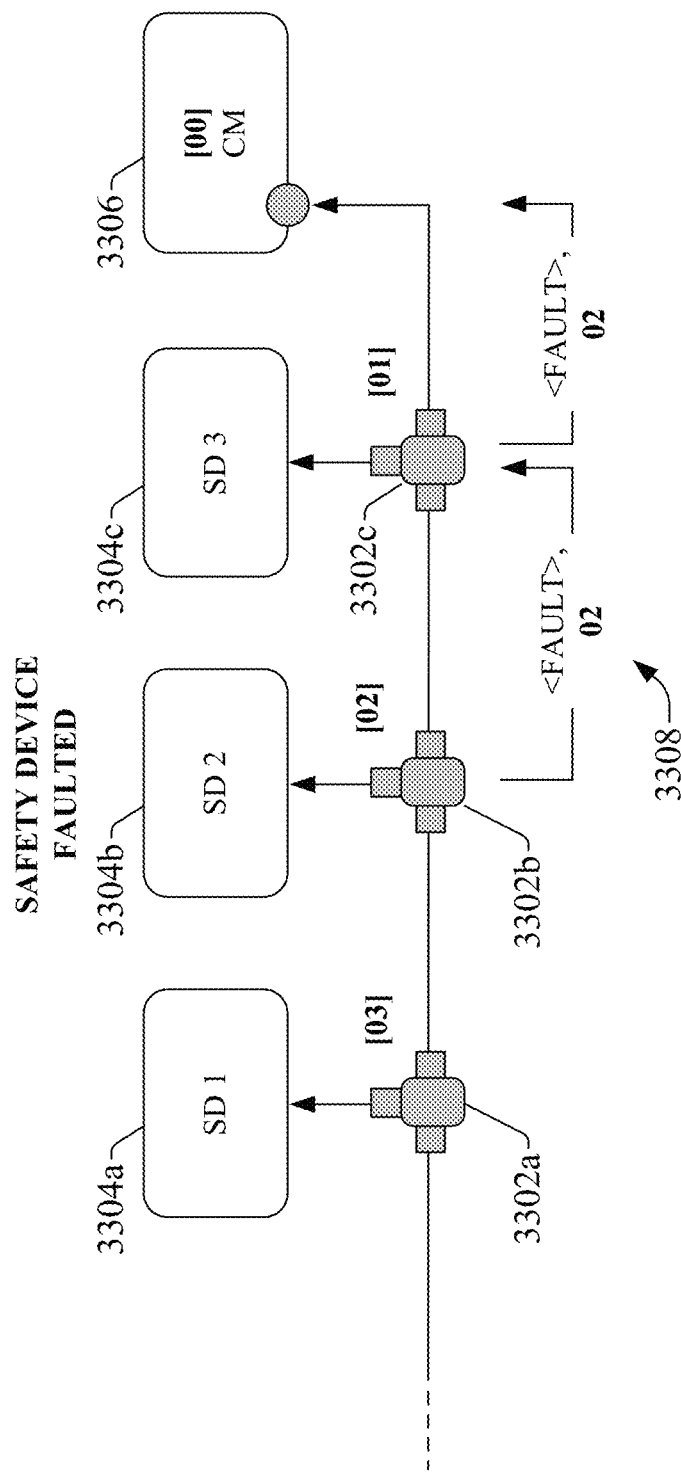
FIGS. 33A and 33B are diagrams illustrating the use of smart tap devices to initiate a remote reset of a selected safety device on an SWS+ circuit.
Figure 33B:
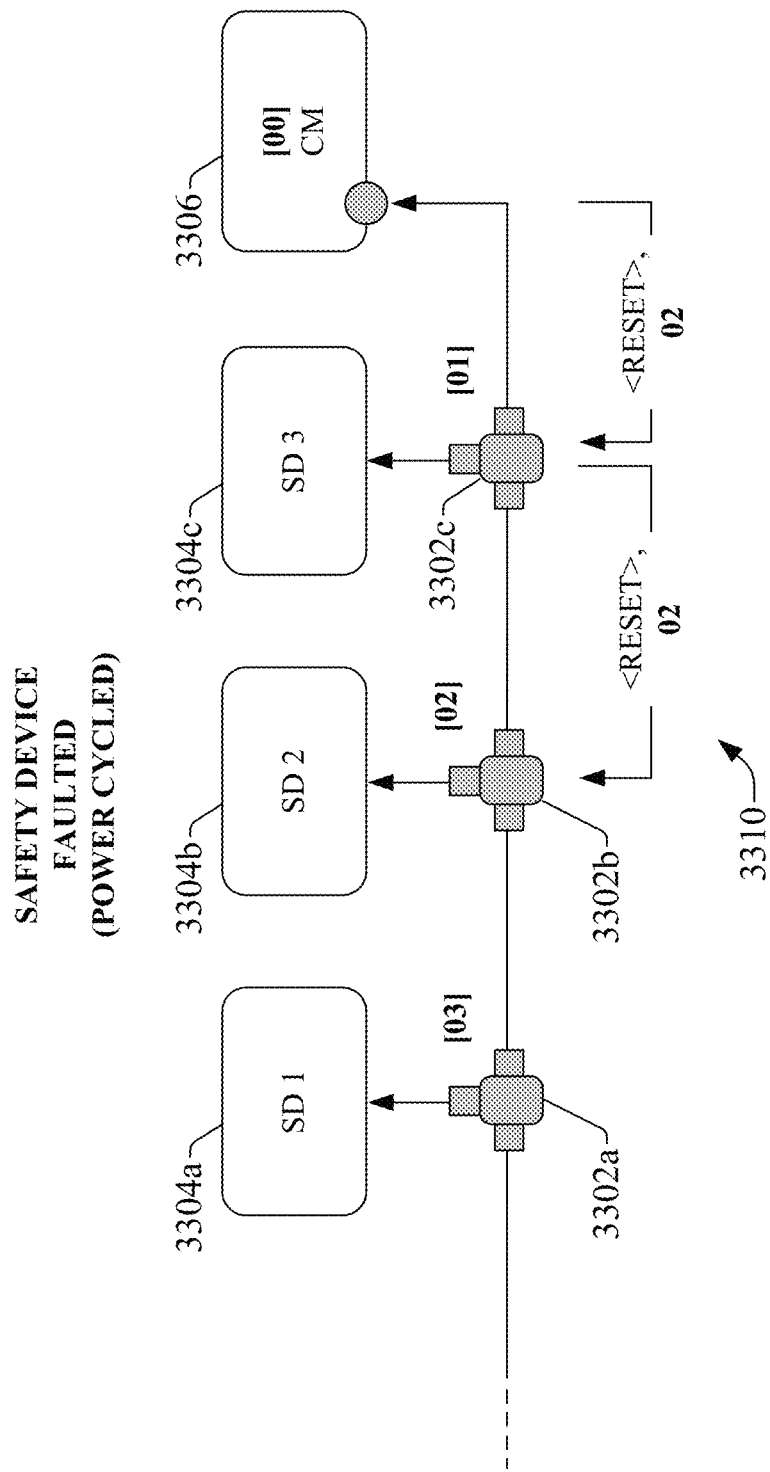

In one or more embodiments, smart tap devices can also be used to facilitate a remote reset of a single safety device on the SWS+ channel without requiring power on all safety devices to be reset. FIGS. 33A and 33B illustrate the use of smart tap devices to initiate a remote reset of a selected safety device on an SWS+ circuit. In this example, a number of standard safety devices 3304 (that is, safety devices that do not have integrated SWS+ capabilities or compatibility) are included as part of a SWS+ safety circuit. Since the standard safety devices 3304 do not have integrated SWS+ capability, the devices 3304 are integrated to the single-wire channel using smart tap devices 3302a. In the illustrated example, safety device 2—which is attached to the SWS+ channel via smart tap device 3302b, which has been designated with SWS+ address [02] —has experienced an internal fault condition. This fault condition has been detected by smart tap device 3302b via the slave device terminal of the tap device. Accordingly, smart tap device 3302b stops passing the pulsed safety signal received from smart tap device 3302a, and sends a fault message 3308 to the comms master 3306 (via smart tap device 3302c), similar to previously described examples (see, e.g., FIGS. 16A-16F).

Depending on the type of safety device experiencing the fault, it may be necessary to cycle power to the safety device in order to clear the fault condition. However, multiple safety devices 3304 may be receiving power from a common power supply, and therefore resetting the safety device 3304b by disconnecting and reconnecting the power supply feed (e.g., by opening and closing a breaker on the power supply output) would cause all of these safety device—not just the faulted device—to be reset.

To avoid the necessity to cycle power on multiple safety devices in order to reset a single device, the smart tap devices can support a remote reset function, whereby a reset command directed to a specified smart tap device is issued by the comms master 3306 via the single-wire channel, and the smart tap device 3304 to which the command is directed will cycle power to its attached safety device. FIG. 33B illustrates remote reset of standard safety device 3304 via smart tap. As shown in this figure, comms master 3306 issues a remote reset message 3310 via the single-wire channel. The message 3310 can include the reset command as well as the SWS+ address of the smart tap device [02] to which the command is directed. The comms master 3306 may issue the reset message 3310, for example, in response to an acknowledgement input from the user (e.g., via an HMI or a hardware input device connected to the comms master 3306). Similar to other types of SWS+ messages, any smart tap devices 3302 (or SWS+ safety devices that may also be attached to single-wire channel) positioned between the comms master 3306 and the target smart tap device 3302b will read the address included in the message 3310, and pass the message to the next smart tap device 3304 or SWS+ safety device on the channel in response to determining that the address specified in the message does not correspond to the device's own address. When smart tap device 3302b receives reset message 3310 and determines that the address included therein corresponds to the tap's own address, the smart tap device 3302 will momentarily disconnect power to the safety device 3304b (e.g., by momentarily disconnecting the Power line of the tap's slave device terminal). In this way, the faulted safety device can be reset without disconnecting power to other non-faulted devices on the single-wire channel.

In addition to remotely resetting the standard safety devices connected to the smart tap devices, the smart tap devices themselves can also be reset using a separate remote reset function. In this regard, the smart tap device itself may experience an internal fault, which is distinct from an internal fault experienced on the tap's connected safety device. In such scenarios, the comms master can issue a remote tap reset command (e.g., in response to receiving a suitable acknowledgement input from a user) that causes the smart tap device to reset and clear the fault. This type of reset may involve simply clearing the fault condition on the tap device without cycling power to the tap device or its associated safety device.

Some embodiments of the smart tap device can also be configured to detect certain types of diagnostic information for its associated standard safety device. For example, some smart tap devices can be configured to detect a low voltage condition of the safety device attached thereto. In such embodiments, the smart tap device can send a report message to the comms master via the single-wire channel indicating the low voltage condition of its connected safety device. In response to such a message, the comms master can initiate a defined action (e.g., generating a notification directed to a HMI or personal device of a suitable technician, or placing the safety device in a safe state until the low voltage condition is removed).

Figure 34:
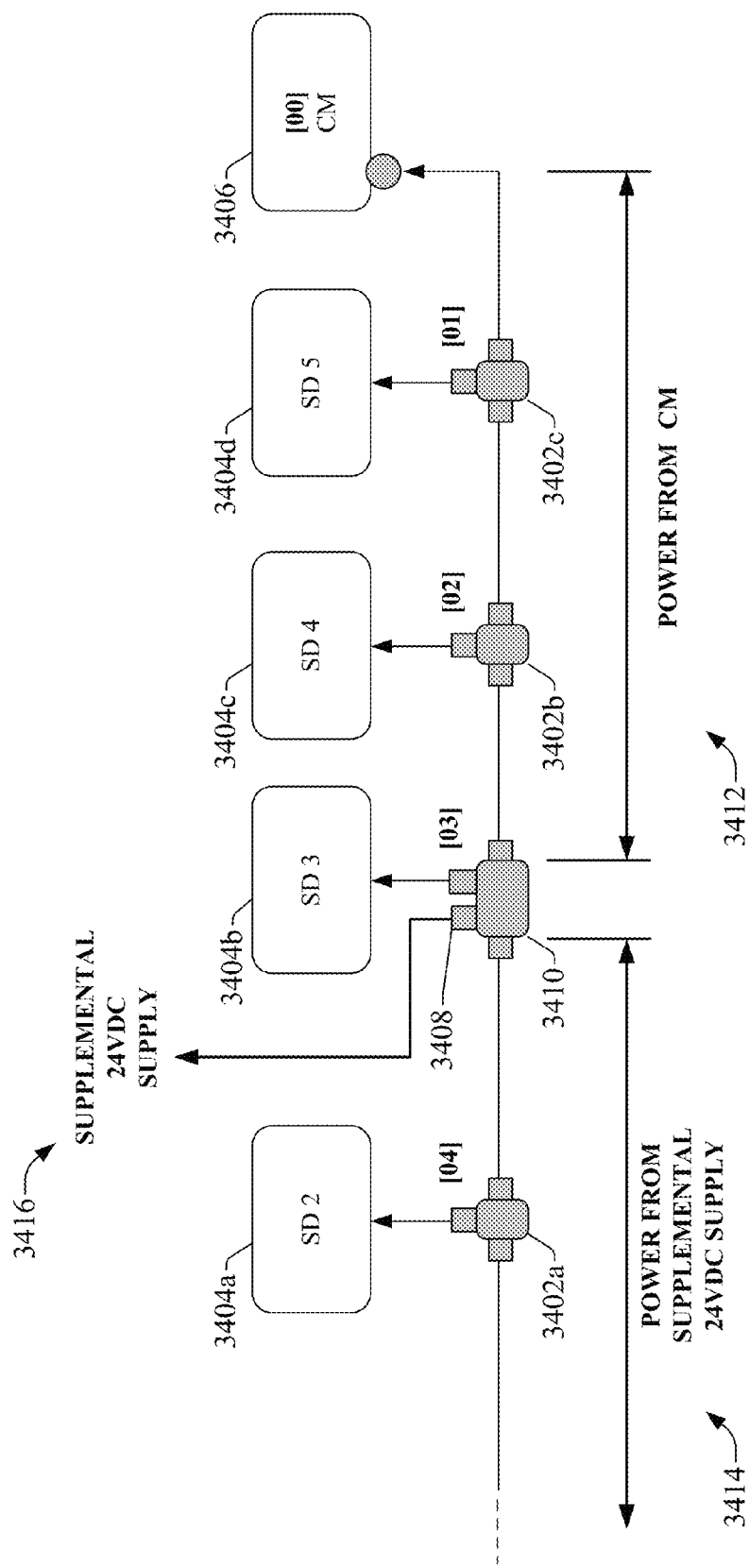
FIG. 34 is a diagram of an example SWS+ safety circuit that includes a smart tap with an integrated power tap.

In addition to the three-port smart tap devices described above, some embodiments of the smart tap devices can include an additional port for power connections, referred to herein as a power tap. FIG. 34 is a diagram of an example SWS+ safety circuit that includes a smart tap 3410 with an integrated power tap 3408. In this illustrated example, standard smart devices 2, 4, and 5 (3404a, 3404c, and 3404d) are connected to the single-wire channel via smart tap devices 3402a, 3402b, and 3402c, which have been assigned SWS+ addresses [04], [02 ], and [01], respectively. Standard safety device 3404b is also connected to the single-wire channel via smart tap device 3410 (SWS+ address [03]), which includes power tap capability.

Smart tap device 3410 has the same three terminals as the smart tap devices described above; namely, a slave device terminal that connects to the standard safety device, and a safety source terminal and a comms master terminal that connect to the SWS+ channel. In addition, smart tap device 3410 includes a power tap connector 3408 that connects to an additional power supply. When a smart tap device 3410 with an integrated power tap is connected to the SWS+ channel, the power supply lines on either side of the smart tap device 3410 become isolated from one another. This results in two power segments for the SWS+ circuit—a first power segment 3412 between the comms master 3406 and the smart tap device 3410, and a second power segment 3414 between the smart tap device 3410 and the safety master device (not shown in FIG. 34). The first power segment 3412 receives 24 VDC power from the comms master 3406, while the second power segment 3414 receives power from a supplemental 24 VDC supply 3416 connected to the power tap 3408 of smart tap device 3410. The addition of smart tap devices with power tap capability can prevent excessive voltage drop on safety circuits having a large number of safety devices or smart tap devices that have a combined load exceeding the maximum draw of a single power supply. In such scenarios, a designer can use a smart tap device 3410 with an integrated power tap 3408 to divide the safety devices and/or power tap devices between two or more power supplies.

Although FIG. 34 depicts the power tap capability as being integrated in a smart tap device 3408, three-port power tap devices that do not include smart tap device capability are also contemplated. Such power tap devices—which include a power tap terminal, a comms master terminal, and a safety source terminal—can be installed on the single-wire channel between two safety devices in order to create isolated power segments on either side of the power tap devices. These power tap devices act as a pass-through for SWS+ signals, but isolate the power supply lines on either side of the power tap device.

Figure 35:
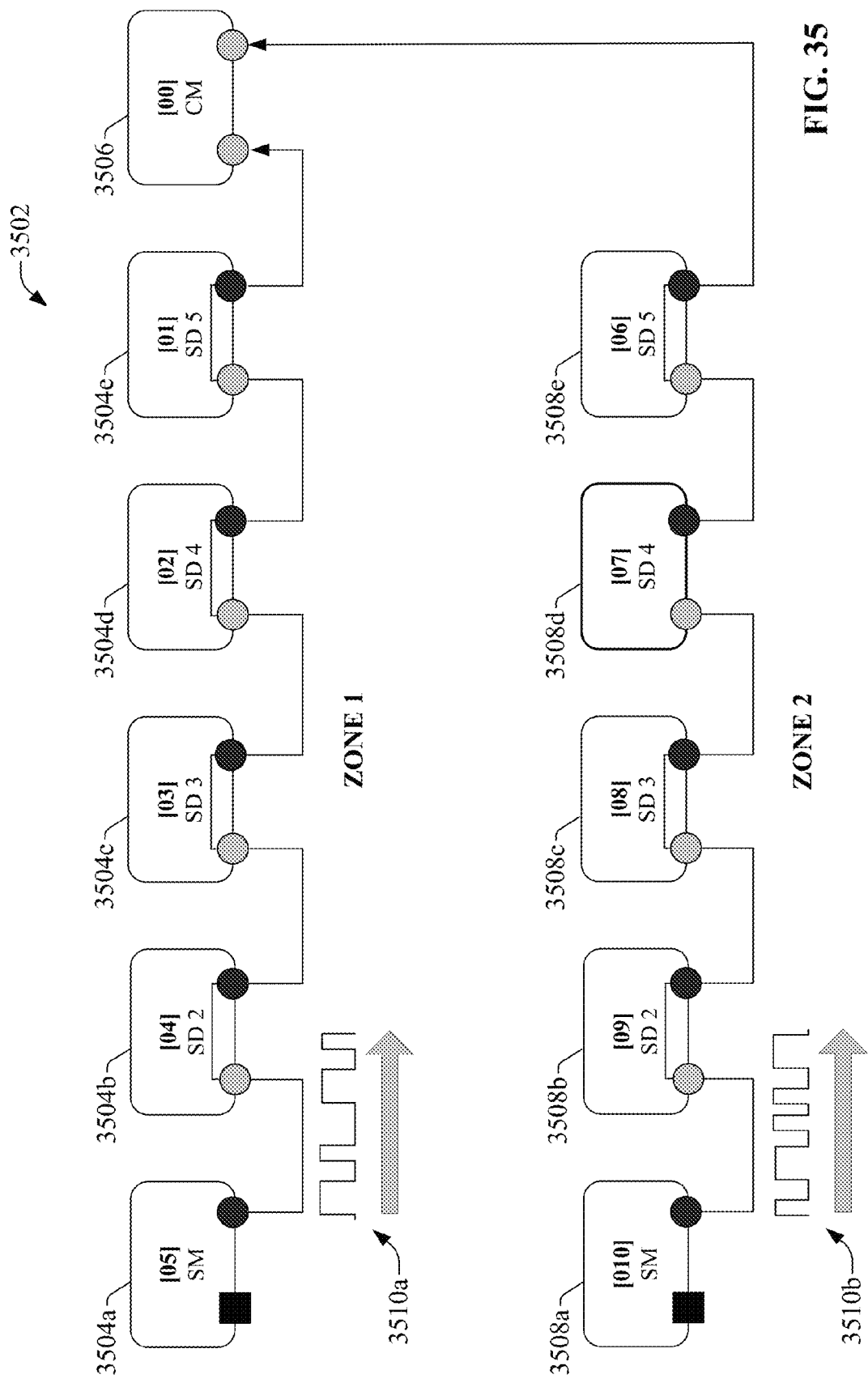
FIG. 35 is a diagram illustrating a SWS+ safety circuit comprising a comms master that monitors safety devices on two single-wire channels.

Although the example single-wire safety circuits described above have assumed a comms master having a single SWS+ INPUT terminal for connection to a single safety channel, some embodiments of the comms master may support monitoring of two or more single-wire channels. FIG. 35 is a diagram illustrating a SWS+ safety circuit 3502 comprising a comms master 3506 that monitors safety devices on two single-wire channels. In such embodiments, the comms master 3506 can include two SWS+ INPUT terminals for connection to the respective single-wire channels, allowing safety devices to be segregated into zones. In the illustrated example, safety devices 3504a-3504e reside on a first single-wire channel and comprise a first zone (Zone 1), while safety devices 3508a-3508e reside on a second single-wire channel and comprise a second zone (Zone 2). Similar to previous examples, each safety channel includes a safety master (3504a for Zone 1 and 3508a for Zone 2) that generates a pulsed safety signal (3510a and 3510b for Zones 1 and 2, respectively), with each safety master generating its safety signal independently of the other.

If the same pulse pattern is used for each of the pulsed safety signals 3510a and 3510b, there exists a possibility that an inadvertent short-circuit across the two SWS+ INPUT terminals of the comms master 3506 may prevent the comms master from transitioning to a safe state even if a safety device on one of the two channels stops conveying the safety signal on that channel, since the comms master will still recognize the pulse pattern received from the other channel on both of its shorted SWS+ INPUT terminals. Therefore, to ensure that a short-circuit across the two SWS+ INPUT terminals on the comms master 3506 does not prevent the comms master from reacting to an unsafe condition on one of the channels, the two safety masters 3504a and 3508a can be configured to generate respective two different pulse patterns that are uniquely identifiable by the comms master 3506.

To achieve this, an additional phase can be added to the startup mode sequence described in above in connection with FIG. 9, wherein the comms master instructs the safety devices (and/or smart tap devices) on each channel which predefined safety signal pattern is to be used by that channel. For example, each SWS+ safety device or smart tap device may be preconfigured to recognize one of multiple pre-defined pulse patterns. During the safety system's startup sequence, the comms master 3506 can designate one of the pre-defined pulse patterns to each of the two channels, selecting different patterns for each channel. At a defined phase of the startup sequence, the comms master 3506 can send a configuration message that includes an identifier of the selected pattern to the safety devices via the single-wire channel.

Upon receipt of this configuration message, each safety device will self-configure to begin operating in accordance with the selected pulsed safety signal. For example, the respective safety masters 3504a and 3508a will use the specified pulse patterns for generation of the pulsed safety signals 3510a and 3510b. The other safety devices on each channel—having also been provided with the identification of the pulse pattern designated to that channel by the comms master—will only recognize the designated pulse pattern as the valid safety signal for that channel. The comms master 3506 will only assume that a given channel is in the safe state if the pulse pattern designated for that channel is recognized on the SWS+ INPUT terminal for that channel. In this way, a short-circuit across the two SWS+ INPUT terminals of the comms master 3506 will cause the comms master to see an incorrect pulse pattern on one of the SWS+ INPUT terminals, causing the comms master to switch to safety mode until the short-circuit is removed.

Figure 36:
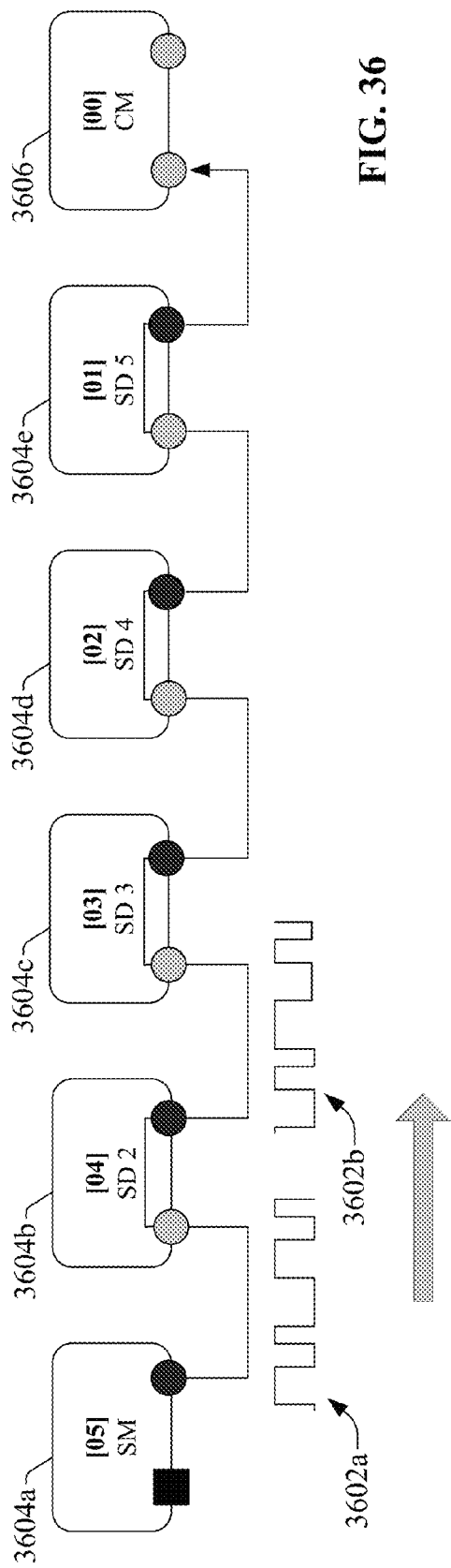
FIG. 36 is a diagram illustrating a SWS+ safety circuit that includes safety devices that invert the safety signal pulse pattern prior to outputting to the next device.

It is also recognized that short-circuits across the SWS+ INPUT and SWS+ OUTPUT terminals of a given safety device can also cause safety issues, since this may cause a safety signal received the SWS+ INPUT terminal to always be passed to the device's SWS+ OUTPUT terminal, even if the safety device is not in a safe state. To mitigate this possibility, one or more embodiments of the SWS+ safety devices (or smart tap devices) can be configured to invert the pulsed safety signal received on its SWS+ INPUT terminal prior to outputting the safety signal on its SWS+ OUTPUT terminal. FIG. 36 is a diagram illustrating a SWS+ safety circuit that includes safety devices 3604 that invert the safety signal in this manner. In these embodiments, an additional phase can be added to the startup sequence of the safety circuit whereby the devices on the safety circuit negotiate as to which devices will be configured to recognize the non-inverted pulse pattern (that is, the pattern generated by safety master 3604a) as the valid safety signal, with the remaining devices being configured to recognize the inverted version of the pulsed pattern as the valid safety signal. This negotiation is designed to ensure that every other device on the circuit—beginning with the safety device 3604b that is adjacent to the safety master 3604a—is configured to recognize the non-inverted signal, with the other devices on the circuit being configured to recognize the inverted signal.

During operation, safety device 3604b—which is adjacent to the safety master 3604a and configured to receive the non-inverted signal—receives pulsed safety signal 3602a from safety master 3604a on its SWS+ INPUT terminal, and recognizes this non-inverted pattern as the valid safety signal. If safety device 3604 is not currently in safe mode, the device will invert this received pattern and send the inverted pattern as safety signal 3602 on its SWS+ OUTPUT terminal. Safety device 3604c—which is configured to recognize the inverted pattern as the valid safety signal—receives this inverted signal and likewise inverts the pattern again prior to outputting the signal on its SWS+ OUTPUT terminal (yielding the original non-inverted signal). This procedure continues through all the devices (assuming none are in safe mode) until the signal reaches the comms master's SWS+ INPUT terminal.

The version of the signal recognized by the comms master 3606 as the valid safety signal will depend on the number of safety devices on the circuit. For example, if the comms master identifies that there are an even number of safety devices on the circuit, the comms master will configure itself during startup to recognize the inverted pattern as the valid signal, whereas if there is an odd number of safety devices on the circuit, the comms master will configure itself to recognize the non-inverted pattern as the valid signal.

In accordance with the general operation of the example SWS+ safety systems described above, the designated safety master device generates a defined pulse pattern and outputs the pattern as a safety signal on the single-wire channel. As long as all safety devices on the channel are in their respective safe states (that is, there is no demand on the safety input devices), the safety signal is relayed by the safety devices in turn until the signal reaches a safety relay device acting as the comms master for the single-wire safety circuit. If any of the safety devices detects an unsafe condition (e.g., a light broken light curtain, an emergency stop button pressed, a safety mat activated, an emergency pull cord pulled, etc.), that safety device ceases relaying the safety signal, preventing the safety signal from reaching the comms master. When the comms master detects absence of the safety signal, the safety relays of the comms master are opened to remove power from the protected system, and the comms master begins sending requests for diagnostic information (DIAG messages) to each safety device in turn via the single-wire channel. Each safety device responds to its received request by sending the requested diagnostic information via the single-wire channel. This general operation is described above in connection with FIGS. 15A-15D.

In these foregoing examples, after the safety circuit has entered run mode (that is, the startup sequence has been completed and the safety circuit begins normal operation), diagnostic information originating from the safety devices is only sent to the comms master via the single-wire channel in response to a request from the comms master for such information, and only after the pulsed safety signal has stopped transmitting on the single-wire channel. That is, in the embodiments described above, data originating from the safety devices is only available to the comms master while the system is in the safe state, while the safety signal is not being conveyed on the single-wire channel.

Some other embodiments of the SWS+ safety system can also be configured to allow safety devices on the safety circuit to send data to the comms master via the single-wire channel while the safety system is in the normal operating state; that is, while the pulsed safety signal is still being relayed to the comms master. This allows the safety devices to report prognostic data or other types of information to the comms master without waiting for the safety system to transition to the safe state. In such embodiments, data messages send by a safety device during normal operation of the safety circuit will typically not relate to the safe or un-safe state of the safety device, but rather to non-critical prognostic or warning information relating to the safety device that may warrant attention by an operator or technician (e.g., high temperature warnings, warnings that the number of operating cycles for the safety device is approaching the rated lifespan of the safety device, etc.) but are not indicative of an immediately unsafe condition.

Figure 37:
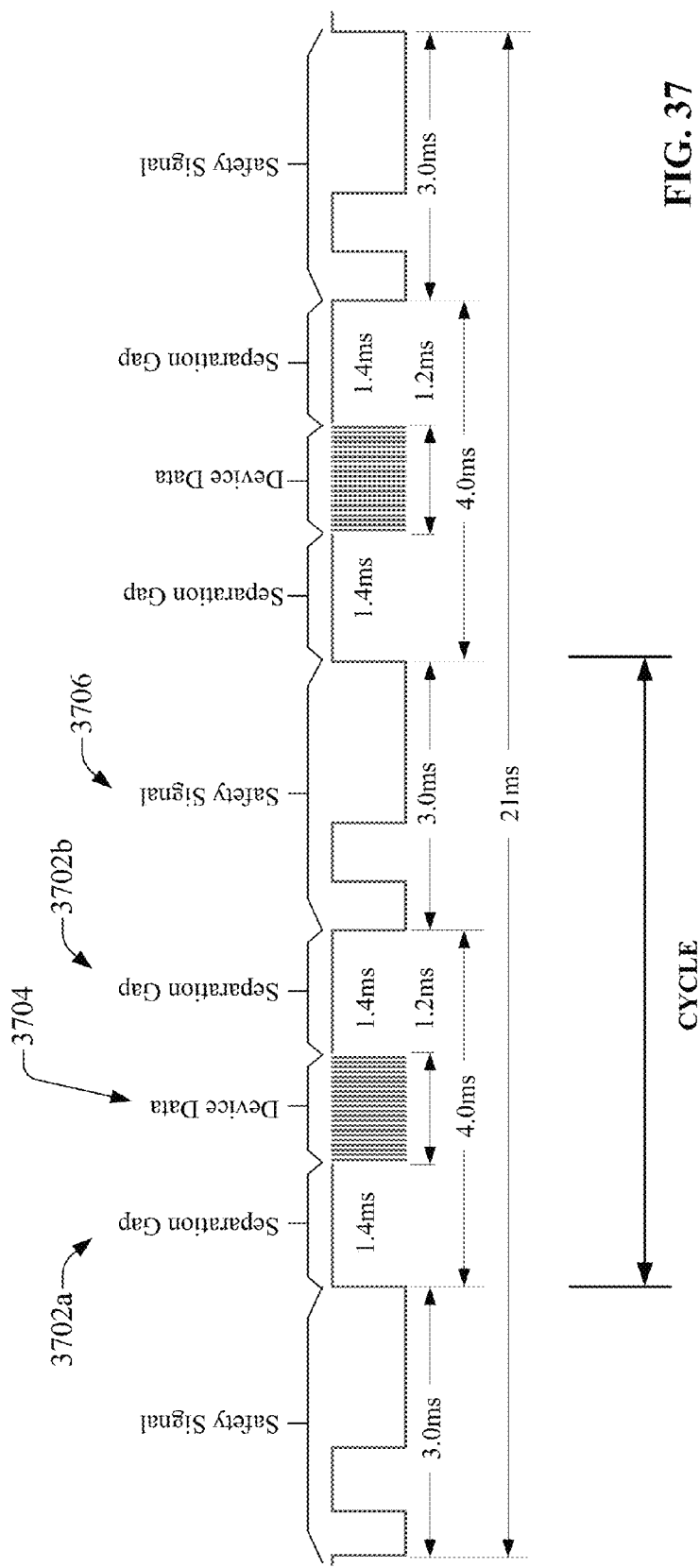
FIG. 37 is a diagram of an example modified safety signal that includes a safety signal portion and a device data portion within each cycle.

In order to allow the safety devices to send such information while the pulsed safety signal is being sent on the single-wire channel, SWS+ safety devices compliant with these embodiments can support a modified version of the pulsed safety signal that includes, within a given cycle of the safety signal, a safety signal portion and a device data portion. FIG. 37 is a diagram of an example modified safety signal that includes a safety signal portion and a device data portion within each cycle. For embodiments that support transmission of safety device prognostic data during normal operation of the SWS+ safety circuit, safety signals conforming to the general format illustrated in FIG. 37 can replace the safety signal described in previous examples to allow safety device data to be sent while the pulsed safety pattern is still being conveyed on the single-wire channel.

As shown in FIG. 37, each cycle of the modified safety signal includes a safety signal portion 3706 that conveys a defined pulse pattern recognizable by the comms master and all safety devices on the single-wire channel as being the valid safety signal pattern. The safety signal portion 3706 can be of any suitable duration that allows the pattern contained therein to be detected and recognized by the devices on the safety circuit (e.g., 3.0 ms in the present example). Following the safety signal portion 3706, after a separation gap 3702*b* of suitable length (e.g., 1.4 ms in the illustrated example), a device data portion 3704 is transmitted. The device data portion 3704 can include the device data (e.g., prognostic data) generated by one of the safety devices on the circuit, as well as an address of the safety device from which the device data originates. Another separation gap 3702 follows the device data portion 3704, and a new cycle begins by repeating the defined safety signal pattern in another safety signal portion and sending the device data for another safety device in another device data portion 3704.

During operation, the comms master and each safety device will assume that the safety system is operating in normal mode (i.e., all safety devices are in their respective safe states) as long as the defined pulse pattern is detected within each cycle. Meanwhile, the safety devices can insert their prognostic (non-safety) data onto the single-wire channel during normal operation by writing their data to appropriate device data portions 3704, while the pulsed safety signal is still being sent over the channel. Insertion of this prognostic or other data can be performed by the status word control component 516 of the safety device. This format allows the safety devices to voluntarily communicate their prognostic information to the comms master without the information being requested by the comms master, and without first removing the pulsed safety signal from the single-wire channel. If one of the safety devices switches to an un-safe state during this operation, that device will cease relaying the modified safety signal, and diagnostic communications between the comms master and the safety device proceed as described in previous examples.

Figure 38:
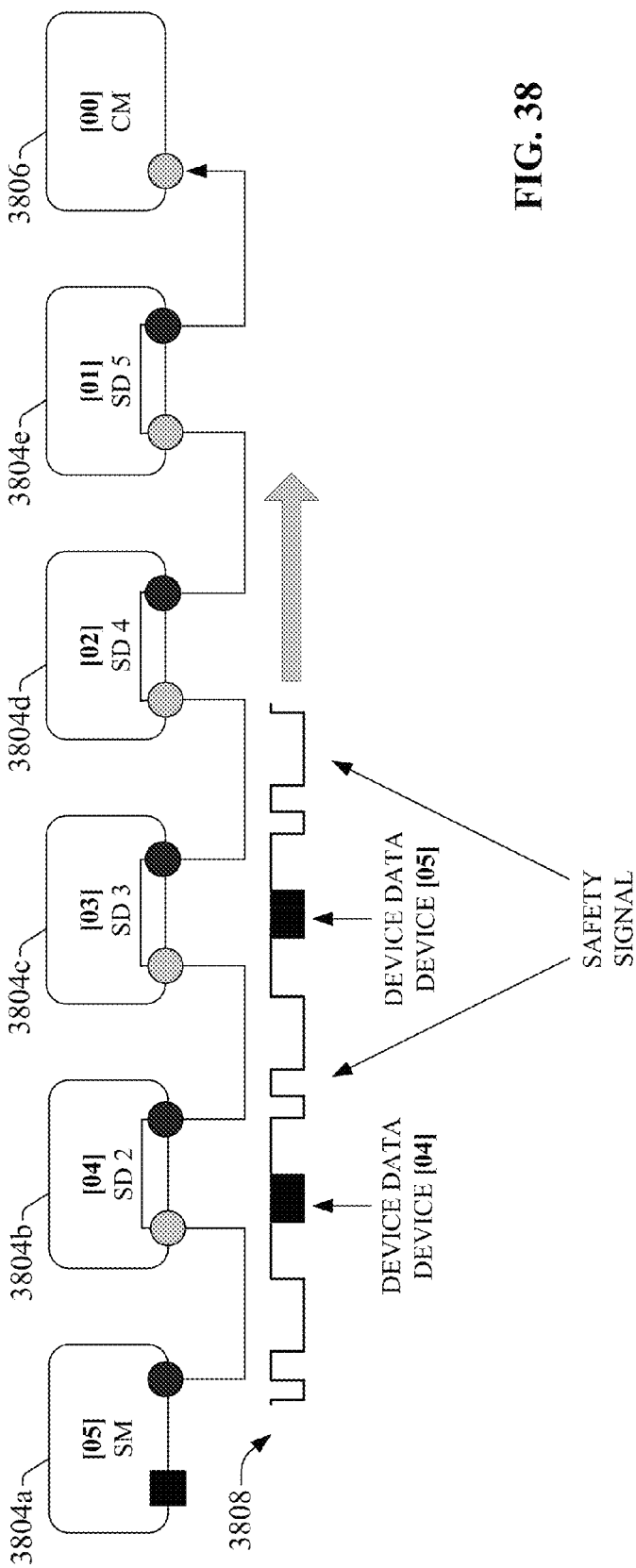
FIG. 38 is a diagram illustrating transmission of a modified safety signal comprising a safety signal portion and a device data portion on a single-wire channel.f
Figure 39:
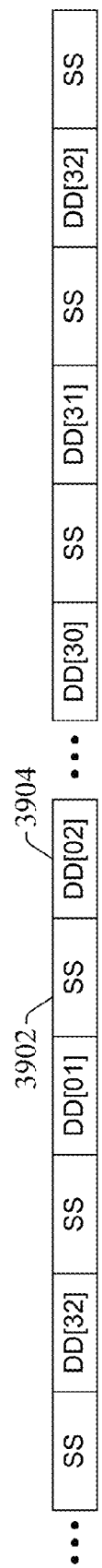
FIG. 39 is a diagram illustrating the alternating safety signal and data portions of an example modified safety signal, showing the ordered transmission of device data for a safety circuit having 32 safety devices.

According to this modified safety signal protocol, each cycle of the safety signal includes the prognostic data (or other type of information) for a single safety device on the safety circuit. FIG. 38 is a diagram illustrating transmission of the modified safety signal on a single-wire channel. According to this protocol, the safety devices 3804 insert their prognostic data (if any) into respective cycles of the safety signal in an ordered fashion, such that the prognostic information is received at the comms master 3806 in descending order of device address. For example, as shown in FIG. 38, the device data for device [05] is followed by the device data for device [04] in consecutive cycles of the safety signal. FIG. 39 is a diagram illustrating the alternating safety signal and data portions of an example modified safety signal, showing the ordered transmission of device data for a safety circuit having 32 safety devices. As shown in this figure, safety signal portions 3902 ("SS") alternate with device data portions 3904 ("DD") within the signal, with each device data portion 3904 containing the device data for the next lower device address relative to the previous device data portion (separation gaps are omitted from FIG. 39 for clarity). That is, the device data is sent in descending order of device addresses, for a total of 32 devices in the illustrated example. When the device data for device address [01] (the lowest address) has been sent within a cycle, the next cycle returns to the highest address (e.g., [032] for a safety circuit that includes 32 safety devices) and sends the device data for that corresponding device.

Figure 40:
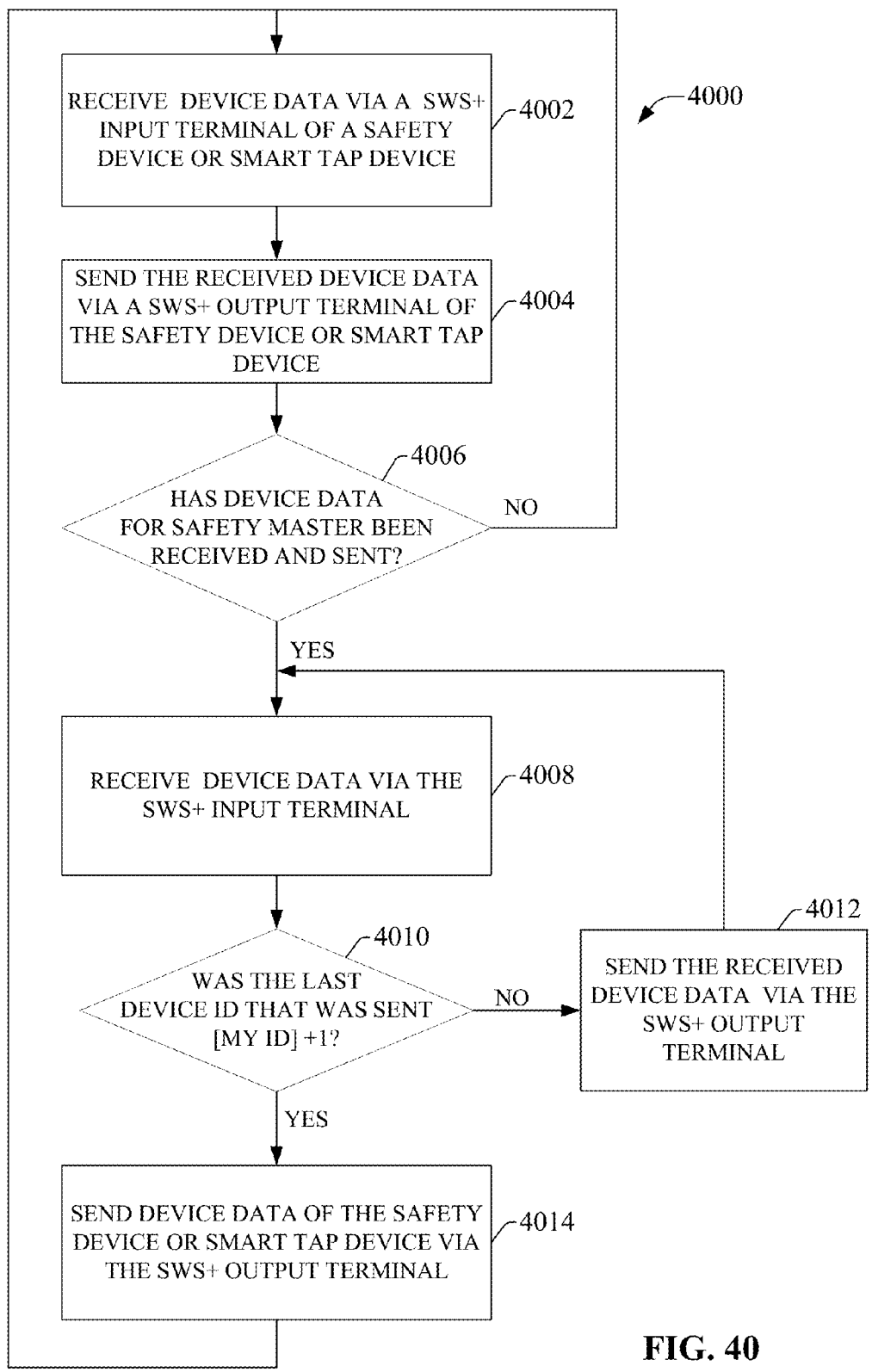
FIG. 40 is a flowchart of an example methodology for determining when a safety device is to insert its own device data into a cycle of a modified safety signal.

To facilitate this ordered delivery of device data, each safety device on the single-wire channel is configured to monitor the device data addresses within the device data portions of the safety signal, and to insert its own device data at an appropriate cycle determined based on this monitoring. FIG. 40 is a methodology 4000 that can be carried out by a safety device (or smart tap device) in order to determine when to insert its own device data into a cycle of the modified safety signal. In this example methodology, it is assumed that the safety device is currently in it safe state, and is therefore relaying valid safety signals and device data received at its SWS+ INPUT terminal to its SWS+ OUTPUT terminal (and possible inverting the pulsed safety signal pattern prior to outputting the safety signal if the safety device supports such embodiments). Initially, at 4002, device data is received at a SWS+ INPUT terminal of the safety device. The device data may be received in alternate frames or portions of a safety signal. The device data may include an address of one of the other safety devices on the circuit as well as device data (e.g., prognostic data) corresponding to that device. At 4004, the safety device sends the received device data via the device's SWS+ OUTPUT terminal.

At 4006, a determination is made as to whether the device data that was sent at step 4004 was the device data for the designated safety master device for the SWS+ circuit, the safety master being the device at the end of the single-wire channel opposite the comms master, and having the highest device address of the safety devices on the channel. If the device data for the safety master was not the most recently sent device data (NO at step 4006), the methodology returns to step 4002 and steps 4002-4006 repeat until the device data for the safety master is sent at step 4004.

If the device data sent at step 4004 was the device data for the safety master (YES at step 4006), the methodology proceeds to step 4008, where device data continues to be received via the SWS+ INPUT terminal of the safety device. This time, prior to outputting the device data via the SWS+ OUTPUT terminal, the safety device determines at step 4010 whether the device address included in the previously sent device data was one address higher than the safety device's own address. ([My ID]+1, where [MY ID] represents the address of the safety device that executes methodology 4000). That is, if the safety device's address is [04], the device determines at step 4010 whether the most recent device data that was output via the SWS+ OUTPUT terminal corresponded to device address [05]. If the most recently sent device data does not include the device address that is one unit higher than the safety device's own address (NO at step 4010), the methodology proceeds to step 4012, where the device data received at step 4008 is sent via the safety device's SWS+ OUTPUT terminal (possibly inverting the pulse pattern of the safety signal portion prior to sending).

Alternatively, if the most recently sent device data does correspond to the device address that is one higher than the safety device's own address (YES at step 4010), the methodology proceeds to step 4014, where the safety device sends its own device data and address via the SWS+ OUTPUT terminal. The methodology then returns to step 4002 and methodology 4000 repeats. By implementing this methodology in each safety device (or smart tap device) on the single-wire channel, the methodology ensures that the device data for the safety devices is received by the comms master in descending order of safety device addresses, as illustrated in FIGS. 38 and 39.

In a variation of these embodiments, a portion of the safety signal can also be reserved for standard (non-SWS+) safety input devices that are connected to the single-wire channel via the power port of a smart tap device with power tap capability (e.g., smart tap device 3408 of FIG. 34). This allows such standard safety devices to be integrated onto the single-wire channel without the need to wire the device to an I/O point or controller.

As noted above, some embodiments of the comms master device can include a SUPPLEMENTAL OUTPUT terminal for outputting supplemental signals or messages on a dedicated communication line that is separate from the single-wire channel (e.g., dedicated line 608 of FIG. 6). This dedicated supplemental line can link the comm master's SUPPLEMENTAL OUTPUT terminal to SUPPLEMENTAL INPUT terminals on one or more safety devices on the single-wire channel, resulting in a multi-drop line. The comms master can use this supplemental line for a variety of purposes. For example, as noted previously, the comms master can issue lock and unlock permissives over this supplemental line directed to safety input devices that have integrated mechanical locks (e.g., door locks for safety gates that allow access to hazardous machinery or production areas).

In an example scenario, the comms master may issue an unlock command to a locking safety device in response to receiving a request from a user to unlock the gate associated with the safety device. Such a request may be received from a user via an unlock pushbutton that is wired to an input terminal of the comms master, or via another signaling means. When such a request is received, the comms master can be configured to first send a command via the supplemental line that forces all safety devices on the single-wire channel to transition to their safe states. For systems that do not use the modified version of the safety signal described above in connection with FIGS. 37-39, placing all devices on the circuit in their safe states allows the comms master to receive diagnostic data from any of the devices via the single-wire channel, since devices that remain in normal operation mode would not otherwise be able to pass diagnostic data from downstream devices. The comms master then requests status information from the safety devices via the single-wire channel, and issues an unlock command directed to the particular safety device to be unlocked upon confirmation that the system has been placed in a safe state and that users can access the protected area safely.

In an example embodiment, the signal placed on the supplemental line by the comms master may have three states: a 24 VDC signal that places all connected safety devices into their safe states; a 0 VDC signal that indicates to the safety devices that they may return to their operational states; and a defined dynamic signal that places the safety devices into their safe states (as with the 24 VDC signal), and also allows the safety devices to respond to lock and unlock messages sent via the single-wire channel. The dynamic signal can comprise any suitable, repeating pulse pattern recognizable by the safety devices as the valid dynamic signal. Using a dynamic signal, rather than a constant 24 VDC signal, to facilitate unlocking the gates can prevent a scenario in which a short to 24 VDC inadvertently causes a safety gate to unlock during unsafe operation of the industrial system protected by the gate.

In general, during normal operation, a safety device having locking capabilities will only unlock if the known dynamic signal is detected on the supplemental line, and an unlock instruction directed to that device is received from the comms master via the single-wire channel. Likewise, the safety device will only lock if the known dynamic signal is detected on the supplemental line, and a lock instruction directed to that device is received from the comms master via the single-wire channel. The safety device will ignore lock and unlock requests received on the single-wire channel if the dynamic signal is not present on the supplemental line (that is, the safety device will not change its current locked or unlocked state unless the dynamic signal is present).

Figure 41:
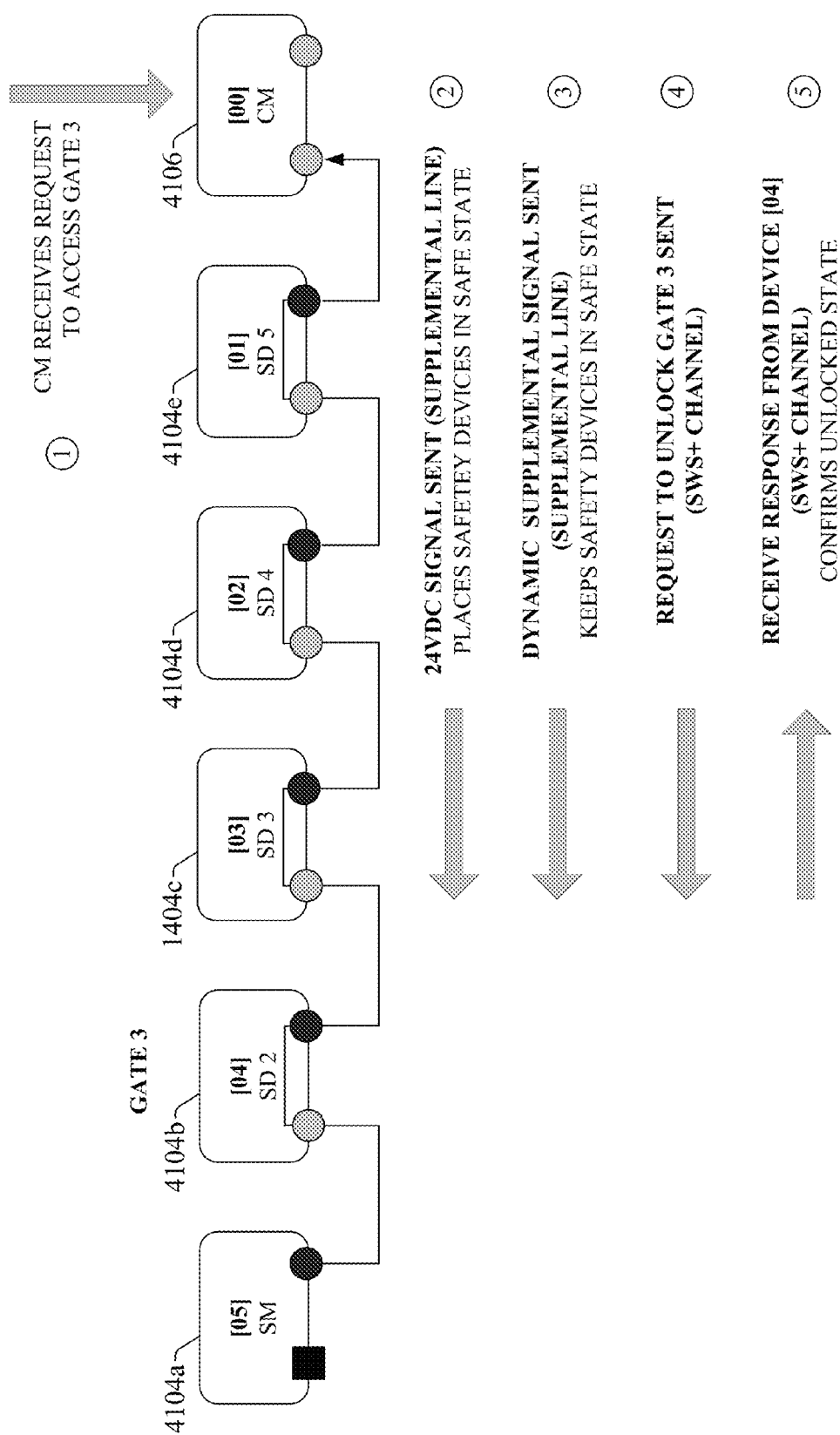
FIG. 41 is a diagram illustrating an example sequence of operations carried out by SWS+ devices in response to a request from a user to unlock a safety gate protected by a locking safety device.

FIG. 41 illustrates an example sequence of operations carried out by the SWS+ devices in response to a request from a user to unlock a safety gate protected by a locking safety device. Initially (step 1), the comms master 4106 recites a request to access a particular gate; e.g., Gate 3, which is protected by safety device 4104*b*. For example, the request may be received by the comms master 4106 via a hardware pushbutton that is wired to one of the comms master's input terminals, or via interaction with an HMI communicatively connected to the comms master 4106. In response to this request, the comms master 4106 places a 24 VDC signal on the supplemental line (step 2), causing the safety devices 4104 to transition from their normal operating states to their safe states, so that the safety devices cease conveying the pulsed safety signal generated by the safety master 4104*a* on the single-wire channel, allowing the comms master to exchange messaging with the safety devices 4104.

Next, the comms master 4106 places the hazardous industrial system being protected by the safety system is in a safe state; e.g., by opening its safety relays to remove power from the industrial system. Upon conforming that the industrial system is safe, the comms master 4106 sends the dynamic signal on the supplemental line (step 3), which instructs the safety devices 4104 to stay in their safe states, and also permitting the safety devices 4104 to respond to lock and unlock messages sent via the single-wire channel.

Once the dynamic signal has been placed on the supplemental line, the comms master sends an unlock request message via the single-wire channel directed to address [04] (safety device 4104*b*, which controls the lock for Gate 3) (step 4). Safety device 4106*b* will respond to the request message by unlocking the gate, and sending a confirmation message to the comms master 4106 indicating that Gate 3 is now unlocked (step 5). If the comms master 4106 does not receive such a confirmation within a defined time period after sending the unlock request, the comms master will perform a suitable action. For example, the comms master 4106 may respond to such a timeout condition by sending a lock command to the device from which the confirmation was expected, and generate an indication that the unlock command was not successful.

After the comms master 4106 has placed the protected industrial system in a safe state (e.g., opened its safety relays to disconnect power from the system) in order to allow a user to open an unlocked gate, the comms master 4106 will not remove the dynamic signal from the supplemental line to allow the safety devices 4104 to return to normal operation mode until the comms master has received a lock confirmation signal from all locking safety on the safety circuit. These indications can be conveyed by the locking safety devices via the single-wire channel; e.g., in response to a request for the current lock statuses issued by the comms master.

The unlocking sequence described above in connection with FIG. 41 can also be implemented using smart tap devices in place of one or more of the SWS+ safety devices 4104. In such scenarios, the smart tap can respond to lock commands received via the single-wire channel by sending a lock control signal to a lock control input of the standard safety device via the lock command line of the slave device terminal (see FIGS. 31A-31D).

Figure 42:
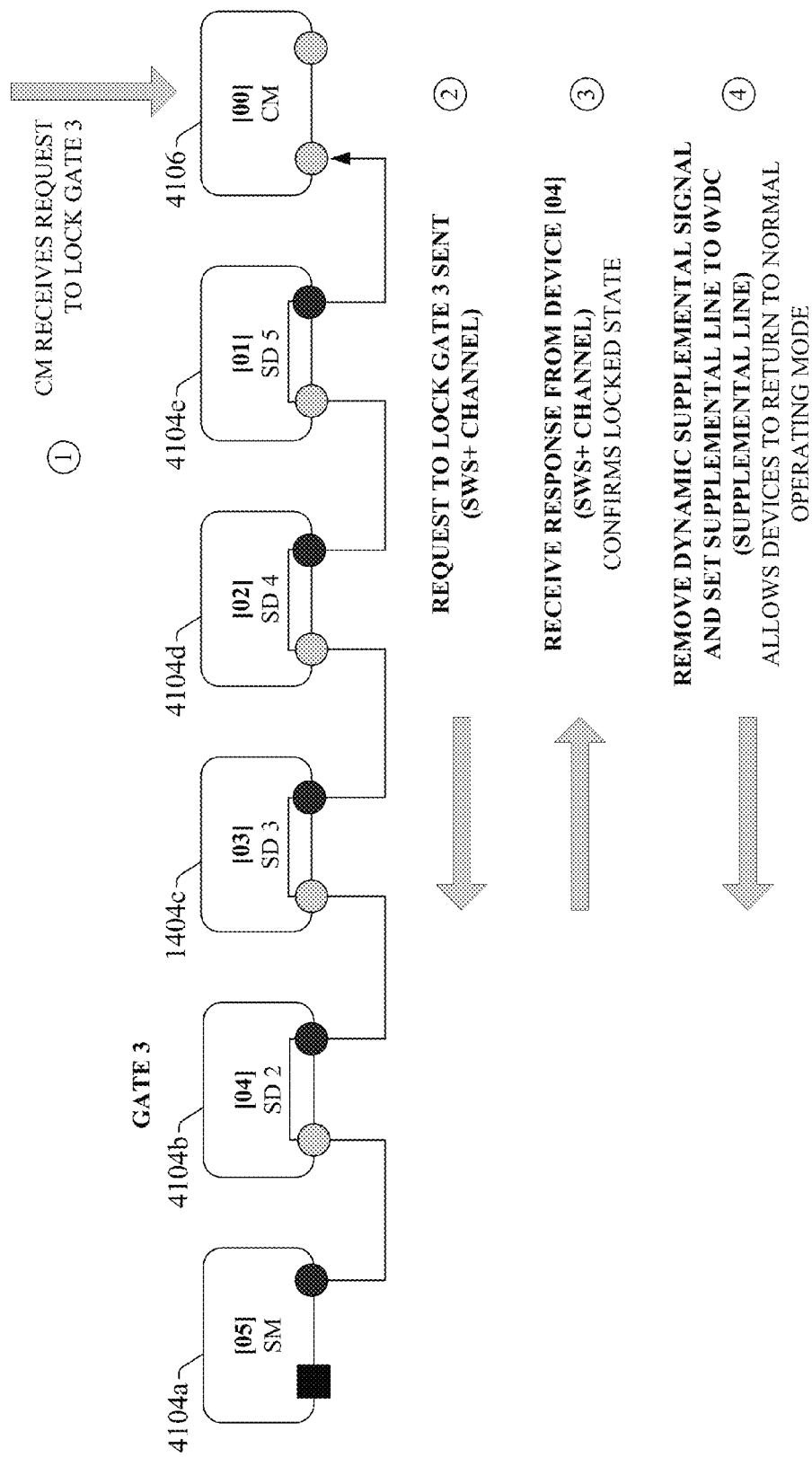
FIG. 42 is a diagram illustrating a subsequent sequence of operations carried out by SWS+ devices in response to a request from a user to lock a safety gate.

FIG. 42 illustrates a subsequent sequence of operations carried out by the SWS+ devices in response to a request from a user to lock Gate 3. Per step 3 of the sequence illustrated in FIG. 41, the dynamic signal is still being maintained on the supplemental line while Gate 3 is unlocked, ensuring that the safety devices 4104 remain in their safe modes while Gate 3 is being accessed. Initially, the comms master 4106 receives a request to lock Gate 3 (step 1); e.g., via another pushbutton connected to an input terminal of the comm module or via an HMI interaction. In response to the request, the comms master 4106 sends a lock request directed to safety device 4104*b* via the single-wire channel (step 2). In response to receiving this lock request, safety device 1404*b* (or a smart tap device connected to the standard safety device that controls the locking mechanism) activates the lock and sends a response message to the comms master 4106 via the single-wire channel in response to confirming that the lock has been actuated (step 3). In response to receiving this response message, the comms master 4106 removes the dynamic signal from the supplemental line and sets the supplemental line to 0 VDC (step 4), thereby permitting the safety devices 4104 to return to their normal operating modes.

Although the examples described above in connection with FIGS. 41 and 42 depict the supplemental line as controlling the locking action of safety devices having integrated locking outputs, the supplemental line can also be used to control other types of safety devices, including safety output devices. For example, some safety output devices may comprise starters, or safety contactors configured to remove power from a portion of an industrial system. The supplemental line can be used to control the open and closed states of these contactors in a manner similar to the locking mechanisms described above in connection with FIGS. 41 and 42. For example, a known dynamic signal on the supplemental line can instruct such safety output devices to turn on, while 24 VDC or 0 VDC on the supplemental line will cause the safety output devices to turn off.

Embodiments of the comms master that support two or more single-wire channels (see, e.g., FIG. 35) can also include two or more SUPPLEMENTAL OUTPUT terminals corresponding to the respective channels. In such embodiments, the comms master may use different pulse patterns for the dynamic signals on the respective supplemental lines to ensure that shorts across the SUPPLEMENTAL OUTPUT terminals do not inadvertently cause devices on one of the channels to turn on prematurely.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, and EtherNet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 43:
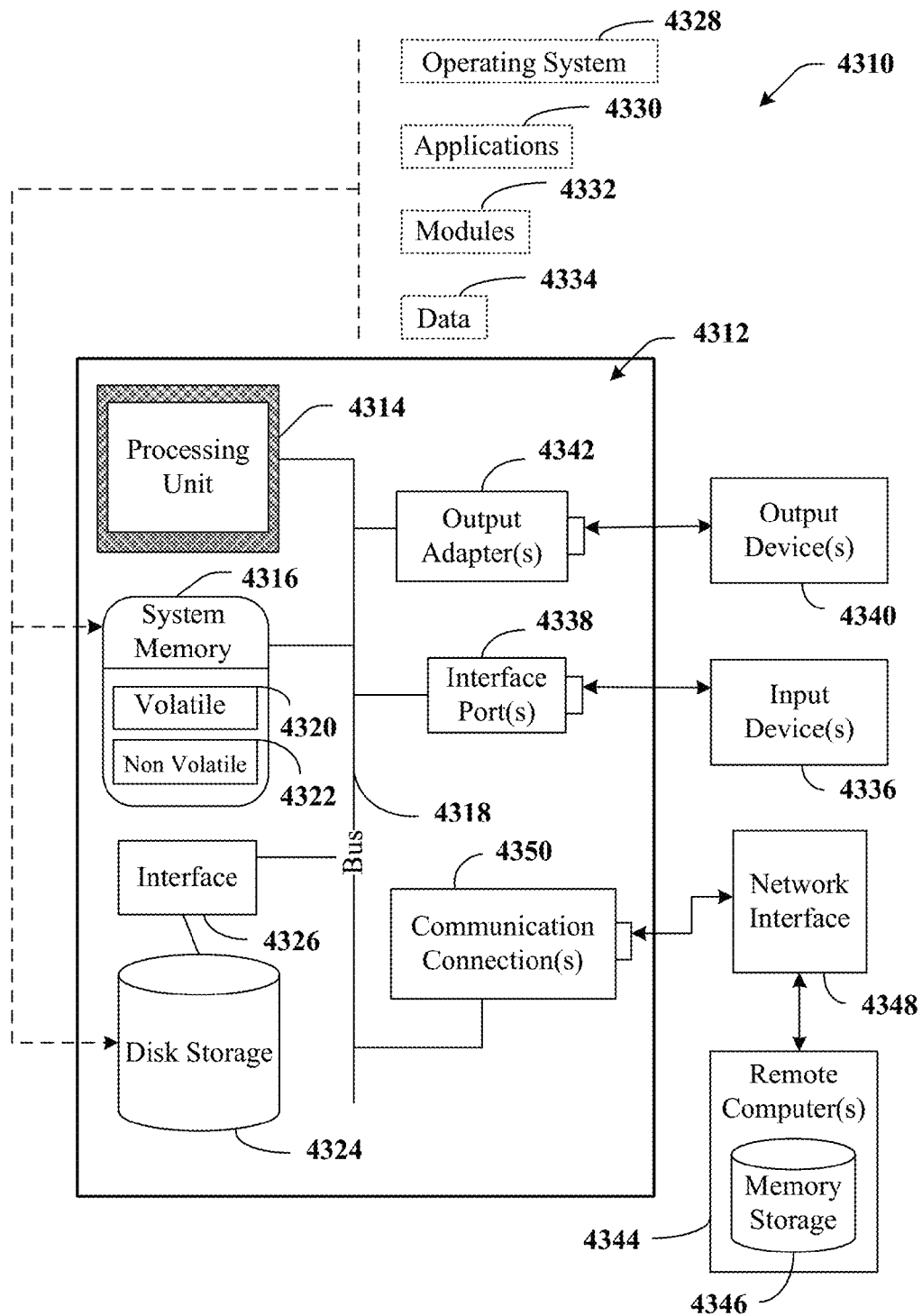
FIG. 43 is an example computing environment.
Figure 44:
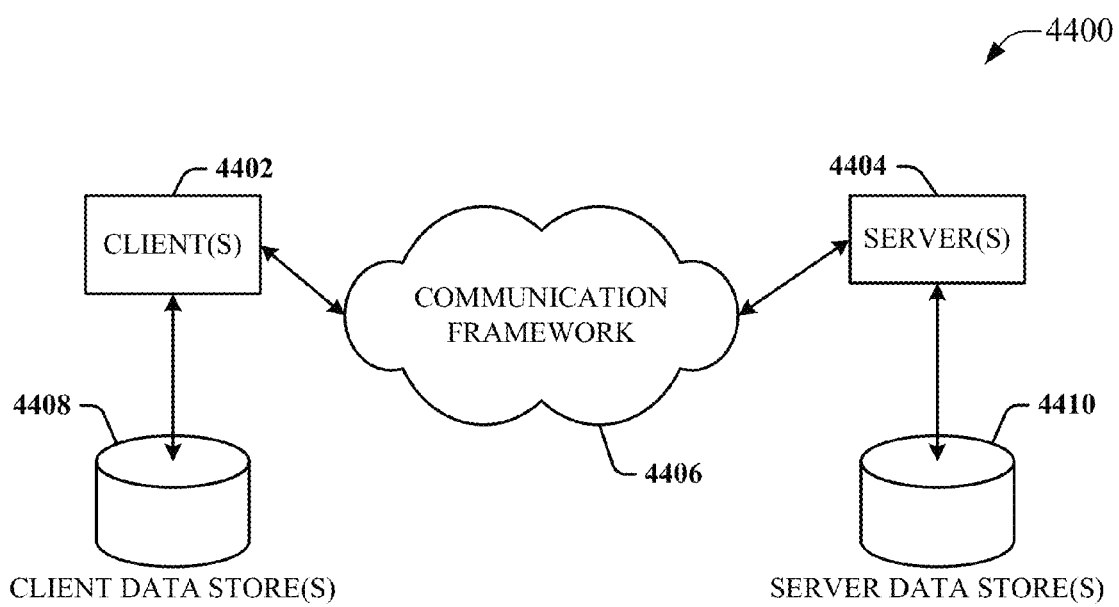
FIG. 44 is an example networking environment.

In order to provide a context for the various aspects of the disclosed subject matter, FIGS. 43 and 44 as well as the following discussion are intended to provide a brief, general description of a suitable environment in which the various aspects of the disclosed subject matter may be implemented.

With reference to FIG. 43, an example environment 4310 for implementing various aspects of the aforementioned subject matter includes a computer 4312. The computer 4312 includes a processing unit 4314, a system memory 4316, and a system bus 4318. The system bus 4318 couples system components including, but not limited to, the system memory 4316 to the processing unit 4314. The processing unit 4314 can be any of various available processors. Multi-core microprocessors and other multiprocessor architectures also can be employed as the processing unit 4314.

The system bus 4318 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 4316 includes volatile memory 4320 and nonvolatile memory 4322. The basic input/output system (BIOS), containing the basic routines to transfer information between elements within the computer 4312, such as during start-up, is stored in nonvolatile memory 4322. By way of illustration, and not limitation, nonvolatile memory 4322 can include read only memory (ROM), programmable ROM (PROM), electrically programmable ROM (EPROM), electrically erasable PROM (EEPROM), or flash memory. Volatile memory 4320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 4312 also includes removable/non-removable, volatile/nonvolatile computer storage media. FIG. 43 illustrates, for example a disk storage 4324. Disk storage 4324 includes, but is not limited to, devices like a magnetic disk drive, floppy disk drive, tape drive, Jaz drive, Zip drive, LS-100 drive, flash memory card, or memory stick. In addition, disk storage 4324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 4324 to the system bus 4318, a removable or non-removable interface is typically used such as interface 4326.

It is to be appreciated that FIG. 43 describes software that acts as an intermediary between users and the basic computer resources described in suitable operating environment 4310. Such software includes an operating system 4328. Operating system 4328, which can be stored on disk storage 4324, acts to control and allocate resources of the computer 4312. System applications 4330 take advantage of the management of resources by operating system 4328 through program modules 4332 and program data 4334 stored either in system memory 4316 or on disk storage 4324. It is to be appreciated that one or more embodiments of the subject disclosure can be implemented with various operating systems or combinations of operating systems.

A user enters commands or information into the computer 4312 through input device(s) 4336. Input devices 4336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 4314 through the system bus 4318 via interface port(s) 4338. Interface port(s) 4338 include, for example, a serial port, a parallel port, a game port, and a universal serial bus (USB). Output device(s) 4340 use some of the same type of ports as input device(s) 4336. Thus, for example, a USB port may be used to provide input to computer 4312, and to output information from computer 4312 to an output device 4340. Output adapters 4342 are provided to illustrate that there are some output devices 4340 like monitors, speakers, and printers, among other output devices 4340, which require special adapters. The output adapters 4342 include, by way of illustration and not limitation, video and sound cards that provide a means of connection between the output device 4340 and the system bus 4318. It should be noted that other devices and/or systems of devices provide both input and output capabilities such as remote computer(s) 4344.

Computer 4312 can operate in a networked environment using logical connections to one or more remote computers, such as remote computer(s) 4344. The remote computer(s) 4344 can be a personal computer, a server, a router, a network PC, a workstation, a microprocessor based appliance, a peer device or other common network node and the like, and typically includes many or all of the elements described relative to computer 4312. For purposes of brevity, only a memory storage device 4346 is illustrated with remote computer(s) 4344. Remote computer(s) 4344 is logically connected to computer 4312 through a network interface 4348 and then physically connected via communication connection 4350. Network interface 4348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 4350 refers to the hardware/software employed to connect the network interface 4348 to the system bus 4318. While communication connection 4350 is shown for illustrative clarity inside computer 4312, it can also be external to computer 4312. The hardware/software necessary for connection to the network interface 4348 includes, for exemplary purposes only, internal and external technologies such as, modems including regular telephone grade modems, cable modems and DSL modems, ISDN adapters, and Ethernet cards.

FIG. 44 is a schematic block diagram of a sample computing environment 4400 with which the disclosed subject matter can interact. The sample computing environment 4400 includes one or more client(s) 4402. The client(s) 4402 can be hardware and/or software (e.g., threads, processes, computing devices). The sample computing environment 4400 also includes one or more server(s) 4404. The server(s) 4404 can also be hardware and/or software (e.g., threads, processes, computing devices). The servers 4404 can house threads to perform transformations by employing one or more embodiments as described herein, for example. One possible communication between a client 4402 and servers 404 can be in the form of a data packet adapted to be transmitted between two or more computer processes. The sample computing environment 4400 includes a communication framework 4406 that can be employed to facilitate communications between the client(s) 4402 and the server(s) 4404. The client(s) 4402 are operably connected to one or more client data store(s) 3008 that can be employed to store information local to the client(s) 4402. Similarly, the server(s) 4404 are operably connected to one or more server data store(s) 4410 that can be employed to store information local to the servers 4404.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A smart tap device, comprising:
a memory that stores executable components;
a processor, operatively coupled to the memory, that executes the executable components, the executable components comprising:
a safe state detection component configured to determine whether a safety device connected to a slave device terminal of the smart tap device is in a safe state;
a pulse detection component configured to verify that a modulated pulse pattern of a safety signal received on an input terminal of the smart tap device corresponds to a defined pulse pattern;
a safety signal relaying component configured to output the safety signal on an output terminal of the smart tap device in response to verification that the modulated pulse pattern corresponds to the defined pulse pattern and a determination that a safety function of the safety device is valid; and
a message processing component configured to, in response to receipt, via the output terminal, of a request message requesting a reset of the safety device and containing a target address that matches an address of the smart tap device, momentarily remove power from a power supply line of the slave device terminal that provides power to the safety device.

2. The smart tap device of claim 1, wherein the safe state detection component is further configured to identify a type of the safety device, and to configure functionality of an input line and an output line of the slave device terminal based on the type of the safety device.

3. The smart tap device of claim 1, the executable components further comprising:
a pulse generating component configured to generate the modulated pulse pattern; and
a safety master mode component configured to enable the pulse generating component in response to detection of a terminator connected to the input terminal and to disable the pulse generating component in response to determining that the terminator is not connected to the input terminal.

4. The smart tap device of claim 1, wherein the message processing component is further configured to, in response to receipt of an input message via the output terminal indicating that at least one of a downstream safety device or a downstream safety tap device is active, send an output message via the output terminal indicating that the smart tap device is active.

5. The smart tap device of claim 1, wherein the message processing component is further configured to send an output message via the input terminal indicating that the safety tap device is active, and wherein the executable components further comprise:

a single-wire communication component configured to, in response to receipt of an input message via the input terminal indicating that at least one of an upstream safety device or an upstream safety tap device is active, establish a safety channel sub-link between the smart tap device and the at least one of the upstream safety device or the upstream smart tap device.

6. The smart tap device of claim 1, wherein the executable components further comprises a device addressing component configured to, in response to receipt of an enumeration message via the output terminal containing an address of at least one of a downstream safety device or a downstream safety tap device, increment the address to yield an incremented address and assign the address to the smart tap device.

7. The smart tap device of claim 6, wherein the message processing component is further configured to send an enumeration response message via the output terminal containing at least the incremented address and an indication of whether the smart tap device is a last addressable device on a safety circuit.

8. The smart tap device of claim 1, wherein the target address is a first target address, and the message processing component is further configured to
    in response to determining that a second target address contained in a device information request message received via the output terminal matches the address of the smart tap device, send an output message via the input terminal containing device information obtained from the safety device via the slave device terminal, and
    in response to determining that the second target address contained the device information request message does not match the address of the smart tap device, send the device information request message via the input terminal.

9. The smart tap device of claim 1, wherein the smart tap device further comprises a power tap configured to connect to a power supply and to provide power from the power supply to a first power supply line associated with the input terminal, and wherein the first power supply line is electrically isolated from a second power supply line associated with the output terminal.

10. The smart tap device of claim 1, wherein the smart tap device is configured to detect a low voltage condition of the safety device, and the message processing component is further configured to send a low voltage warning message via the output terminal in response to detection of the low voltage condition.

11. The smart tap device of claim 1, wherein the safety device is at least one of an emergency stop pushbutton, a light curtain device, a safety door switch, a safety mat device, an emergency pull-cord device, a laser scanner, a photoelectric sensor, or a safety contactor.

12. A method for operating a smart tap device, comprising:
    determining, by a smart tap device comprising a processor, whether a safety device connected to a slave device terminal of the smart tap device is in a safe status;
    comparing, by the smart tap device, a pulse pattern carried by a safety signal received on an input terminal of the smart tap device with a defined pulse pattern;
    in response to determining that the pulse pattern matches the defined pulse pattern based on the comparing and that the safety device is in the safe status, outputting the safety signal via an output terminal of the smart tap device; and
    in response to receipt, via the output terminal, of a reset request message requesting a reset of the safety device and containing a target address corresponding to an address of the smart tap device, momentarily removing, by the smart tap device, power from a power supply line of the slave device terminal that provides power to the safety device.

13. The method of claim 12, further comprising:
    identifying, by the smart tap device, a type of the safety device; and
    configuring, by the smart tap device, functionality of at least one input line and at least one output line of the slave device terminal based on the type of the safety device.

14. The method of claim 12, wherein the target address is a first target address, and the method further comprises:
    in response to determining that an input message received via the output terminal is a request for device status information and that a second target address contained the input message matches the address of the smart tap device:
        obtaining device status information from the safety device via the slave device terminal, and
        sending the device status information as part of an output message via the input terminal; and
    in response to determining that the second target address contained the input message does not match the address of the smart tap device, outputting the input message via the input terminal.

15. The method of claim 12, further comprising:
    detecting, by the smart tap device, a low voltage status of the safety device; and
    in response to the detecting, sending, by the smart tap device, a low voltage warning message via the output terminal.

16. A non-transitory computer-readable medium having stored thereon instructions that, in response to execution, cause a smart tap device comprising a processor to perform operations, the operations comprising:
    confirming that a safety signal received on an input terminal of the smart tap device carries a pulse pattern corresponding to a defined pulse pattern;
    in response to the confirming and a determination that a safety function of a safety device connected to a slave device terminal of the smart tap device is valid, outputting the safety signal via an output terminal of the smart tap device;
    receiving, via the output terminal, a reset request message containing a target address; and
    in response to determining that the target address matches an address of the smart tap device, momentarily removing power from a power supply line of the slave device terminal that provides power to the safety device.

17. The non-transitory computer-readable medium of claim 16, the operations further comprising:
    identifying a type of the safety device; and
    configuring functionality of at least one input line and at least one output line of the slave device terminal based on the type of the safety device.

18. The non-transitory computer-readable medium of claim 16, wherein the target address is a first target address, and the operations further comprise:
    in response to determining that an input message received via the output terminal is a request for device information and that a second target address contained the input message matches the address of the smart tap device:
 obtaining device status information from the safety device via the slave device terminal, and
 sending the device status information via the input terminal; and
in response to determining that the second target address contained the input message does not match the address of the smart tap device, outputting the input message via the input terminal.

19. A smart tap device, comprising:
a memory that stores executable components;
a processor, operatively coupled to the memory, that executes the executable components, the executable components comprising:
 a safe state detection component configured to determine whether a safety device connected to a slave device terminal of the smart tap device is in a safe state;
 a pulse detection component configured to verify that a modulated pulse pattern of a safety signal received on an input terminal of the smart tap device corresponds to a defined pulse pattern;
 a safety signal relaying component configured to output the safety signal on an output terminal of the smart tap device in response to verification that the modulated pulse pattern corresponds to the defined pulse pattern and a determination that a safety function of the safety device is valid; and
 a power tap configured to connect to a power supply and to provide power from the power supply to a first power supply line associated with the input terminal, wherein the first power supply line is electrically isolated from a second power supply line associated with the output terminal.

20. A smart tap device, comprising:
a memory that stores executable components;
a processor, operatively coupled to the memory, that executes the executable components, the executable components comprising:
 a safe state detection component configured to determine whether a safety device connected to a slave device terminal of the smart tap device is in a safe state;
 a pulse detection component configured to verify that a modulated pulse pattern of a safety signal received on an input terminal of the smart tap device corresponds to a defined pulse pattern;
 a safety signal relaying component configured to output the safety signal on an output terminal of the smart tap device in response to verification that the modulated pulse pattern corresponds to the defined pulse pattern and a determination that a safety function of the safety device is valid; and
 a message processing component configured to, in response to detection of a low voltage condition of the safety device, send a low voltage warning message via the output terminal.

* * * * *